US008305265B2

(12) United States Patent
Ezal et al.

(10) Patent No.: US 8,305,265 B2
(45) Date of Patent: Nov. 6, 2012

(54) RADIO-BASED DIRECTION-FINDING NAVIGATION SYSTEM USING SMALL ANTENNA

(75) Inventors: Kenan O. Ezal, Santa Barbara, CA (US); Benjamin D. Werner, Goleta, CA (US)

(73) Assignee: Toyon Research Corporation, Goleta, CA (US)

( * ) Notice: Subject to any disclaimer, the term of this patent is extended or adjusted under 35 U.S.C. 154(b) by 250 days.

(21) Appl. No.: 12/457,512

(22) Filed: Jun. 12, 2009

(65) Prior Publication Data
US 2010/0007555 A1   Jan. 14, 2010

Related U.S. Application Data

(63) Continuation-in-part of application No. 12/155,102, filed on May 29, 2008, now abandoned.

(60) Provisional application No. 60/924,727, filed on May 29, 2007.

(51) Int. Cl.
*G01S 19/53* (2010.01)
*G01S 5/02* (2010.01)
*G01S 5/04* (2006.01)

(52) U.S. Cl. .................. 342/357.36; 342/417; 342/427; 342/432; 342/447

(58) Field of Classification Search ............ 342/357.02, 342/357.11, 357.12, 357.36
See application file for complete search history.

(56) References Cited

U.S. PATENT DOCUMENTS

| 3,144,648 | A | * | 8/1964  | Dollinger ...................... 342/365 |
| 4,119,972 | A |   | 10/1978 | Fletcher et al. |
| 4,366,483 | A |   | 12/1982 | Hagedon et al. |
| 4,591,862 | A |   | 5/1986  | Parkhurst et al. |
| 4,630,064 | A |   | 12/1986 | Andrews et al. |
| 5,173,700 | A | * | 12/1992 | Chesley ........................ 342/17 |
| 5,185,610 | A | * | 2/1993  | Ward et al. ............... 342/357.24 |
| 5,313,216 | A |   | 5/1994  | Wang et al. |
| 5,327,143 | A |   | 7/1994  | Goetz et al. |
| 5,334,984 | A |   | 8/1994  | Akaba |
| 5,461,387 | A |   | 10/1995 | Weaver |
| 5,508,710 | A | * | 4/1996  | Wang et al. ................... 343/726 |

(Continued)

OTHER PUBLICATIONS

Alexrad et al., "Satellite Attitude Determination Based on GPS Signal-to-Noise Radio," Proceedings of the IEEE, vol. 87, No. 1, Jan. 1999, pp. 133-144.

(Continued)

*Primary Examiner* — Thomas Tarcza
*Assistant Examiner* — Cassie Galt
(74) *Attorney, Agent, or Firm* — Nixon & Vanderhye PC

(57) ABSTRACT

An exemplary radio-based navigation system uses a small multimode direction-finding antenna and a direction-finding receiver capable of determining platform position, velocity, attitude, and time while simultaneously providing protection against narrowband and broadband sources of interference. Global Navigation Satellite System (GNSS) signals such as those from the Global Positioning System (GPS) provide attitude measurements with a compact multimode direction-finding antenna (e.g., a small two-arm spiral with improved angle-of-arrival performance over the entire hemisphere enhanced through the use of a conductive vertical extension of the antenna ground plane about the antenna perimeter and/or conductive posts placed evenly around the antenna perimeter) which provides simultaneous protection against jammers. The multimode spiral may be treated as an array of rotationally-symmetric antenna elements. The GPS receiver architecture also may be modified for direction-finding and thereby attitude determination by increasing the requisite number of input signals from one to at least two while minimizing the required number of correlators and mixers.

32 Claims, 25 Drawing Sheets

U.S. PATENT DOCUMENTS

| | | | |
|---|---|---|---|
| 5,579,021 | A | 11/1996 | Lee |
| 5,621,422 | A | 4/1997 | Wang |
| 5,786,791 | A | 7/1998 | Bruckert |
| 5,940,026 | A | 8/1999 | Popeck |
| 6,011,514 | A | 1/2000 | Frankovich |
| 6,018,315 | A * | 1/2000 | Ince et al. ............... 342/357.27 |
| 6,252,553 | B1 | 6/2001 | Solomon |
| 6,281,841 | B1 | 8/2001 | Nevill |
| 6,339,396 | B1 | 1/2002 | Mayersak |
| 6,452,543 | B1 * | 9/2002 | Tseng et al. ............ 342/357.36 |
| 6,520,448 | B1 | 2/2003 | Doty et al. |
| 6,580,389 | B2 | 6/2003 | Speyer et al. |
| 6,598,009 | B2 * | 7/2003 | Yang ............................ 702/152 |
| 6,700,536 | B1 | 3/2004 | Wiegand |
| 6,876,337 | B2 | 4/2005 | Larry |
| 7,577,464 | B2 * | 8/2009 | Ezal et al. .................. 455/562.1 |
| 2004/0263406 | A1 * | 12/2004 | Colburn et al. ............... 343/725 |
| 2005/0195103 | A1 | 9/2005 | Davis et al. |
| 2007/0293150 | A1 | 12/2007 | Ezal et al. |
| 2008/0303714 | A1 | 12/2008 | Ezal et al. |

OTHER PUBLICATIONS

Bullock et al., "An Analysis of Wide-Band Microwave Monopulse Direction-Finding Techniques," IEEE Transactions on Aerospace and Electronic Systems, vol. 7, No. 1, Jan. 1971, pp. 188-203.

Deschamps et al., "The Logarithmic Spiral in a Single-Aperture Multimode Antenna System," IEEE Transactions on Antennas and Propagation, vol. 19, No. 1, pp. 90-96, Jan. 1971.

Ezal et al., "Tracking and Interception of Ground-Based RF Sources Using Autonomous Guided Munitions with Passive Bearings-Only Sensors and Tracking Algorithms," Proceedings of the SPIE, Apr. 2004.

Farrell & Stuelpnagel, "Solution to 'A Least Squares Estimate of Satellite Attitude'," SIAM Review, vol. 8, No. 3, pp. 384-386, 1966.

Grossman, "Bearings-Only Tracking: A Hybrid Coordinate System Approach," 1991 IEEE, pp. 2032-2037.

Nakano et al., "A Spiral Antenna Backed by a Conducting Plane Reflector," 1986 IEEE Transactions on Antennas and Propagation, vol. AP-34, No. 6, pp. 791-796.

Penno et al., "Theory of Angle Estimation Using a Multiarm Spiral Antenna," IEEE Transactions on Aerospace and Electronic Systems, vol. 37, No. 1, Jan. 2001, pp. 123-133.

Penno et al., "Mitigation of Jamming of an Angle Estimation System Using Multi-mode Antennas," Proceedings of the IEEE Aerospace Conference, vol. 2, 2002, pp. 833-839.

Wahba, "A Least Squares Estimate of Satellite Attitude," SIAM Review, vol. 7, No. 3, p. 409, Jul. 1965.

Wang et al., "Design of Multioctave Spiral-Mode Microstrip Antennas," 1991 IEEE Transactions on Antennas and Propagation, vol. 39, pp. 332-335, No. 3.

Wang et al., "Multioctave Wideband Mode-O Operation of Spiral-Mode Microstrip Antennas," 1997 Proceedings of the Antennas and Propagation Society International Symposium, pp. 1860-1863.

Wang, "Theory of a Class of Planar Frequency-Independent Omnidirectional Traveling-Wave Antennas," IEEE International Symposium on Microwave, Antenna, Propagation and EMC Technologies for Wireless Communication Proceedings, 2005, pp. 434-437.

IEEE Standard Definitions of Terms for Antennas, IEEE Std 145-1993.

Mosko, "An Introduction to Wideband, Two-Channel Direction-Finding Systems, Part I: General System Overview, Radiator, and Arithmetic Subsystems," Microwave Journal, Feb. 1984, pp. 91-106.

Mosko, "An Introduction to Wideband, Two-Channel, Direction-Finding Systems, Part II," Microwave Journal, Mar. 1984, pp. 105-122.

Psiaki, "Attitude Sensing Using a Global-Positioning-System Antenna on a Turntable," Journal of Guidance, Control, and Dynamics, vol. 24, No. 3, May-Jun. 2001, pp. 474-481.

Grossman, "Bearings-Only Tracking: A Hybrid Coordinate System Approach," *Journal of Guidance, Control, and Dynamics*, vol. 17, No. 3 (1991).

Huang, "Circularly Polarized Conical Patterns from Circular Microstrip Antennas," *IEEE Transactions on Antennas and Propagation*, vol. AP-32, No. 9, pp. 991-994 (Sep. 1984).

Sundberg, et al., "ECM and ESM Antennas," Antenna Engineering Handbook, Second Edition, Chapter 40, Johnson, et al., editors (1984).

Office Actions and responses thereto in U.S. Appl. No. 11/154,952.

Office Actions and responses thereto in U.S. Appl. No. 12/155,102.

Webster's Online Dictionary re "boresight", http://www.websters-online-dictionary.org/definitions/boresight, 2011.

Wikipedia, the Free Encyclopedia, re "antenna boresight", http://en.wikipedia.org/wiki/Antenna_boresight, Dec. 22, 2010.

Encyclo Online Encyclopedia re "boresight", http://www.encyclo.co.uk/define/boresight, 2011.

Federal Standard 1037C, Telecommunications: Glossary of Telecommunication Terms re "boresight", National Communications System Technology & Standards Division, published by General Services Administration Information Technology Service, Aug. 7, 1996.

Natural Resources Canada, Canada Centre for Remote Sensing, http://ccrs.nrcan.gc.ca/index_e.php, 3 pages, 2011.

Budge, Antennas, University of Alabama, Huntsville, Course Notes from "EE 725—Advanced Radar Technique", pp. 1-38, Spring 2008.

Radartutorial.eu re "Radar Basics—Monopulse Antenna", 3 pages, http://www.radartutorial.ed/06.antenna/anl7.en.html, 2011.

Stimson, Introduction to Airborne Radar, 2d ed., Chapter 8, Directivity and the Antenna Beam, SciTech Publishing, Inc., pp. 91-106, 1988.

SITIS Topic Details, SBIR/STTR Interactive Topic Information System (SITIS), Non-beam-steering Global Positioning System (GPS) Anti-jam Solution with Minimized Pseudo-range Errors, 5 pages.

U.S. Dept. of the Navy, Small Business Innovation Research (SBIR) Proposal Submission Instructions, 130 pages, Spring 2011.

Merriam-Webster Dictionary re "physical", http://www.merriam-webster.com/dictionary/physical, 3 pages, 2011.

Dictionary.com re "physical", http://dictionary.reference.com/browse/physical, Random House, Inc., 2011.

Free Online Dictionary, Thesaurus and Encyclopedia re "physical", http://www.thefreedictionary.com/physical, 3 pages, 2011.

Weeks, Antenna Engineering, McGraw-Hill Book Co., p. 337, ISBN 07-068970-9, 1968.

U.S. Dept. of the Navy, The GPS Wing of the U.S. Air Force and the Space and Naval Warfare Systems Center, Small Antenna System (SAS) Statement of Work, 19 pages, N66001-07-R-0031, San Diego, CA, May 29, 2007.

U.S. Dept. of the Army, C4ISR Materiel Enterprise Power Point Template, PEO IEW&S Upcoming Business Opportunities presented by Michael Madden, Dec. 7, 2011.

Dictionary.com re "attitude", http://dictionary.reference.com/browse/attitude, Random House, Inc., 2011.

Wikipedia, the Free Encyclopedia, re "rotational symmetry", 6 pages, http://en.wikipedia.org/wiki/Rotational_symmetry, 2011.

* cited by examiner

| 4-Arm Spiral Phasing | Mode 0 | Mode 1 | Mode 2 | Mode 3 |
|---|---|---|---|---|
| Arm 1 | 0° | 0° | 0° | 0° |
| Arm 2 | 0° | 90° | 180° | 270° / -90° |
| Arm 3 | 0° | 180° | 360° / 0° | 540° / -180° |
| Arm 4 | 0° | 270° | 540° / 180° | 810° / -270° |
| Relative Phasing | 0° | 90° | 180° | 270° / -90° |

| Relative Phasing | 2-Arm Spiral | 3-Arm Spiral | 4-Arm Spiral | 5-Arm Spiral | 6-Arm Spiral |
|---|---|---|---|---|---|
| Mode 0 | 0° | 0° | 0° | 0° | 0° |
| Mode 1 | 180° | 120° | 90° | 72° | 60° |
| Mode 2 | -- | 240° | 180° | 144° | 120° |
| Mode 3 | -- | | 270° | 216° | 180° |
| Mode 4 | -- | | | 288° | 240° |
| Mode 5 | -- | | | | 300° |

Relative Phasing (deg) = $360\, m/n$ between adjacent arms m = mode number (0,1,...)
n = number of arms (2,3,...)

Figure 5

RADIO-BASED DIRECTION-FINDING NAVIGATION SYSTEM USING SMALL ANTENNA

RELATED APPLICATIONS

This non-provisional application is a continuation-in-part of commonly assigned U.S. application Ser. No. 12/155,102 filed on May 29, 2008 (now abandoned in favor of this CIP application), titled "Compact Single-Aperture Antenna and Navigation System" naming Kenan Ezal, Tariq Mujahed and Ben Werner as inventors, and which further claims priority rights based on U.S. Provisional Application Ser. No. 60/924,727 filed May 29, 2007. Application Ser. Nos. 12/155,102 and 60/924,727 are hereby incorporated by reference. This application is also related to commonly assigned, application Ser. No. 11/154,952 filed on Jun. 17, 2005 (now issued as U.S. Pat. No. 7,577,464).

BACKGROUND OF THE INVENTION

1. Technical Field

In general, the present application relates to the field of antennas and radio-based navigation systems. Specifically, it relates to multimode direction-finding (DF) antennas; radio-based navigation receivers for use with a global navigation satellite system (GNSS) such as the Global Positioning System (GPS), GALILEO, and GLONASS; as well as the fields of radio-frequency (RF) interference rejection, RF direction finding, and radio-based attitude determination.

2. List of References

| U.S. Patents | | | |
|---|---|---|---|
| 3,144,648 | August 1964 | Dollinger | 342/365 |
| 4,366,483 | December 1982 | Hagedon et al. | 343/113 R |
| 4,591,862 | May 1986 | Parkhurst et al. | 343/427 |
| 4,630,064 | December 1986 | Andrews et al. | 343/895 |
| 5,173,700 | December 1992 | Chesley | 342/17 |
| 5,185,610 | February 1993 | Ward et al. | 342/357 |
| 5,313,216 | May 1994 | Wang et al. | 343/700 MS |
| 5,327,143 | July 1994 | Goetz et al. | 342/382 |
| 5,461,387 | October 1995 | Weaver | 342/357 |
| 5,621,422 | April 1997 | Wang | 343/895 |
| 5,940,026 | August 1999 | Popeck | 342/357.01 |
| 6,281,841 B1 | August 2001 | Nevill | 342/424 |
| 6,452,543 B1 | September 2002 | Tseng et al. | 342/357.11 |
| 6,520,448 B1 | February 2003 | Doty et al. | 244/3.23 |
| 6,580,389 B2 | June 2003 | Speyer et al. | 342/357.11 |
| 6,598,009 B2 | July 2003 | Yang | 702/152 |
| 6,876,337 B2 | April 2005 | Larry | 343/818 |
| U.S. Patent Applications | | | |
| 11/154,952 | June 2005 | Ezal et al. (now U.S. Pat. No. 7,577,464) | 455/562.1 |
| 12/155,102 | May 2008 | Ezal et al. (now abandoned) | 342/357.12 |

Books

S. Blackman and R. Popoli, Design and Analysis of Modern Tracking Systems, Artech House, Boston, Mass., 1999.

C. E. Cohen, "Attitude Determination," in Global Positioning System: Theory and Applications, Volume II, B. Parkinson and J. J. Spilker, Jr., editors, Washington, D.C., American Institute of Astronautics and Aeronautics, 1996.

R. T. Compton, Adaptive Antennas: Concepts and Performance, 1988.

R. G. Corzine and J. A. Mosko, Four-arm Spiral Antennas, Artech House, 1990.

R. N. Ghose, Interference Mitigation: Theory and Application, IEEE Press, 1996.

E. D. Kaplan and C. Hegarty (Editors), Understanding GPS: Principles and Applications, Second Edition, 2005.

H. D. Kennedy and W. Wharton, "Direction-Finding Antennas and Systems," Antenna Engineering Handbook, Second Edition, R. C. Johnson and H. Jasik, editors, Chapter 39, 1984.

S. E. Lipsky, Microwave Passive Direction-finding, John Wiley & Sons, 1987.

B. W. Parkinson and J. J. Spilker (Editors), Global Positioning System: Theory & Applications, Volumes I and II, 1996.

Articles

P. Axelrad and C. P. Behre, "Satellite Attitude Determination Based on GPS Signal-to-Noise Ratio," Proceedings of the IEEE, vol. 87, no. 1, pp. 133-144, January 1999.

L. G. Bullock, et al., "An Analysis of Wide-Band Microwave Monopulse Direction-Finding Techniques," IEEE Transactions on Aerospace and Electronic Systems, vol. 7, no. 1, pp. 188-203, January 1971.

G. A. Deschamps and J. D. Dyson, "The Logarithmic Spiral in a Single-Aperture Multimode Antenna System," IEEE Transactions on Antennas and Propagation, vol. 19, no. 1, pp. 90-96, January 1971.

K. Ezal and C. Agate, "Tracking and interception of ground-based RF sources using autonomous guided munitions with passive bearings-only sensors and tracking algorithms," Proceedings of the SPIE, April 2004.

J. Farrell and J. Stuelpnagel, "Solution to 'A Least Squares Estimate of Satellite Attitude,'" SIAM Review, vol. 8, no. 3, pp 384-386, 1966.

W. Grossman, "Bearings-Only Tracking: A Hybrid Coordinate System Approach," Proceedings of the Conference on Decision and Control, pp. 2032-2037, 1991.

J. Huang, "Circularly Polarized Conical Patterns from Circular Microstrip Antennas," IEEE Transactions on Antennas and Propagation, pp. 991-994, vol. 32, no. 9, September 1984.

J. A. Mosko, "An Introduction to Wideband Two-Channel Direction-Finding Systems, Parts I and II," Microwave Journal, February & March 1984.

H. Nakano, et al., "A Spiral Antenna Backed by a Conducting Plane Reflector," IEEE Transactions on Antennas and Propagation, vol. 34, no. 6, June 1986.

R. P. Penno and K. M. Pasala, "Theory of Angle Estimation Using Multiarm Spiral Antenna," IEEE Transactions on Aerospace and Electronic Systems, vol. 37, no. 1, January, 2001.

R. P. Penno, K. M. Pasala, and S. Schneider, "Mitigation of Jamming of an Angle Estimation System Using Multimode Antennas," Proceedings of the IEEE Aerospace Conference, vol. 2, pp. 833-839, 2002.

M. L. Psiaki, "Attitude Sensing Using a Global-Positioning-System Antenna on a Turntable," Journal of Guidance, Control, and Dynamics, vol. 24, no. 3, pp. 474-481, May-June 2001.

G. Wahba, "A Least Squares Estimate of Satellite Attitude," SIAM Review, vol. 7, no. 3, p. 409, July 1965.

J. J. H. Wang and V. K. Tripp, "Design of Multioctave Spiral-Mode Microstrip Antennas," IEEE Transactions on Antennas and Propagation, vol. 39, no. 3, March 1991.

J. J. H. Wang, J. K. Tillery, and M. A. Acree, "Multioctave Wideband Mode-0 Operation of Spiral-Mode Microstrip Antennas," Proceedings of the Antennas and Propagation Society International Symposium, vol. 3, pp. 1860-1863, July 1997.

J. J. H. Wang, "Theory of a Class of Planar Frequency-Independent Omnidirectional Traveling-Wave Antennas," Proceedings of the Antennas and Propagation Society International Symposium, pp. 434, 2005.

Standards

IEEE Standards Board, IEEE Standard Definitions of Terms for Antennas, IEEE Standard 145-1993.

3. Related Art

Numerous civilian and military applications have been developed based on satellite navigation systems and an increasing number of systems rely on the navigational accuracy provided by GPS. Other examples of satellite navigation systems include Europe's GALILEO and Russia's GLONASS, as well as systems currently being developed by other nations including India, China and Japan. Under these radio-based navigation systems, a multitude of satellites orbiting earth send out coded signals containing information regarding the satellite trajectories (ephemeris) and time (almanac). Each satellite signal waveform is assigned a unique code or frequency that is known a priori by the receiving platform. Military versions of these signals are encrypted so that only those receivers with appropriate decryption equipment can decipher the satellite signals. Receiver position, velocity and time (PVT) are determined from the measured time-of-flight, or pseudo-range of four or more satellite signals and the known positions of those satellites. The proper techniques and methods for receiving and processing of satellite signals to obtain own-platform position, velocity, and time are well known: see, for example, Kaplan and Hegarty (2005) and Parkinson and Spilker (1996).

It is generally recognized that the performance of GPS is greatly enhanced when it is coupled with an inertial navigation system (INS). In GPS/INS systems, the low-frequency position and velocity measurements provided by GPS help calibrate and reduce the bias and scale factor errors of inertial measurement units (IMUs). The IMUs provide high-frequency measurements that bridge the gap between successive low-frequency GPS measurements. In return, the INS aids in the acquisition and tracking of GPS satellites by allowing a reduction in the GPS receiver carrier- and code-tracking loop bandwidths. Reducing the loop bandwidth decreases the noise (as well as the jamming power) and increases the satellite signal-to-interference-plus-noise ratio (SINR).

Many platforms place severe constraints on the size, weight and power (SWAP) of onboard sensors and electronics, making it very difficult to build navigation systems that are capable of providing the needed accuracy while meeting the SWAP constraints. While micro-electrical mechanical systems (MEMS) have reduced the size and weight of sensors used for inertial navigation, the reduction in size has also resulted in a decrease in performance, especially when considering low-cost MEMS gyros. In contrast to tactical-grade gyros which have rate biases on the order of one degree per hour, MEMS gyros have rate biases of hundreds of degrees per hour and their performance tends to be highly temperature sensitive. Without GPS these large biases translate into large growths in error over short periods of time. Hence, it is important to augment MEMS IMUs with alternative sensors that improve the navigation performance and specifically the attitude accuracy without significantly adding to the overall cost, volume, weight, and power consumption of the system.

Since satellite-based navigation systems typically require three or more antennae (multiple apertures) separated at least 0.5 meters apart (greater than two wavelengths) to obtain 3-D attitude measurements [U.S. Pat. No. 5,185,610], [Cohen-1996], most GPS/INS systems rely on the IMU to provide attitude measurements. GPS-based attitude (GPS/A) is computed from the estimated platform position, the known satellite positions, and the measured angle-of-arrival (AOA) of each satellite signal. The advantage of GPS-based attitude sensors is that they are relatively temperature insensitive and have no known drift mechanism in multipath-free environments. Multi-element, multi-aperture GPS/A systems with large baselines (D) between each element, where $D > \lambda$ and $\lambda$ is the wavelenght of the lowest frequency of interest, determine the AOA via phase interferometry. Phase interferometry relates to measuring the phase/time difference of arrival of the same signal received by two different and distinct antenna elements (apertures). However, most small platforms cannot accommodate large baselines or more than one GPS antenna. Platform attitude for a single-axis can be determined with a single-aperture non-spinning antenna from calibrated satellite signal-to-noise ratios [Axelrad-1999]. Alternative single-aperture attitude systems require the antenna to be spinning at a known rate [Psiaki-2001] or traveling with a non-zero velocity [U.S. Pat. No. 6,580,389 B2]. A novel GPS/A sensor described in U.S. Pat. No. 5,461,387 requires a single-aperture multimode direction-finding antenna with three or more arms (elements) and an analog mode-forming network comprising phase shifters and hybrid combiners but does not provide simultaneous anti-jam GPS capability.

Attitude estimation is especially challenging for spinning platforms such as spin-stabilized munitions and spacecraft primarily because existing low-cost gyroscope technology has difficulty in tracking rotation rates in excess of 360°/s (1 Hz). In general, small spin-stabilized munitions and space vehicles cannot support large-baseline multi-aperture GPS/A systems. Such systems are usually limited to a maximum dimension of less than 5 inches or less than seven-tenths of one GPS signal wavelength ($D < 0.7\lambda$). In addition, existing GPS/A antenna systems for spinning platforms (such as munitions) are only able to measure the roll angle using GPS, but not the yaw or pitch [Doty-2003]. These systems rely on the modulation of the received signal due to the rotation to track the spin rate and roll angle, and are incapable of determining the roll angle for non-spinning platforms. Furthermore, due to an increase in the relative phase noise, multi-aperture phase interferometric systems do not work well when the antenna elements are in such close proximity. In contrast to phase-interferometry systems, the AOA and attitude accuracy of single- and multi-aperture monopulse DF systems rely on the purity of the DF antenna modes (lobes), not on the baseline length.

The AOA of an RF signal can be obtained through either monopulse or sequential direction-finding systems that are either active or passive; the use of interferometric systems; or adaptive array processing techniques, which are computationally very expensive. A direction-finding system comprises one or more antennas or antenna elements and a receiver such that the azimuth and/or the elevation angle of an incoming signal can be determined. Direction-finding systems use either scalar or vector processing to determine the AOA of a signal. Scalar systems work with either the amplitude or phase of a signal while vector systems work with both amplitude and phase. The receiver of a DF system can be either monopulse or sequential and may have one or more RF channels. Monopulse DF is also referred to as simultaneous lobing or simultaneous lobe (mode) comparison. Single-channel systems, such as that of U.S. Pat. No. 5,461,387, either use a rotating antenna element or sequentially switch between two or more antenna outputs. In general, however, AOA information is obtained by comparing the amplitude and/or the phase of two or more RF channels (modes/lobes). Amplitude-comparison systems measure the relative amplitude of two or more channels to determine the AOA while phase-comparison systems measure the relative phase between channels. Monopulse amplitude-comparison systems usually rely on beam- or pattern-forming networks that generate at least two beams (lobes) from at least two DF modes to obtain AOA measurements. Single-aperture spiral antennas are well known for their two-channel DF capability [Deschamps-1971]. Single-element circular patch antennas have also been shown to be capable of supporting two or more direction-finding modes [Huang-1984].

Hybrid systems that measure both relative amplitude and phase are referred to as amplitude-phase-comparison systems. The comparison takes place either simultaneously (monopulse), or sequentially. Monopulse (simultaneous lobe comparison) systems are more robust because they eliminate the effects of emitter phase and amplitude variations as a function of time and are less susceptible to electronic counter measures (ECM). Depending on the application, DF systems measure either the elevation ($\theta$) or azimuth ($\phi$) angle-of-arrival, or both. A detailed analysis of DF systems can be found in [Bullock-1971], [Kennedy-1984] and [Lipsky-1987].

The location of an emitter is generally determined by triangulation of simultaneous (or near-simultaneous) AOA measurements from multiple DF systems that are spatially diverse, or through multiple AOA measurements from a moving DF system [Grossman-1991], [Blackman-1999], [Ezal-2004]. In order to determine the location of an emitter it is also necessary to know the position of the DF sensor for each AOA measurement. For GPS-based attitude systems, the emitter (satellite) locations are obtained through standard processing of the GPS signal which contains a navigation message with satellite ephemeris and almanac information [Kaplan-2005], [Parkinson-1996].

Unfortunately, intentional and unintentional interference is a common problem in the field of wireless communications, and GPS is no exception. When the desired signal arrives along a reflected path it too can behave like an interference signal. This is often referred to as multipath or coherent interference, which can lead to partial cancellation of the signal strength and result in signal fade or dropout. Signals unrelated to the desired signal are referred to as incoherent interference and can be either broadband or narrowband. In the case of digital communications, both coherent and incoherent interference can lead to unacceptable bit error rates (BERs), loss of signal lock, or a corruption of the information or message in the desired signal.

The most common methods of interference rejection are beam steering, null steering, signal cancellation, polarization filtering, frequency incision, tapped-delay lines, and adaptive signal processing [Compton-1988], [Ghose-1996]. Most of these techniques require multi-element multi-aperture antennas or phased arrays to successfully eliminate interfering signals. Array-based systems are capable of providing both interference rejection and the AOA of the interfering signals. Interference suppression in conventional adaptive array systems is achieved by summing the complex weighted outputs from two or more antenna elements. A processor determines a complex weight or set of weights for each output signal. If the weights are chosen correctly, the effective power of the interference in the final output will be significantly reduced and the desired signal strength will be enhanced. This approach to interference mitigation is performed solely within an electronic package that has two or more antenna input ports. Each such port is connected to an antenna element via an RF (radio- or carrier-frequency) transmission line of some type. The antenna elements are designed to have coverage that is as broad as possible but are offset from each other in position and/or orientation. These offsets have to be large enough so that there are sufficient signal phase differences among the individual element outputs. The processor uses these phase differences to advantage in determining the appropriate weights. For adequate spatial filtering, element separations ranging from 0.3 to 0.5 carrier wavelengths are required, which is often too large for many small platforms. A good description of interference mitigation techniques can be found in [Ghose-1996].

Although there are numerous GPS receiver systems, with and without GPS-based attitude, and with and without anti-jam capabilities, there is no single navigation system that provides GPS-based position and velocity, AJ GPS, GPS-based attitude measurements, and direction-finding capability in a small form-factor with a single-aperture multimode antenna. For example, U.S. Pat. No. 5,461,387 describes a single aperture GPS-based position and direction-finding instrument that is unable to provide anti-jam GPS protection. Moreover, it requires an analog mode-forming feed network, and the use of Modes 1 and 2 of a direction-finding multi-mode antenna with at least three arms. Mode 2 of a spiral with three or more arms requires the circumference of the antenna to be at least two wavelengths [Mosko-1984]. Since the L1 GPS wavelength ($\lambda$) in air is approximately 19 cm, the antenna aperture needs to be at least 115 cm$^2$ and requires a minimum diameter of 12.1 cm (0.64$\lambda$), which is far too large for many applications. In practice the four-arm spiral diameter needs to be approximately 15 cm (~0.78$\lambda$) to efficiently support Mode 2. One possible solution to this problem is to use a two-arm spiral, which does not require as large an aperture. However, it has long been believed that direction-finding is not practical with two-arm spirals. For example, U.S. Pat. No. 4,630,064 states that "a two-arm spiral antenna is impractical for direction of arrival sensing and multipolar operation" [Andrews et al, column 1, line 65].

There are at least two traditional reasons against the use of two-arm spirals for direction-finding. First, Mode 0 is difficult to excite. Second, the mode patterns of spirals with three or more arms have tended to be more symmetric and therefore more accurate for direction-finding applications than two-arm spirals. This is because current single-aperture n-mode direction-finding antennas, such as spirals, have n-fold cylindrical (rotational) symmetry which significantly limits their useful operating range to less than 60° about their boresight, or 50% of a hemisphere, and in most cases to less than 30° about their boresight, or only 13.4% of a hemisphere. For example, a four-arm spiral antenna has four-fold cylindrical (rotational) symmetry and, hence, the complex gain pattern repeats four times about its boresight. This makes it difficult to uniquely identify the angle-of-arrival from measurements.

In contrast to U.S. Pat. No. 5,461,387, U.S. Pat. No. 7,577,464 describes a single-aperture anti-jam GPS antenna system with direction-finding capability. However, although the system described by U.S. Pat. No. 7,577,464 does have DF capability from which GPS-based attitude measurements can be obtained, the system is unable to provide anti-jam GPS protection while simultaneously obtaining GPS-based attitude measurements. This is due to the fact that U.S. Pat. No.

7,577,464 provides anti-jam GPS protection by varying controllable loads located within the antenna aperture, thus changing the properties of the antenna modes. Since monopulse direction finding requires stable or at least known antenna modes/patterns, it is not possible to provide protection against sources of interference while simultaneously obtaining direction-finding measurements with the design provided by U.S. Pat. No. 7,577,464.

In summary, some major drawbacks of known radio-navigation systems that provide platform position, velocity, attitude, and time (PVAT) estimates are:

Simultaneous interference rejection capability and 3-D attitude measurements (roll, pitch and yaw) are provided by very large (D>>0.7λ) multi-aperture antenna arrays;

Phase interferometry-based 3-D GPS/A systems require large baselines (D>0.7λ) and the required total antenna aperture is unacceptably large for many applications;

Single-aperture satellite-based navigation systems are unable to provide PVAT estimates while simultaneously providing protection against sources of interference;

Single-aperture multimode direction-finding antennas have a limited operational field-of-view for accurate angle-of-arrival measurements;

Single-aperture multimode direction-finding antennas require an analog mode-forming network, which increases hardware costs and the size and weight of the system;

Radio-based navigation receivers capable of 3-D attitude-determination rely on phase-interferometry methods or sequential sampling of direction-finding antenna modes; and Single-aperture and multi-aperture GPS/A systems can only provide roll angle measurements for small (D<0.7λ) spinning platforms, and are incapable of providing roll, pitch or yaw angle measurements for non-spinning platforms.

INTRODUCTORY DEFINITIONS

Radio-based navigation systems require either single-element or multi-element antennas for receiving RF signals. A multi-element antenna includes at least two antenna elements. An antenna element comprises a single driven element and associated parasitic elements, if any, and parasitic loads, if any. A driven element is a radiating element that has at least one RF feed. A radiating element is defined as the smallest possible subcomponent of an antenna that can receive and/or radiate electromagnetic (EM) energy on its own. An element that radiates without an RF feed is referred to as a parasitic element [IEEE Std 145-1993]. A non-radiating subcomponent without an RF feed is called a parasitic load. Parasitic loads can be either active or passive and may comprise resistive and/or reactive components, and may be controlled.

A single-element antenna is by definition a single aperture system. However, a multi-element antenna can be classified as either a single-aperture or a multi-aperture system. A traditional array antenna [IEEE Std 145-1993] with n identical antenna elements in a regular arrangement achieved by simple translations is an example of a multi-aperture system. However, although an n-arm spiral can be considered to be an array of n identical antenna elements (arms) in a regular arrangement achieved through simple rotations, it is also a single-aperture system with an array of n cylindrically (rotationally) symmetric antenna elements (arms).

Whether an antenna is a single-aperture or a multi-aperture system is determined herein by its physical structure, and specifically a projection of the antenna elements onto a plane surface on or near the antenna "perpendicular to the direction of maximum radiation, through which the major part of the radiation passes" [IEEE Std 145-1993]. The area defined by the projection for antenna element $X_j$ is defined as its radiating aperture $A_j(X_j)$. The radiating aperture will henceforth be referred to simply as aperture. The aperture of the jth antenna element can be precisely specified by the projection of its convex hull $H_j(X_j)$ onto said plane surface: $A_j(X_j)=\text{proj}(H_j(X_j))$. In simple terms, the convex hull is the region defined by a hypothetical rubber band (or rubber surface) that physically stretches over and encloses the entire antenna element. Mathematically, it is $$H_j(X_j) = \left\{ \sum_{i=1}^{k} \alpha_i x_i \,\middle|\, x_i \in X_j, \alpha_i \in \Re, \alpha_i \geq 0, \sum_{i=1}^{k} \alpha_i = 1, k = 1, 2, \ldots \right\} \quad (1)$$

where $X_j$ is the set of all points contained by the jth antenna element. An n-element antenna is defined to be a multi-aperture system if the area of the intersection of the apertures of all antenna elements is less than the area of the smallest aperture:

$$\|A_1(X_1) \cap \ldots \cap A_n(X_n)\| < \min\{\|A_1(X_1)\|, \ldots, \|A_n(X_n)\|\}. \quad (2)$$

Otherwise, it is a single-aperture system.

BRIEF SUMMARY

The present exemplary embodiments provide a small, single-aperture, multimode, direction-finding, controlled receive-pattern antenna (CRPA) and a direction-finding (DF) radio-navigation receiver system for simultaneous interference rejection and position, velocity, time, and attitude-determination.

A novel DF antenna design improves the gain and phase symmetry of rotationally symmetric, single-aperture, multimode direction-finding antennas, which leads to accurate angle-of-arrival (AOA) measurements over the entire hemisphere and, thereby, attitude-determination performance.

The DF radio-navigation receiver provides an adaptive capability for mitigating the adverse impacts of interference on radio-based navigation systems while simultaneously providing platform position, velocity, 3-D attitude and time (PVAT) estimates that are drift-free and insensitive to temperature variations. In contrast to existing multi-aperture GPS-based attitude (GPS/A) sensors, the present exemplary embodiment relies on monopulse DF (simultaneous lobing) techniques instead of interferometry for determining attitude. Unlike phase interferometry, monopulse direction finding relies on the properties of the antenna patterns to determine the signal AOA. The accuracy of an interferometer-based system depends on the length of the baseline while the accuracy of monopulse DF depends on the known antenna patterns. Like (multi-aperture) array antennas, the DF receiver system can enhance the jammer-to-signal (NS) tolerance of the receiver through beam forming and null steering while simultaneously measuring the angle-of-arrival of an emitter. Alternatively, if no jamming is present, the signal-to-noise ratio (SNR) of each GPS signal can be improved (enhanced) by appropriately weighting and summing each antenna input signal. If the emitter position is unknown the AOA measurement can be used to estimate the position of the signal source. As described in U.S. Pat. No. 7,577,464, a closed-loop AOA estimation process that refines the AOA estimates based on the platform dynamics can also be used to geolocate the unknown position of an emitter and improve AOA measurement accuracy. If the emitter position is known (as it is with GPS) the AOA measurement can be used to determine the platform attitude.

The novel direction-finding radio-navigation receiver accepts inputs from any DF antenna with at least two feed ports that is capable of supporting at least two rotationally symmetric DF antenna modes. Some novel advantages of the exemplary embodiments are:

- A compact single-aperture multimode direction-finding and anti-jam antenna with improved angle-of-arrival measurement accuracy over an entire hemisphere;
- A compact single-aperture multimode direction-finding and anti-jam antenna with a 50% larger operational region compared to existing single-aperture DF antennas;
- No requirement for an analog mode-forming network for multimode DF antennas, thus eliminating bulky hybrid couplers and phase shifters;
- Permits direct manipulation of radio-based navigation signals from each antenna feed, or equivalently, of each antenna mode of a multimode DF antenna for interference rejection and adaptive beam forming;
- A radio-based attitude determining receiver architecture with a reduced number of code- and carrier-tracking loops for measuring position, velocity, attitude, and time using a multimode direction-finding antenna;
- A radio-based DF navigation receiver capable of providing 3-D attitude measurements for small spinning and non-spinning platforms using a DF antenna having at least two rotationally symmetric DF modes;
- Simultaneous adaptive beam forming and radio-based 3-D attitude measurement capability with a small single-aperture or multi-aperture DF antenna;
- Significant improvement in system robustness and attitude accuracy when the radio-based navigation system is coupled with low-cost gyroscopes, magnetometers, and alternative sensors; and
- Significant improvement in system robustness and navigation accuracy when the radio-based navigation system is coupled with the platform guidance and control.

BRIEF DESCRIPTION OF THE DRAWINGS

FIG. 5 specifies the relative phasing required between successive arms of an n-arm spiral antenna in order to support Mode m=0, 1, ..., n−1.

DETAILED DESCRIPTION OF EXEMPLARY EMBODIMENTS

Figure 1:
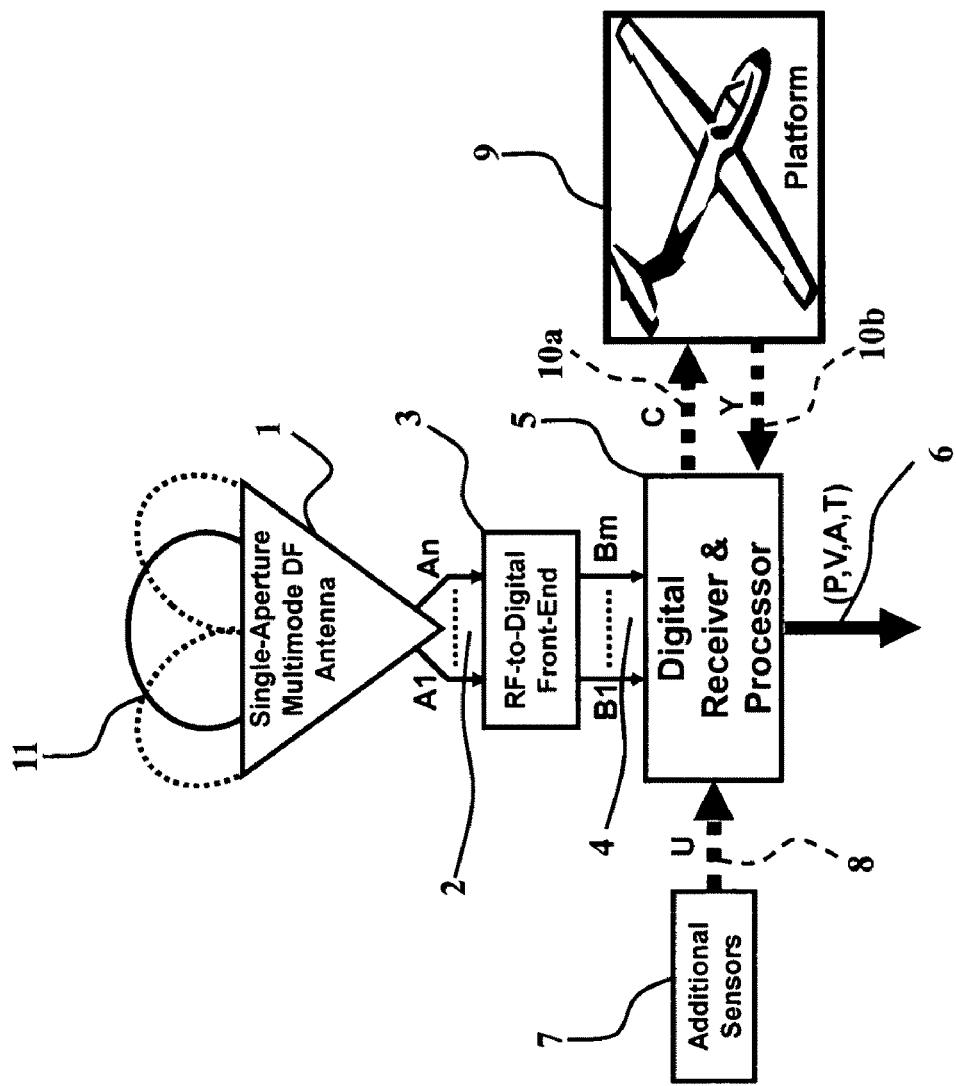
FIG. 1 is a block diagram showing components of the radio-based direction-finding navigation system capable of simultaneous interference rejection while providing position, velocity, attitude and time (PVAT) estimation using a multimode direction-finding antenna.

Referring now to the drawings, which are intended to illustrate presently preferred exemplary embodiments of the invention only and are not for the purpose of limiting same, a basic block diagram of a radio-based direction-finding navigation system using a multimode direction-finding antenna capable of interference rejection while simultaneously providing position, velocity, attitude, and time measurements is shown in FIG. 1. The main components of the present exemplary embodiment are (a) a multimode direction-finding antenna 1 with at least two feed ports 2 and is capable of supporting at least two spherical antenna modes 11; (b) an RF-to-digital front-end 3 that receives n analog signals from the antenna feed ports 2 and outputs m intermediate-frequency (IF) or baseband digital feed signals 4; and (c) a digital radio receiver and navigation processor 5 which accepts the IF/baseband digital feed signals 4 and outputs position, velocity, attitude, and time estimates 6 while simultaneously providing protection against sources of narrowband and wideband interference. The digital radio receiver and navigation processor is also referred to as a digital electronics receiver module. The system can optionally accept inputs from additional sensors 7 and from the platform 9. Optional connections are shown as dashed arrows.

The present exemplary embodiment improves the angle-of-arrival performance of the multimode direction-finding antenna 1 through the use of a conductive vertical extension of the ground plane about the perimeter of a single-aperture direction-finding antenna. The vertical extension of the ground plane effectively creates a conductive cavity wall, or a "can" about the antenna that improves the pattern symmetry of the spherical antenna modes. Similar performance improvements are obtained by using multiple conductive posts/pins about the antenna perimeter that are connected to the ground plane, but not to the antenna element. A design making simultaneous use of the conducting cavity wall and the conducting posts for improved symmetry is preferred. The specific height of the conductive cavity and/or posts depends on the desired antenna performance characteristics such as symmetry, bandwidth and gain.

The signals from the antenna feed ports 2 (A1, . . . , An) are synchronously down-converted by the RF-to-digital front-end 3 to an intermediate or baseband frequency and sampled. A digital down-converter (DDC) then reduces the signals to baseband. Identical signal path lengths, a common clock and common phased-lock loops for all feed signals will reduce relative magnitude and relative phase errors and improve attitude measurements. The RF-to-digital front-end 3 outputs are a set of digital feed signals at baseband 4. The baseband signals 4 (B1, . . . , Bm) with $n \geq m$ are provided to the radio receiver and navigation processor 5. The radio receiver and navigation processor 5 measures an angle-of-arrival for radio-based navigation signals while simultaneously providing anti-jam protection against both narrowband and wideband interferers and estimating platform position, velocity, attitude and time 6 (PVAT).

Figure 2:
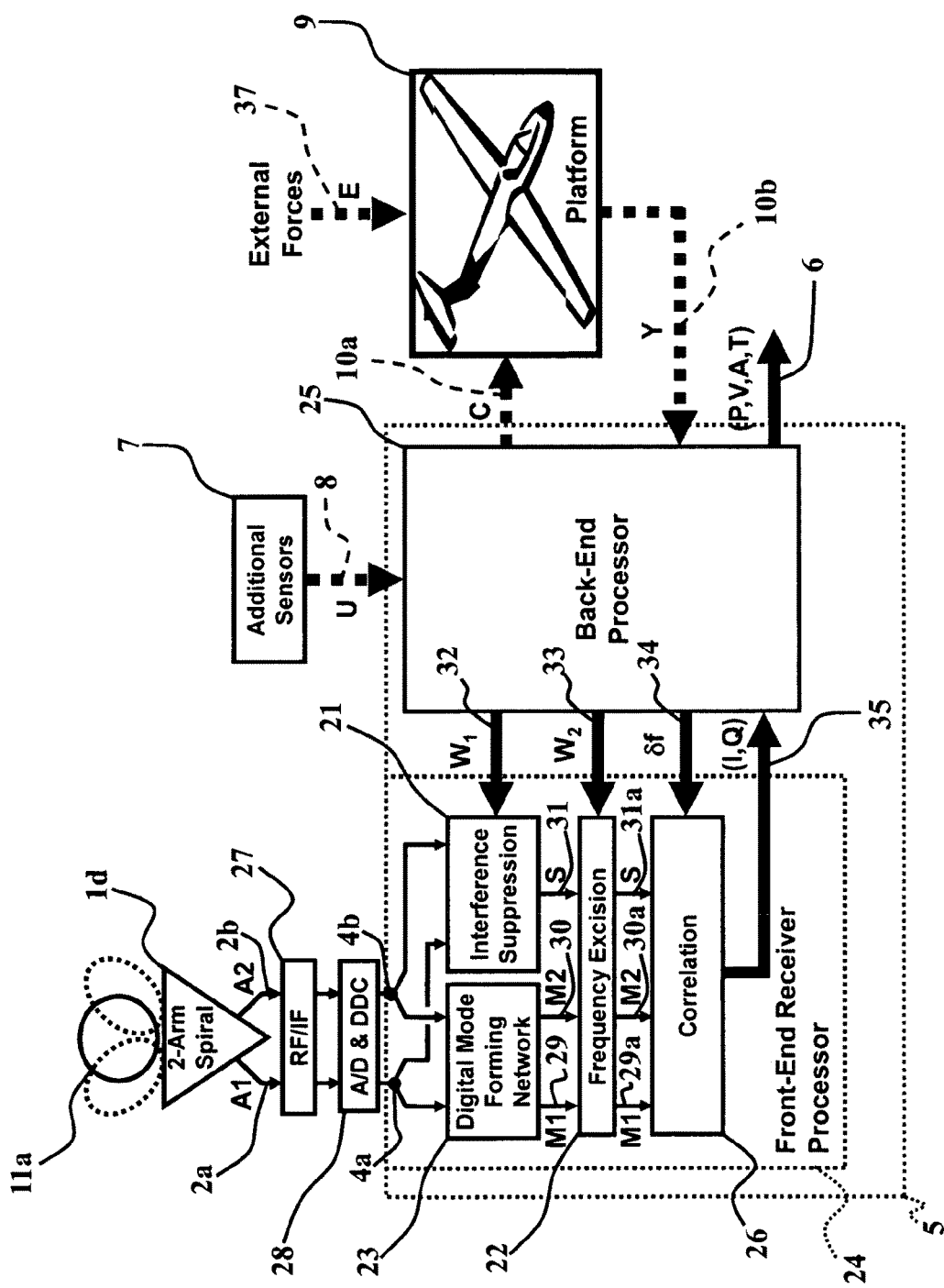
FIG. 2 is a block diagram of the preferred embodiment for a front-end receiver processor that supports simultaneous interference rejection and PVAT estimation with a single-aperture two-arm spiral direction-finding antenna.

An architecture for the digital electronics receiver module (radio receiver and navigation processor) 5 capable of providing protection against sources of interference while simultaneously measuring attitude is shown in FIG. 2. In this preferred embodiment the multimode direction-finding antenna 1 of FIG. 1 is a single-aperture two-arm spiral design 1d. However, from the perspective of the direction-finding receiver, the only requirement on the DF antenna is that it must have at least two feed ports and support at least two rotationally-symmetric direction-finding modes. In fact, the antenna can be a single- or multi-aperture design comprising one or more driven elements. An example of a single-aperture single-element DF antenna is the circular patch [Huang-1984].

Synchronously down-converted digital feed signals at baseband 4a and 4b from each antenna arm are provided to a digital mode-forming network (DMFN) 23 and an interference suppression module (ISM) 21 embedded within a front-end receiver processor 24. The purpose of the front-end receiver processor 24 is to provide protection against broadband and narrowband interference and to acquire and track select RF signals-of-interest. For GPS-based satellite navigation systems each GPS satellite signal is an RF signal-of-interest. In addition, the front-end receiver processor 24 outputs basic in-phase (I) and quadrature-phase (Q) measurements 35 derived from the digital feed (baseband) signals 4a and 4b to a back-end processor 25.

Embedded within the front-end receiver processor 24 the digital mode-forming network 23 outputs a digital Mode 1 signal 29 (M1) and a digital Mode 2 signal 30 (M2) corresponding to the spherical antenna modes 11a of the two-arm spiral DF antenna 1d. For two-arm spirals the terms "Mode 0" and "Mode 2" are equivalent and can be used to interchangeably. The interference suppression module 21 outputs the primary navigation signal 31 (S). While the primary navigation signal 31 (S) is used to estimate platform position, velocity, and time, the relative magnitude and phase of the Mode 1 and Mode 2 signals 29 (M1) and 30 (M2) are used to determine the angle-of-arrival of the signals-of-interest and the antenna attitude [Wahba-1965], [Farrell-1966], [Cohen-1996]. The Mode 1 signal 29 (M1) and the Mode 2 signal 30 (M2), as well as the primary navigation signal 31 (S) are input into a frequency excision module 22 which outputs signals 29a (M1), 30a (M2), and 31a (S). The interference suppression module 21 provides protection against broadband interferers while the frequency excision module 22 provides protection against narrowband interferers. Numerous and well known methods of narrowband and broadband interference suppression techniques exist [Compton-1988], [Ghose-1996] and will not be discussed here in detail. Broadband interference rejection requires forming a spatial null in the direction of the jamming source that is broadband in nature. A complex weight is applied to each feed signal, or equivalently, each mode signal, and the weighted signals are summed to achieve a desired objective, such as maximizing signal-to-interference-plus-noise (SINR), SNR, or simply to minimize noise power. A performance feedback signal 32 ($W_1$), such as bit error rate (BER), SNR, or SINR, is useful (but not necessary) to make certain that the desired objective is obtained without eliminating the signal of interest. The use of a multimode single-aperture DF antenna as an array for broadband interference suppression is novel and highly useful and has not been done prior to the present invention. Narrowband interference rejection requires placing spectral nulls (notch filters)

at the frequencies with interference. Simple fast Fourier transforms (FFT) can be used to achieve this goal by zeroing out frequency bins with too much interference power. The second performance feedback signal 33 ($W_2$) is also optional for narrowband interference suppression. The two performance feedback signals 32 ($W_1$) and 33 ($W_2$) are desirable for maintaining the quality of performance of the system.

Monopulse direction finding and angle-of-arrival determination is possible if the complex ratio of the Mode 1 and Mode 2 signals 29 (M1) and 30 (M2) remains unchanged in magnitude and phase after processing. It is possible to preserve the complex ratio of signals 29 (M1) and 30 (M2) with narrowband frequency excision but not with broadband interference suppression or null/beam steering. This is because broadband interference suppression requires spatial nulling which manipulates the spherical modes of the antenna thereby losing angle-of-arrival information. Therefore, while the Mode 1 and Mode 2 signals 29a (M1) and 30a (M2) do not directly benefit from protection against broadband interference, they are provided direct protection against narrowband interference. However, the Mode 1 and Mode 2 signals 29a (M1) and 30a (M2) can benefit indirectly from the broadband protection provided by the interference suppression module 21 if the primary navigation signal 31a (S) is used to assist in acquiring and tracking the Mode 1 and Mode 2 signals.

The process of acquiring and tracking of signals is accomplished within a correlation module 26 embedded in the front-end receiver processor 24. The purpose of the correlation module 26 is to acquire and track signals-of-interest and to output the basic measurements 35 to the back-end processor 25 for PVAT estimation and navigation. In a GPS-based system the basic measurements 35 are the in-phase (I) and quadrature-phase (Q) signals obtained by removing the carrier and code (and data) from each satellite signal (signals-of-interest). This process is sometimes referred to as carrier-wipeoff and code-wipeoff (and data-wipeoff) and is made possible with knowledge of the received waveform. In order to obtain GPS signal angle-of-arrival measurements the process of carrier-wipeoff and code-wipeoff must also be applied to the Mode 1 and Mode 2 signals 29a (M1) and 30a (M2) in addition to the primary navigation signal 31a (S) for each satellite being tracked. The present exemplary embodiment introduces an correlation architecture which makes it is possible to acquire and track s satellites and obtain attitude measurements with only s acquisition and carrier- and code-tracking loops and a minimal number of mixers and correlators.

The primary purpose of the back-end processor 25 is to properly process the basic measurements 35 in order to estimate and output the platform position, velocity, attitude and time 6 (PVAT). The secondary purpose of the back-end processor 25 is to provide feedback to the front-end receiver processor for improved interference suppression, frequency excision, and coherent correlation. A broadband performance metric signal 32 ($W_1$) and a narrowband performance metric signal 33 ($W_2$) can be fed back to the interference suppression module 21 and the frequency excision module 22 to ensure that the signal-to-interference-plus-noise ratio is being maximized. A vector signal 34 ($\delta f$) is used to assist the correlation process and specifically the carrier- and code-tracking loops with Doppler corrections and/or pseudo-range and pseudo-range rate estimates for each satellite. The architecture shown in FIG. 2 is compatible with traditional GPS receiver designs as well as loosely-coupled, tightly-coupled, and ultra-tightly coupled (UTC) GPS/INS systems. The specific receiver, interference rejection, and navigation algorithms implemented within the front-end receiver processor 24 and the back-end processor 25 are application dependent. The present exemplary embodiment also permits the detection of multi-path when the actual angle-of-arrival of an inbound signal is significantly different from the expected angle-of-arrival.

In summary, an exemplary embodiment provides a compact radio-based direction-finding navigation system capable of offering simultaneous protection against sources of interference while providing position, velocity, attitude, and time measurements with a large operational field-of-view antenna.

Another aspect of the exemplary embodiment is to provide a small single-aperture multimode direction finding antenna requiring as few as two feeds and supporting at least two spherical modes that is capable of being used for simultaneous interference rejection and accurate angle-of-arrival measurements over an entire hemisphere.

The exemplary embodiment also provides protection against sources of interference while simultaneously obtaining accurate attitude measurements over the entire hemisphere using a small single-aperture multimode direction-finding antenna with as few as two feeds that supports at least two spherical antenna modes.

Further objects and advantages of the present invention will become apparent from a consideration of the accompanying drawings and ensuing specification. Although the presently preferred exemplary embodiment relates to GPS-based position and attitude measurements, it is understood that the novel advantages of the exemplary embodiments may also apply to any radio-based navigation system or alternative signals-of-opportunity such as television and radio signals where the positions of the satellites or emitters and signal waveforms are known a priori.

Single-Aperture Multimode Direction-Finding Antenna

Figures 3, 4:
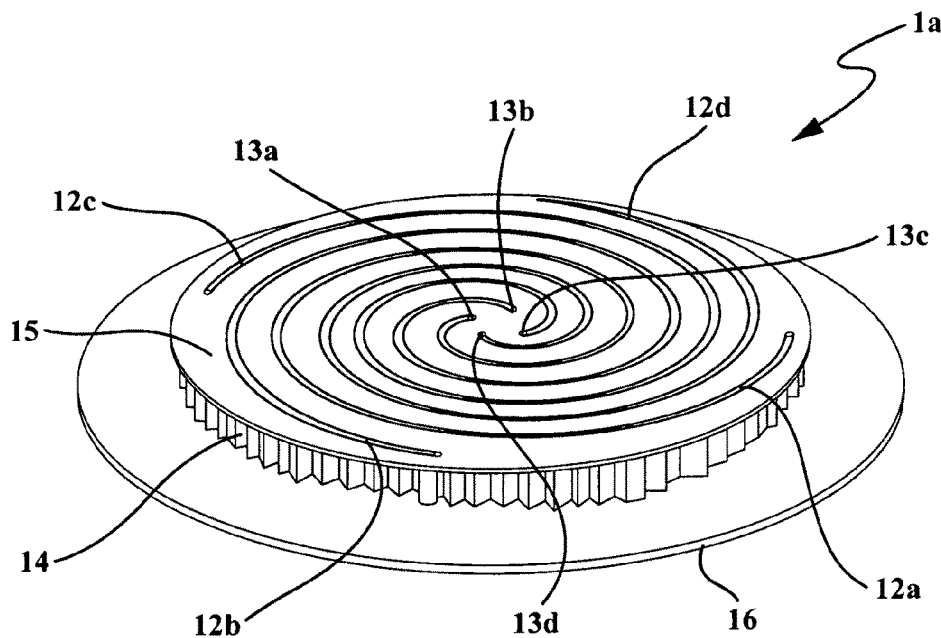
FIG. 3 illustrates the major components of spiral antennas.
FIG. 4 specifies the phasing for Modes 0, 1, 2, and 3 of a four-arm spiral antenna.

An example of the multimode direction-finding antenna 1 is a four-arm spiral antenna 1a shown in FIG. 3 and its planar, conformal, conical or slotted variations such as a square spiral, Archimedean spiral, equiangular spiral, and the logarithmic spiral. Antennas may be cavity-backed or printed microstrip designs with or without a ground plane, and possibly slotted. Other examples of DF antennas include circular patches [Huang-1984], sinuous antennas, multimode horn antennas, and circular arrays of log periodic antennas fed by a Butler matrix. The specific choice of the single-aperture multimode direction-finding antenna depends primarily on the application and the limitations of the antenna platform.

FIG. 3 illustrates the structure of a four-arm Archimedean microstrip spiral antenna 1a which comprises some of the basic components of single-aperture DF antennas including an antenna substrate 15 supporting four conductive arms 12(a-d) and four feeds 13(a-d), as well as a dielectric space 14 between a ground plane 16 and the antenna substrate 15. The counterclockwise direction of the spiral arms is selected to receive primarily right-hand circularly-polarized (RHCP) signals. Left-hand circularly-polarized (LHCP) antennas can be constructed by reversing the direction of the spirals, or by placing the feeds at the outer perimeter of the antenna elements (arms). Simultaneous LHCP and RHCP reception is possible by placing feeds both at the innermost and outermost radii of the antenna arms.

The physical structure of the antenna systems described herein can vary to meet the size and cost constraints of the platform upon which the antenna is placed. The minimum diameter ($d_{min}$) required for n-arm spiral antenna for direction-finding is determined by the maximum mode number $m_{max}$ used, or $$d_{min} = \frac{m_{max}}{\pi\sqrt{\varepsilon_r}}\lambda = \frac{m_{max}}{\pi\sqrt{\varepsilon_r}}\frac{c}{f}, \tag{3}$$

where $m_{max}=1, 2, \ldots, n-1$, $\lambda$ is the wavelength and f is the frequency of the signal of interest. The speed of light is denoted by c and $\in_r$ is the dielectric constant relative to free space. Hence, a two-arm spiral supporting Mode 0 and Mode 1 ($m_{max}=1$) and operating in the L1 band (1575.42 MHz±12 MHz) using a substrate with $\in_r \cong 1$ requires a diameter of at least 6.1 cm (2.4 in). For operation in both the L1 and L2 (1227.6 MHz±12 MHz) frequency bands, a two-arm spiral antenna with a diameter of at least a 7.9 cm (3.1 in) is necessary with $\in_r=1$. Relative to wavelength, $$\frac{d_{min}}{\lambda} \geq \frac{m_{max}}{\pi\sqrt{\varepsilon_r}} \cong 0.32 \text{ for } m_{max}=1 \text{ and } \varepsilon_r=1.$$

Hence, the largest dimension of a two-arm spiral DF antenna need not be any larger than about one-third of a wavelength. In contrast, a four-arm spiral using Mode 1 and Mode 2 ($m_{max}=2$) for direction finding will require at least two-thirds of a wavelength with $$\varepsilon_r=1, \text{ or } \frac{d_{min}}{\lambda} \geq 0.64.$$

While the use of higher dielectrics allows for a smaller antenna diameter for the purposes of impedance matching, the interference rejection and direction-finding performance of the system will be somewhat diminished.

The material used for a printed antenna element may generally be copper, but other conductive materials can also be used. The antenna substrate 15 may generally be of dielectric material such as Duroid® and is normally placed above a conductive panel that forms the ground plane 16. The dielectric space 14 between the antenna substrate 15 upon which the antenna arms 12(*a-d*) are printed and the ground plane 16, if any, may be filled with air or some other material with a higher relative dielectric constant. Given footprint constraints, the microstrip geometry, and the properties of this dielectric material, the height of the element above the ground plane must be chosen to best tune the antenna over the frequencies of interest.

The antenna is electrically connected to the feeds 13(*a-d*), at suitably chosen points on the antenna arms 12(*a-d*). In general, the feeds are electrically connected to ports that are attached to the RF-to-digital front-end electronics 3 prior to the digital radio receiver and navigation processor 5. In traditional designs the RF front-end electronics includes an analog mode-forming network like a Butler matrix [Mosko-1984]. Although the present exemplary embodiment eliminates the analog mode-forming network in favor of a digital mode-forming network, it is clear that it does not need to do so. Furthermore, in the context of the above description, it should be readily understood that while the antenna as described here is in a planar configuration, this antenna could be designed conformally to a convex or concave shape. In this situation, reference to a "plane" or a surface that is "flat" would be generalized to imply simply a continuity of surface, whether curved or flat.

Multimode DF antennas such as the four-arm spiral 1*a* of FIG. 3 provide angle-of-arrival information by measuring the relative gain and/or phase of two or more antenna modes. For example, as shown in FIG. 4, Mode 0 for a four-arm spiral antenna design requires relative phasing of 0° between adjacent arms (i.e. sequentially 0°, 0°, 0°, 0°) while Mode 1 requires 90° (i.e. sequentially 0°, 90°, 180°, 270°) and Mode 2 requires 180° (i.e. sequentially 0°, 180°, 360°, 540°). Generally speaking, and as specified in FIG. 5, Mode m (=0, 1, . . . n−1) for an n-arm spiral antenna is achieved by applying a relative phasing between adjacent arms of 360 m/n degrees prior to summation. Mode 0 in an n-arm spiral design is sometimes referred to as Mode n. Herein the terminology "Mode 0" or "Mode n" is used interchangeably and there is no confusion as long as n is specified. Hence, for our purposes the terms "Mode 0" and "Mode 2" are deemed to be equivalent for two-arm spiral designs. However, Mode 2 for a four-arm spiral antenna should not be confused with Mode 0 of a two-arm spiral antenna as they are not equivalent.

Figure 6:
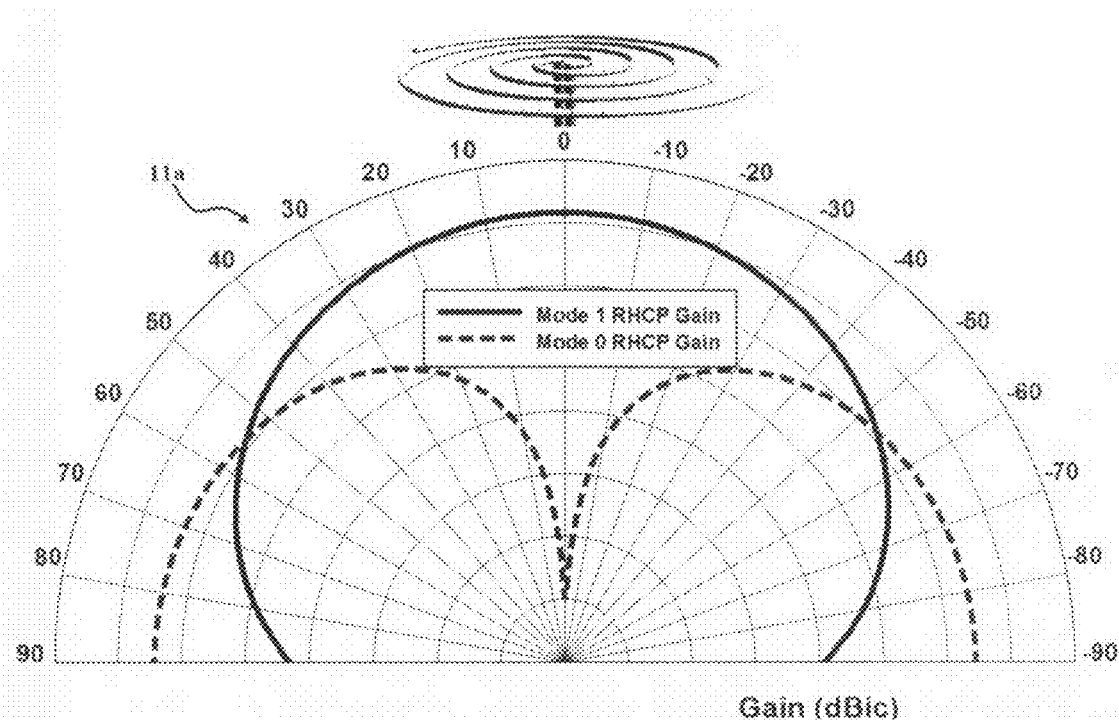
FIG. 6 illustrates the gain patterns for Mode 0 and Mode 1 of a two-arm spiral antenna.
Figure 7:
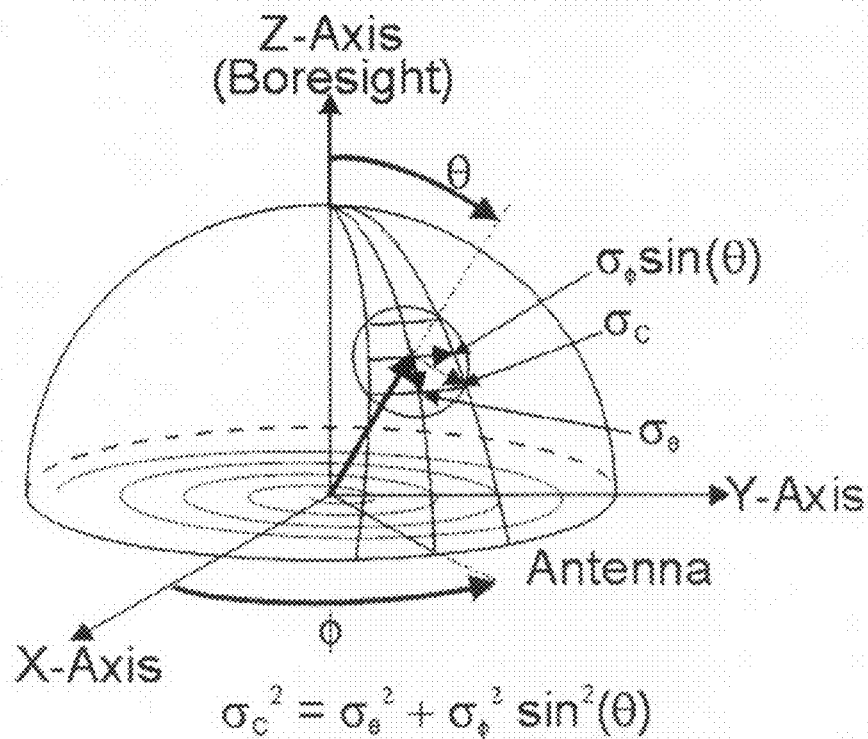
FIG. 7 defines the antenna geometry, the coordinate system and the composite angle error.

FIG. 6 shows the right-hand-circularly-polarized (RHCP) magnitudes 11*a* of Modes 0 and 1 for a two-arm spiral antenna. Elevation angle (θ) is related to the relative magnitudes of two or more modes whereas azimuth angle (φ) is related to the relative phases. Elevation and azimuth angles are defined in polar coordinates by the geometry shown in FIG. 7. The elevation angle (θ≧0) is sometimes referred to as the boresight angle or zenith angle and is defined as the angle difference between the line-of-sight (LOS) vector and the antenna boresight (z-axis). The azimuth is defined in a right-handed sense as the angle (−π<φ≦π) between the x-axis and the projection of the LOS vector on the xy-plane, and is undefined at the antenna boresight θ=0. The angle-of-arrival accuracy of direction-finding antennas can be efficiently described by the composite angle error. The composite angle error is defined as $$\sigma_c^2 = \sigma_\theta^2 + \sin^2(\theta)\sigma_\phi^2, \quad (1)$$

where $\sigma_\theta$ is the one-sigma elevation angle error and $\sigma_\phi$ is the one-sigma azimuth angle error. The composite angle error defines an error cone about the LOS vector and discounts azimuth errors near the boresight where they are undefined. The elevation and azimuth angle errors are usually functions of elevation and azimuth:

$$\sigma_c^2(\theta,\phi) = \sigma_\theta^2(\theta,\phi) + \sin^2(\theta)\sigma_\phi^2(\theta,\phi), \quad (2)$$

Figure 8:
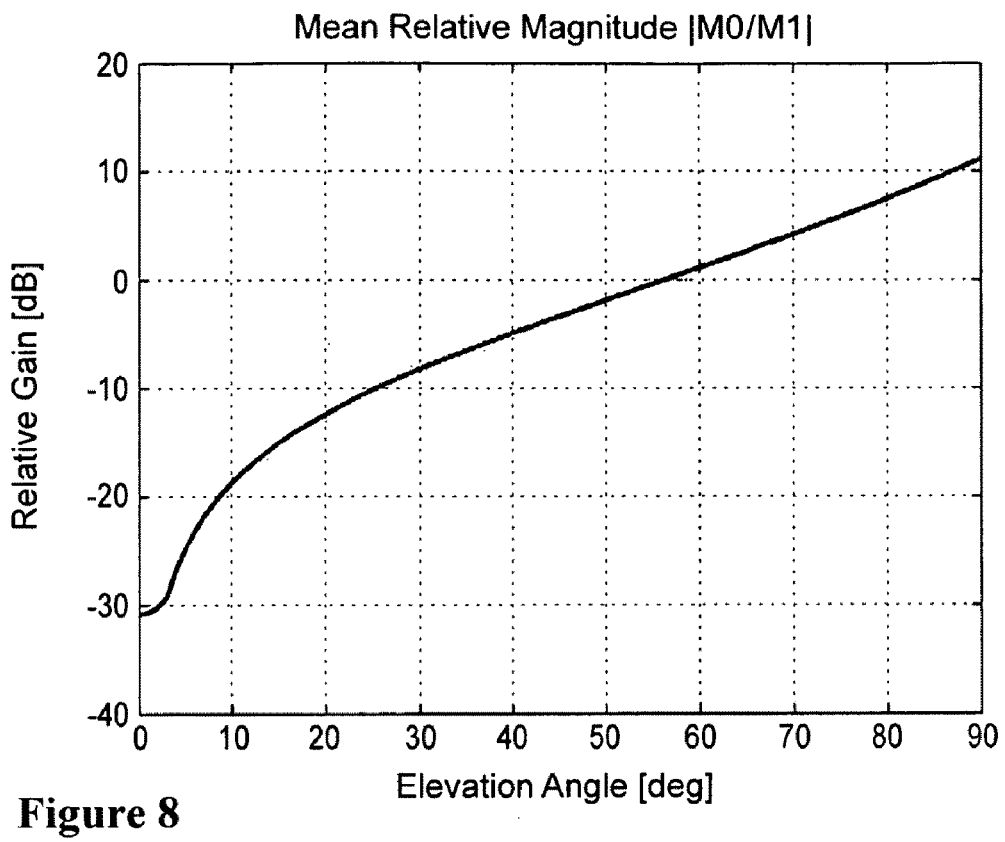
FIG. 8 provides an example of the mean relative magnitude between Mode 0 and Mode 1 of a two-arm spiral antenna as a function of elevation/boresight angle.
Figure 9:
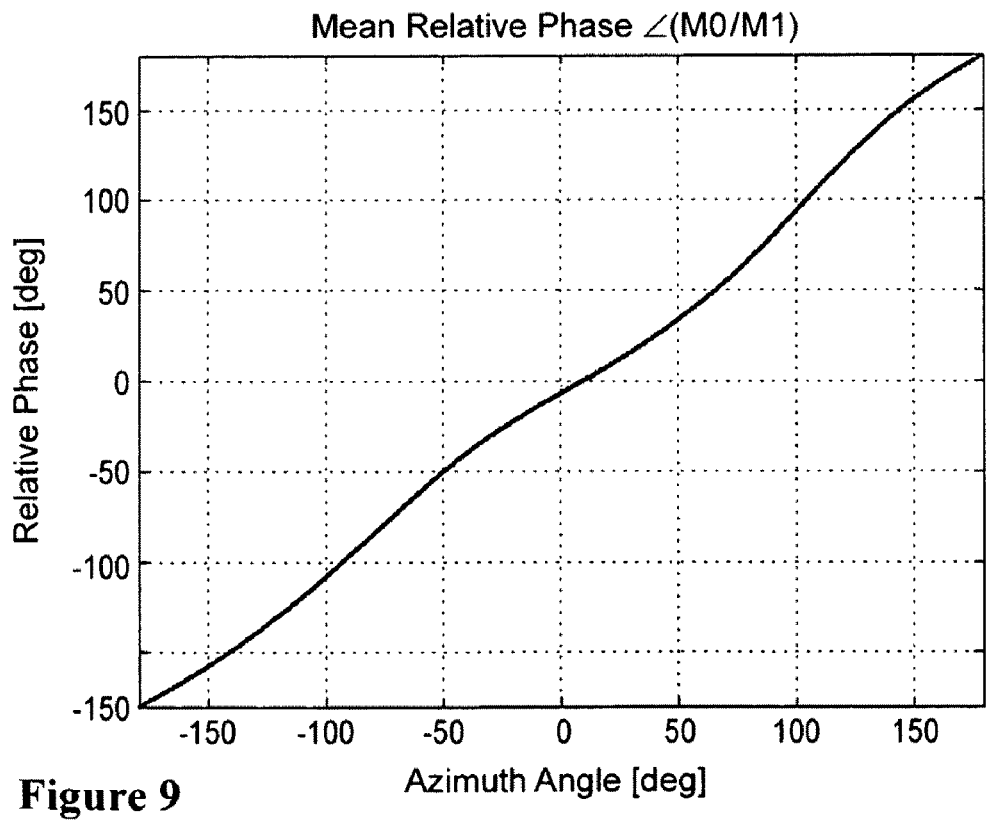
FIG. 9 provides an example of the mean relative phase between Mode 0 and Mode 1 of a two-arm spiral antenna as a function of azimuth angle.

FIG. 8 shows the relationship between elevation angle and the relative magnitude of Mode 0 with respect to Mode 1 of a two-arm spiral antenna. It is clear that a relative gain measurement provides information about the elevation angle. FIG. 9 illustrates the relationship between azimuth angle and relative phase of Mode 0 with respect to Mode 1 for the same antenna. Similarly, it is clear that a relative phase measurement provides information about the azimuth angle. Hence, one can determine the angle-of-arrival of a signal by measuring the relative magnitude and the relative phase between two or more modes and comparing those measurements with known properties of the DF antenna, possibly through the use of table lookups and optimization [U.S. Pat. No. 7,577,464]. An alternative method of determining the angle-of-arrival is through the use of a pattern- or beam-forming network and measuring only the relative magnitude between two or more patterns [Mosko-1996].

Figure 10:
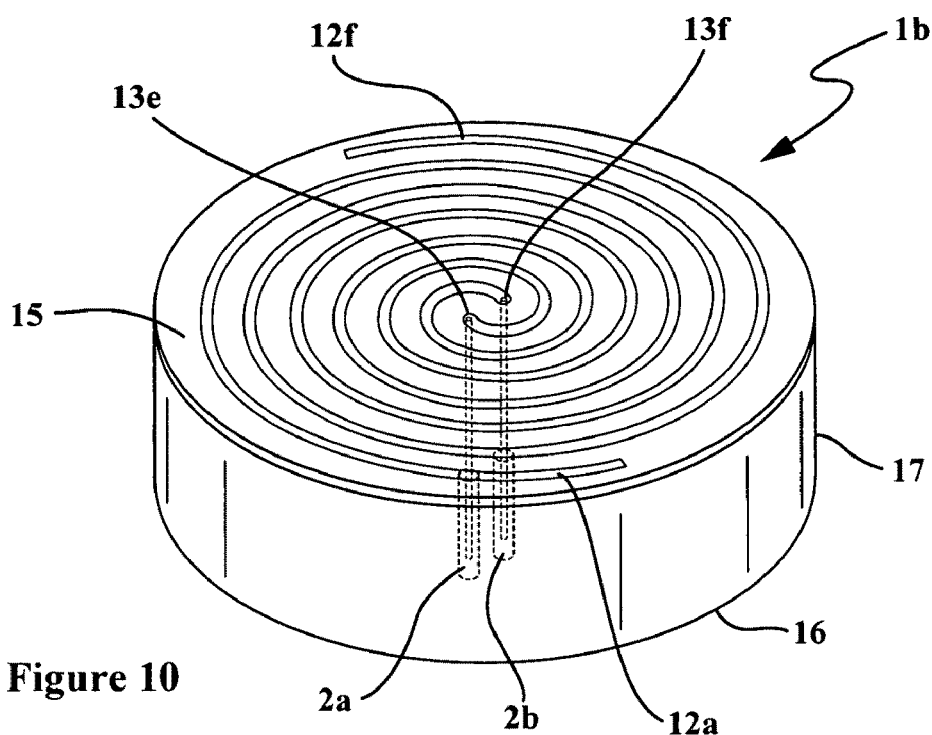
FIG. 10 illustrates a two-arm spiral antenna design with a conductive vertical extension of the ground plane (conductive cavity wall) about the antenna perimeter.

The 3-D attitude (roll, pitch, and yaw/heading) of the antenna can be determined from the angle-of-arrival of two or more signals if the receiving antenna position and the origin of the received signals are known [Wahba-1965, Farrell-1966, Cohen-1996]. U.S. Pat. No. 5,461,387 describes an instrument for determining attitude using Modes 1 and 2 of a spiral antenna with three or more arms (feeds). The present exemplary embodiment differs significantly from the teachings of U.S. Pat. No. 5,461,387 in several ways. For example, in contrast to U.S. Pat. No. 5,461,387, the present exemplary embodiment requires a DF antenna capable of supporting at least two modes, but is not limited to the use of only Mode 1 and Mode 2. Specifically, U.S. Pat. No. 5,461,387 excludes the use of two-arm single-aperture DF antennas capable of supporting Mode 0 and Mode 1, such as the spiral shown in FIG. 10. As mentioned earlier, this is because prior teachings [U.S. Pat. No. 4,630,064, Corzine-1990] indicated that two-arm spiral antennas were inappropriate for direction-finding applications. This is important because as indicated by Equation (3) the circumference of a three- or four-arm spiral antenna capable of supporting Mode 1 and Mode 2 must be at least two wavelengths ($2\lambda$) whereas a two-arm spiral antenna supporting Mode 0 and Mode 1 only requires a circumference of one wavelength ($\lambda$). Hence, the generalization to two-arm spirals reduces the size of the minimum required antenna aperture by 75% and the minimum antenna diameter by 50%, thereby greatly increasing the number of relevant platforms and applications for this system. For example, the minimum required diameter of a spiral antenna at 1575 MHz with air as a substrate is reduced from 12.1 cm to less than 6.1 cm. This miniaturization allows the system to be placed on much smaller platforms such as micro air vehicles (MAVs).

Furthermore, the present exemplary embodiment also permits the use of more than two modes for improved angle-of-arrival and attitude accuracy, which is not taught by U.S. Pat. No. 5,461,387. For example, simultaneous measurements from Mode 0, Mode 1, Mode 2 and Mode 3 of a four-arm spiral antenna can be used for improved angle-of-arrival estimation [Penno-2001]. In addition, the present exemplary embodiment eliminates the need for the analog feed/mode-forming network required by U.S. Pat. No. 5,461,387. Instead, the modes are digitally formed thus eliminating significant hardware and reducing the size and cost of the system. The elimination of the analog mode-forming network is not trivial and requires special care in the antenna design so that each feed port is sufficiently isolated from the rest of the ports. Finally, the present exemplary embodiment introduces a simultaneous interference rejection capability with a single-aperture multimode direction-finding antenna that is not anticipated by U.S. Pat. No. 5,461,387, or any other prior art.

The design of the multimode direction-finding antenna 1 has been improved for better angle-of-arrival accuracy and increased hemispherical coverage. As illustrated with a two-arm spiral antenna 1b design in FIG. 10, the present exemplary embodiment introduces a conductive vertical extension 17 of the ground plane 16 at the antenna perimeter. The conductive vertical extension 17 of the ground plane 16 at the antenna perimeter creates a conducting cavity wall or "can" around the antenna. The height of the conducting cavity wall above the ground plane 16 depends on the desired bandwidth, frequency, and pattern symmetry properties of the antenna. The conductive vertical extension 17 introduces boundary conditions about the antenna which forces the patterns to remain significantly more symmetric about the antenna boresight. Hence, when the feed ports 2a and 2b are connected to a digital or analog mode-forming network, the resulting patterns have significantly less ripple magnitudes near the antenna horizon and at elevation/boresight angles greater than 50°.

Figure 11:
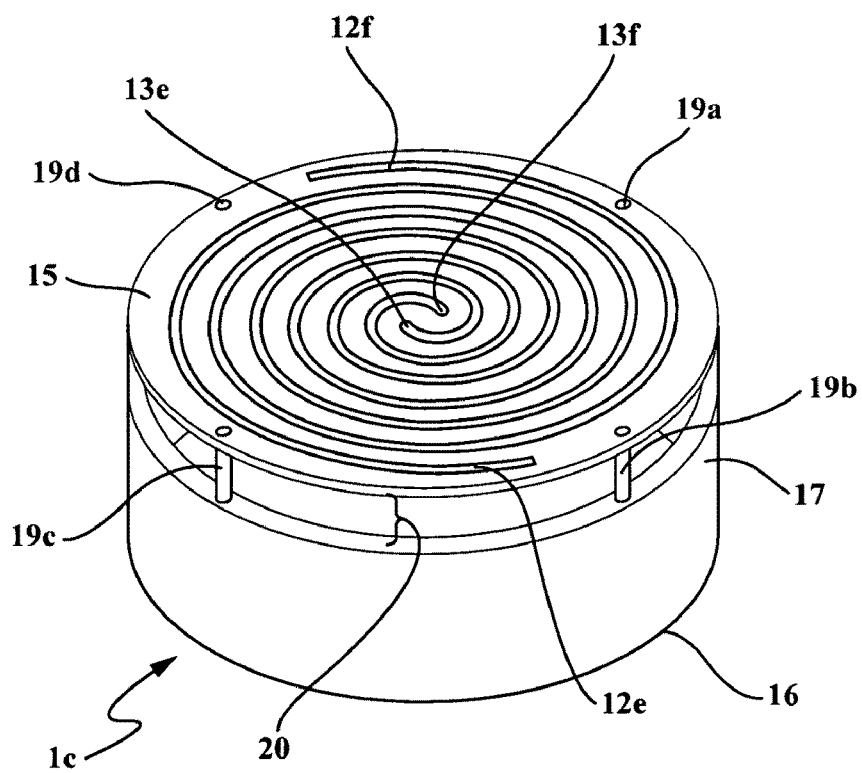
FIG. 11 illustrates a two-arm spiral antenna design with a conductive cavity wall and conductive posts about the antenna perimeter.

As shown in FIG. 11, the conductive vertical extension 17 can be replaced or augmented with conductive posts (pins) 19(a-d), that are electrically connected to the ground plane 16 or the conductive vertical extension 17 at the antenna perimeter. However, the conductive posts (pins) are not electrically connected to the spiral-arms. Often, the height of the conductive vertical extension 17 need not reach the antenna substrate 15. Instead, a dielectric gap 20 between the antenna substrate and the conductive vertical extension 17 may be desired with conductive posts 19(a-d) of height equal to the dielectric gap 20 and electrically connected to the conductive vertical extension 17. The height of the conductive cavity wall 17 and the conductive posts 19(a-d), as well as the number of posts depend on the desired bandwidth, frequency, and pattern symmetry properties of the antenna. For best results, the location of the posts along the antenna perimeter should maintain the rotational symmetry of the antenna. FIG. 11 shows a two-arm spiral antenna 1c with four conductive posts 19(a-d) along the outer perimeter of the antenna. The location of the conductive posts 19(a-d), maintains the two-fold symmetry of the two-arm spiral antenna. In the limit, as the number of posts increases and the gap between them decreases, the design approaches that of a conductive cavity wall equal to the height of the conductive posts.

Figure 12:
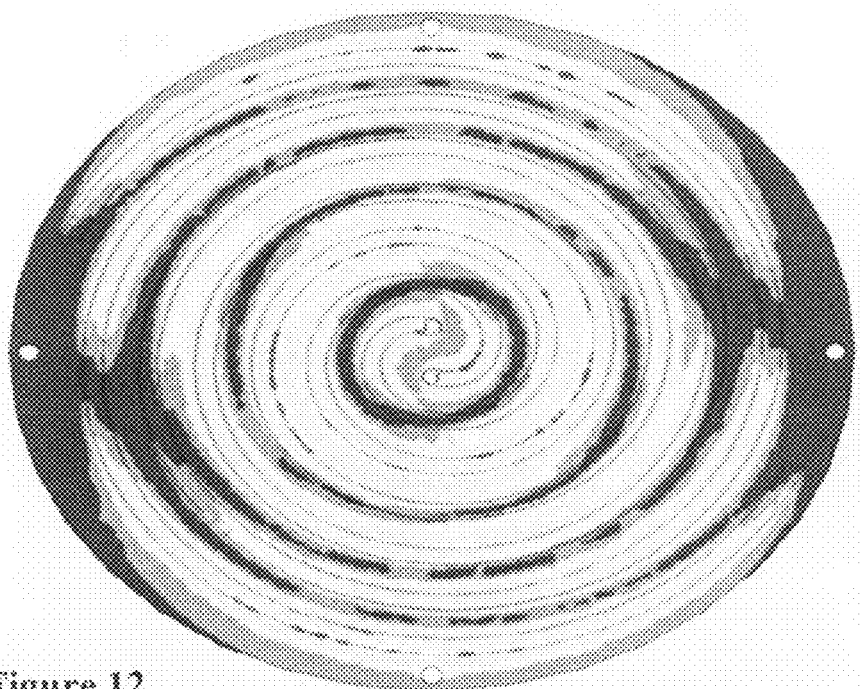
FIG. 12 shows the Mode 1 current distribution for a two-arm spiral with conductive posts and a conductive wall.
Figure 13:
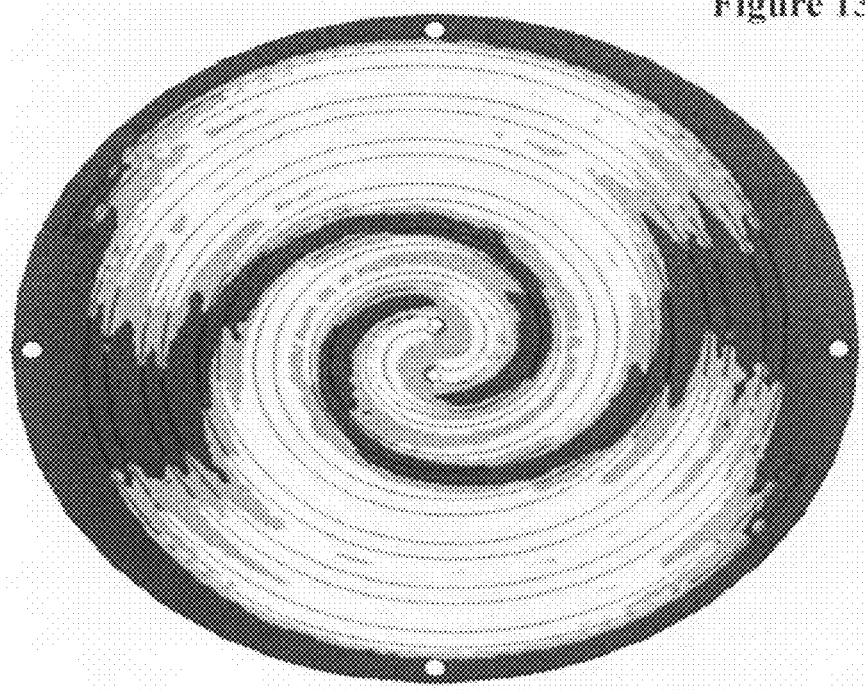
FIG. 13 shows the Mode 0 current distribution for a two-arm spiral with conductive posts and a conductive wall.

Counter to the teachings of U.S. Pat. No. 5,621,422, neither the conductive posts 19(a-d), nor the conductive vertical extension 17 is used to short the spiral arms 12e and 12f, or the antenna feeds 13e and 13f to the ground plane 16. In this manner the simultaneous excitation of Mode 0 and Mode 1 is made possible. U.S. Pat. No. 5,621,422 states that "[t]he shorting mechanisms, a total of four with one on each of the four arms, while enhancing mode-0, do not interfere with the other modes if the shorting mechanisms 62a, 62b [of FIGS. 6A and 6B] are placed outside the radiation zones corresponding with the higher-order spiral modes" [column 10, line 20]. However, U.S. Pat. No. 5,621,422 omits the fact that if it is not possible to place the shorting mechanism "outside the radiation zone" of a higher-order spiral mode, such as Mode 1 for a two-arm spiral with a circumference of about one wavelength, then the shorting mechanisms actually cause a significant degradation of the higher-order mode and, therefore, the direction-finding performance of the antenna. FIG. 12 and FIG. 13 show the Mode 1 and Mode 0 current distributions for a two-arm spiral antenna with four conductive posts and a vertical conducting wall. Needless to say the two modes have significant overlap and the Mode 1 radiation zone includes the outer perimeter of the antenna. Hence, the shorting mechanism suggested by U.S. Pat. No. 5,621,422 is not feasible. In contrast to the present exemplary embodiment, U.S. Pat. No. 5,621,422 also requires the use of an analog mode-forming network prior to the digitization of the received signals.

Figure 14:
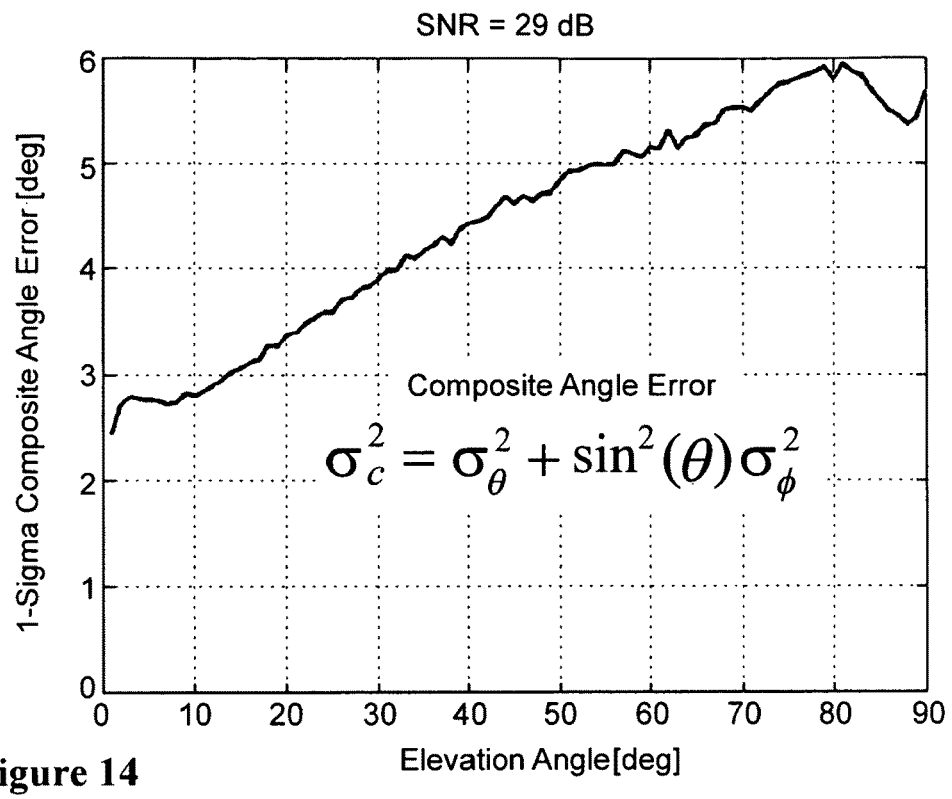
FIG. 14 shows the composite angle error of a two-arm spiral antenna design with a conductive cavity wall and conductive posts.

FIG. 14 shows the composite angle error of a two-arm spiral antenna for a signal-to-noise ratio (SNR) of 29 dB. The performance in FIG. 14 corresponds to a 6.5-cm diameter two-arm spiral design optimized with the conductive vertical extension 17 equal to 71% of the total antenna height and the conductive posts 19(a-d), that extend up to the antenna substrate 15. The conductive vertical extension and posts also provide structural support for the two-arm spiral antenna.

The accuracy of most DF systems degrades beyond a certain point based on the incident geometry of the signal-of-interest. Single-aperture n-mode direction-finding antennas have gain patterns that exhibit n-fold symmetry about their boresight. For constant elevation angle cuts the ripples in their gain patterns repeat n times within a single revolution about the boresight axis, or an azimuthal rotation of 360°. Furthermore, the ripple amplitude increases near the antenna horizon (large elevation angles). Hence, the n-fold repetition in the gain patterns, and the increase in ripple amplitude makes it difficult to obtain good angle-of-arrival accuracy over the entire hemisphere. In fact, the useful operating region of most single-aperture multimode DF antennas is less than 50% of the hemisphere, or elevation angles of less than 60°. Moreover, many DF antennas are only useful for elevation angles of less than 30°, or less than 13.4% of the hemisphere. The introduction of the conductive vertical extension 17 and/or conductive posts 19(a-d), reduces the asymmetry of the antenna patterns and significantly improves the angle-of-arrival/direction-finding performance of the system.

Figure 15:
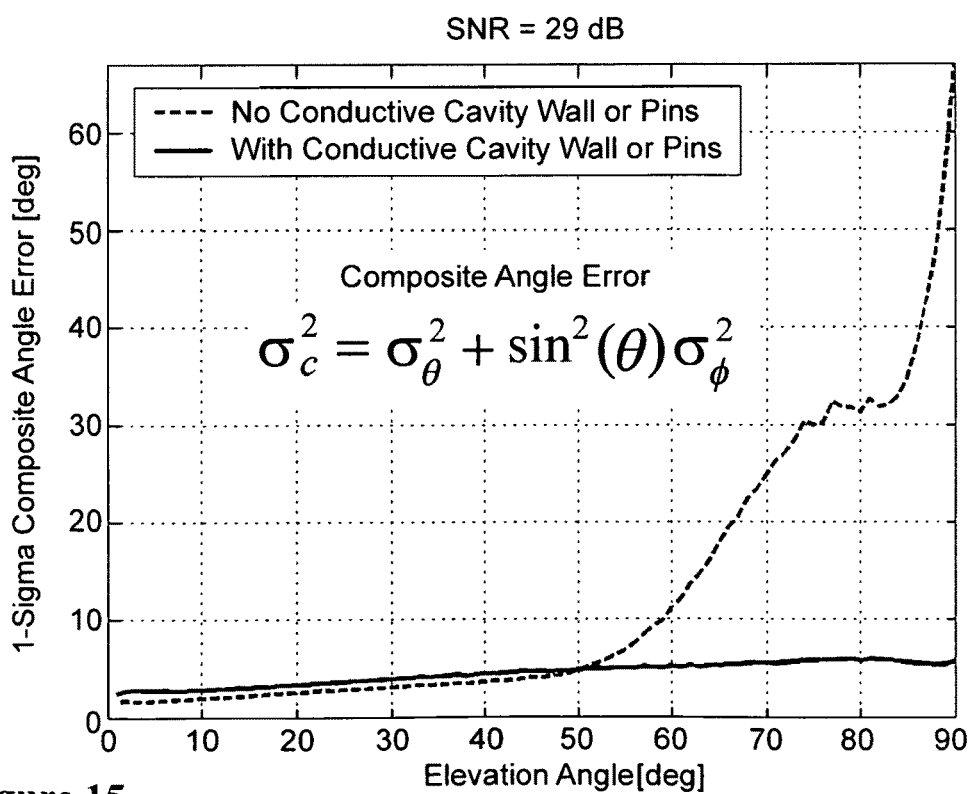
FIG. 15 compares the composite angle errors of a two-arm spiral design with and without conductive cavity walls and conductive posts.

FIG. 15 compares the composite angle error performances of a two-arm spiral design which were optimized with and without a conductive cavity wall or conductive posts. The two designs are otherwise the same size and height. As clearly indicated by FIG. 15 the performance of the antenna with a conductive vertical extension 17 and conductive posts 19(a-d) is significantly better than the antenna missing these features above an elevation angle of 50° and provides good AOA performance for the entire hemisphere. Similar performance improvements were noted for single-aperture DF antennas with a greater number of arms/elements. Hence, the conductive vertical extension 17 of the ground plane 16 along with the conductive posts 19(a-d) at the antenna perimeter improves the angle-of-arrival accuracy of single aperture multimode direction-finding antennas and significantly extends their operational region to the entire hemisphere.

Figure 16:
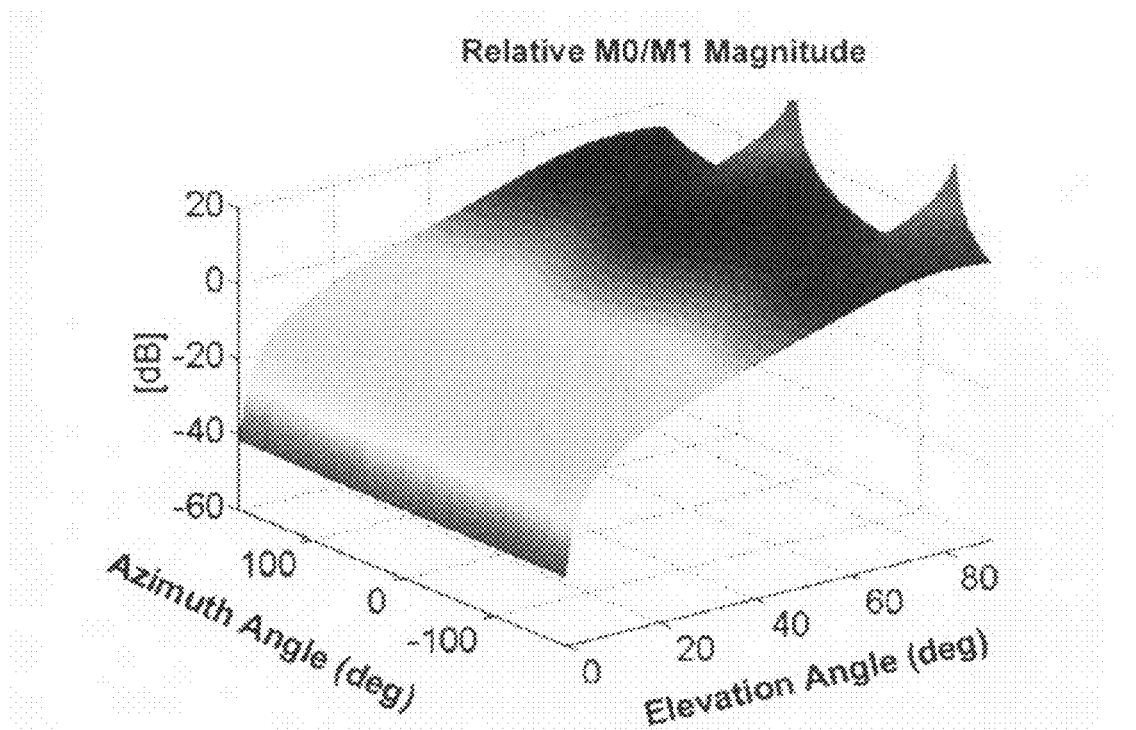
FIGS. 16-17 illustrate the relative magnitude between Mode 0 and Mode 1 for two-arm spiral designs with and without conductive cavity walls and conductive posts.
Figure 17:
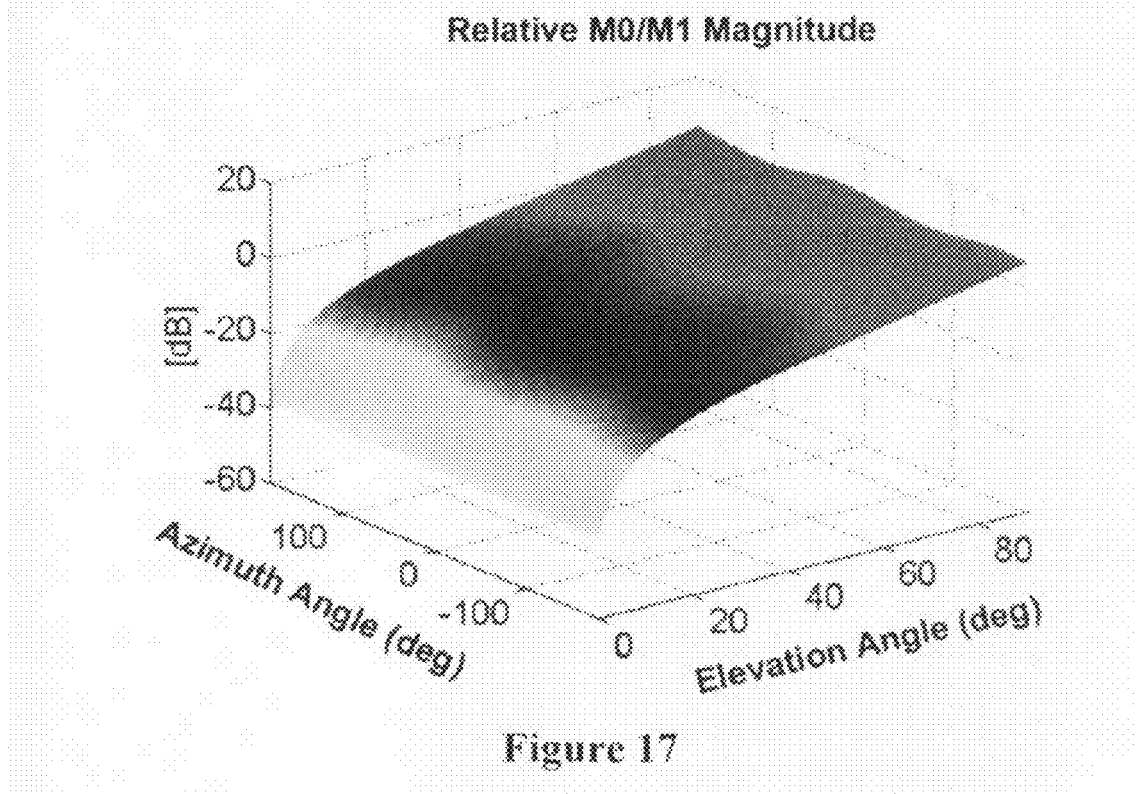
Figure 18:
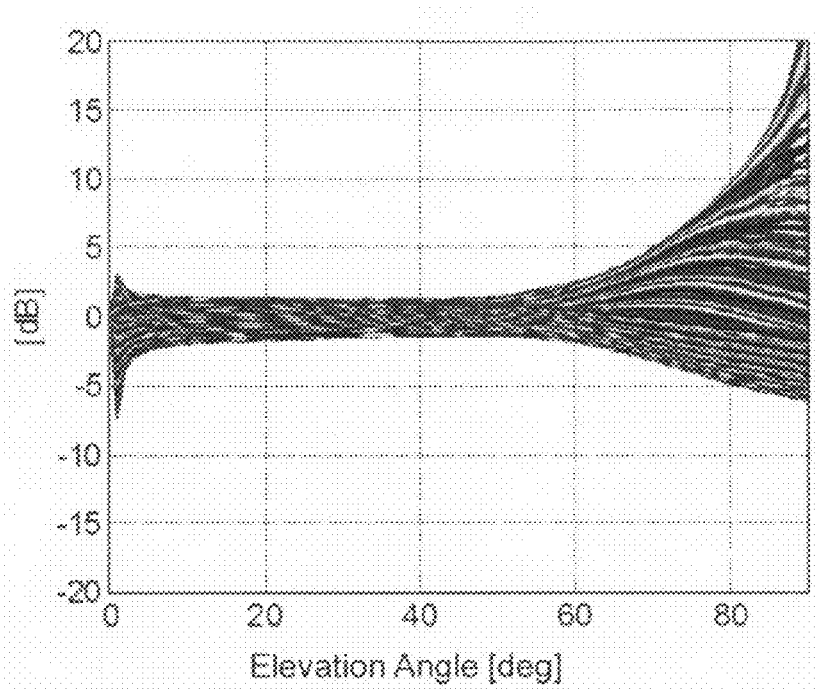
FIGS. 18-19 depict the asymmetry envelope about the mean relative magnitude of two-arm spiral antenna designs with and without conductive cavity walls and conductive posts.
Figure 19:
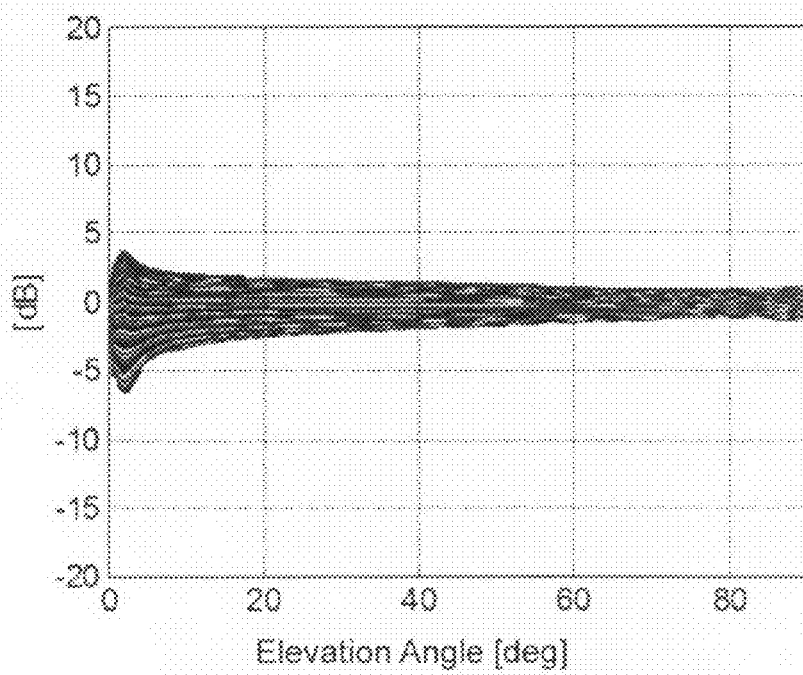

FIG. 16 through FIG. 23 demonstrate the improvements in the pattern symmetry in both magnitude and phase due to the conductive vertical extension of the ground plane, and the conductive posts around the antenna perimeter. FIG. 16 and FIG. 17 show the magnitude of the complex relative gain $M_0/M_1$ between Mode 0 and Mode 1 for a two-arm spiral with and without the conductive posts 19(a-d) or the conductive vertical extension 17 of the ground plane 16. It is clearly apparent from FIG. 16 that there are significant ripples in the magnitude of the relative gain pattern near the antenna horizon, or elevation angles of greater than 60°. The ripple amplitude has been significantly reduced in FIG. 17 with the introduction of the conductive posts 19(a-d) and conductive cavity wall 17. This improvement is further quantified by FIG. 18 and FIG. 19 which show the asymmetry envelope about the mean relative magnitude at each elevation angle for both antennas. In other words, FIG. 18 and FIG. 19 show the azimuthal variation in the magnitude of the relative gain at each elevation angle. As seen in FIG. 18 the asymmetry envelope is about 30 dB at the antenna horizon. That is to say, the variation of the relative magnitude is about 30 dB at the antenna horizon. In contrast, the variation at the horizon is less than 5 dB in FIG. 19. This is an improvement of over 25 dB. The variations shown in FIG. 18 and FIG. 19 near the antenna boresight ($\theta$=0) are primarily due to numerical inaccuracies caused by the null in the Mode 0 antenna pattern and do not significantly contribute to the angle-of-arrival accuracy of the antennas.

Figure 20:
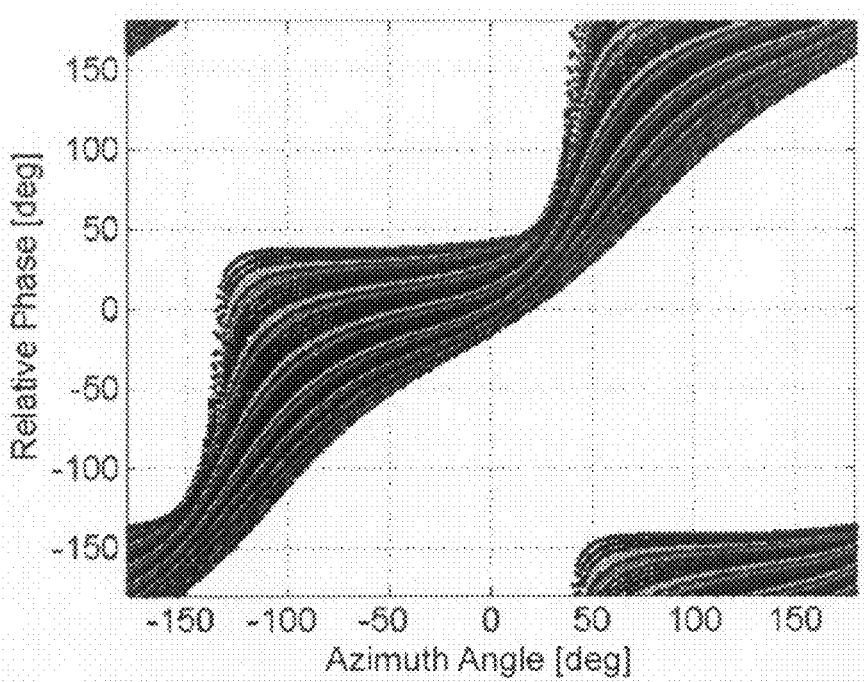
FIGS. 20-21 show the relative phase between Mode 0 and Mode 1 for two-arm spiral designs with and without conductive cavity walls and conductive posts.
Figure 21:
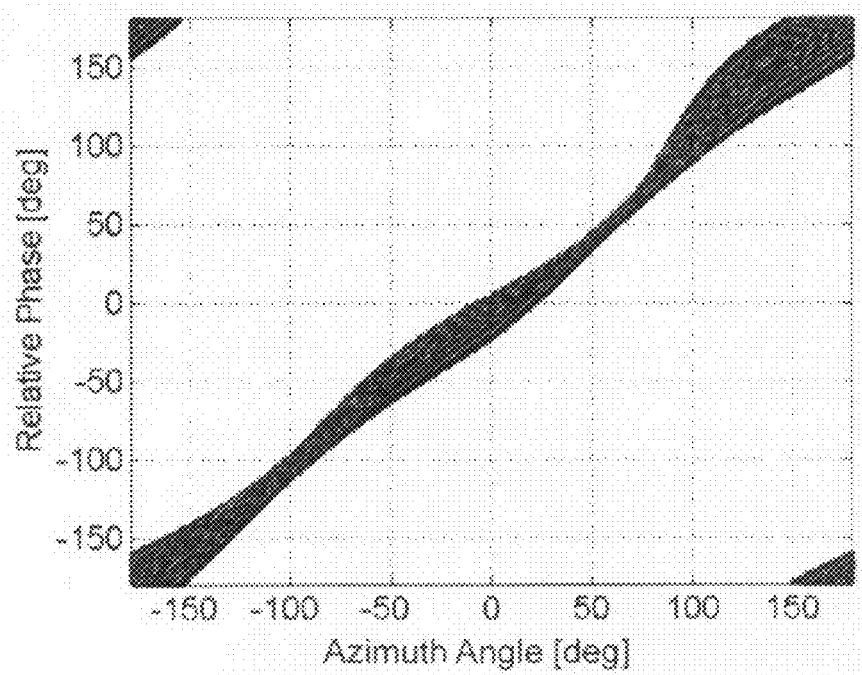
Figure 22:
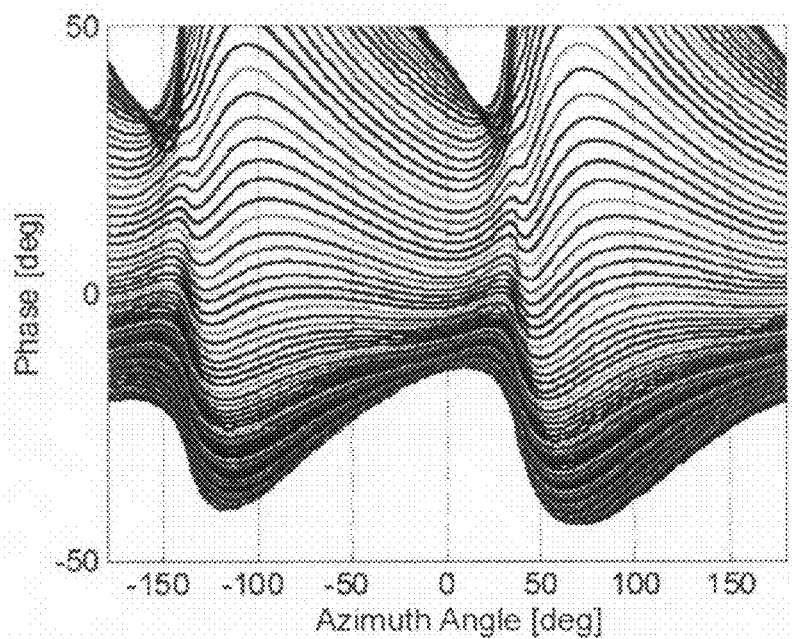
FIGS. 22-23 depict the asymmetry envelope about the mean relative phase of two-arm spiral antenna designs with and without conductive cavity walls and conductive posts.
Figure 23:
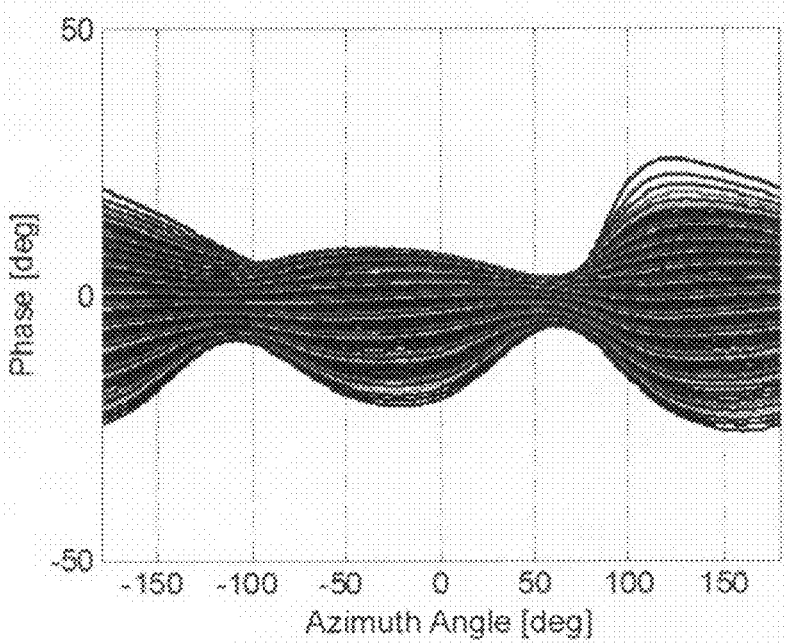

Similar improvements in the relative phase are illustrated in FIG. 20 through FIG. 23. FIG. 20 and FIG. 21 show the phase of the complex relative gain $M_0/M_1$ between Mode 0 and Mode 1 for a two-arm spiral with and without the conductive posts 19(a-d) or the conductive vertical extension 17 of the ground plane 16. Each figure shows the variation in relative phase for all elevation angles as a function of azimuth angle. Ideally we would like this to be a very narrow straight line between −180° and 180°. Clearly the family of curves shown by FIG. 21 is closer to the ideal than those shown by FIG. 20. The difference between these two figures is quantified by FIG. 22 and FIG. 20 which show the phase variation due to elevation angle about the mean relative phase for each azimuth angle. As illustrated by FIG. 22 the maximum peak-to-peak relative phase variation for the traditional two-arm spiral design is about 100°. In contrast, as shown by FIG. 23, the two-arm spiral design with the conductive cavity wall 17 and the conductive posts 19(a-d) has a maximum peak-to-peak variation of 50°, or half the variation of the traditional design.

Finally, as should be clear to those skilled in the art, the symmetry-inducing design innovations introduced herein for the spiral antenna, namely a conductive vertical wall and conductive pins, may be applied to any rotationally symmetric single-aperture DF antenna, including any single-element (single-aperture) DF antenna such as the multimode circular patches described by [Huang-1984].

Digital Receiver and Processor Design

A novel direction-finding receiver and processor design is described herein that provides protection against narrowband and broadband interference while simultaneously estimating position, velocity, attitude, and time with a compact multi-mode direction-finding antenna. Existing radio-based navigation receivers require either very large multi-aperture antenna arrays with three or more antenna elements, or cannot provide protection against sources of broadband interference while simultaneously obtaining direct attitude measurements with a single-aperture antenna. Although the descriptions found herein refer primarily to satellite-based navigation systems, it will be clear to the person skilled in the art that the present exemplary embodiment applies to any signals-of-opportunity and radio signals originating from known locations and waveforms. It is also clear that the preferred embodiment is primarily a digital implementation. However, an analog implementation is an obvious extension.

As illustrated by the top-level system architecture shown in FIG. 1, the digital radio receiver and navigation processor 5 accepts the digital baseband feed signals 4 output by the RF-to-digital front-end electronics 3. The primary system output 6 is the estimate of the platform position, velocity, attitude, and time. In the preferred embodiment the primary function of the RF-to-digital front-end electronics 3 is to down convert the antenna feed port signals 2 (A1, . . . , An) from the frequency of interest to an intermediate frequency (IF) or baseband, and to sample them with an analog-to-digital converter (ADC). A digital down-converter (DDC) may also be employed to bring IF signals to baseband. The digital radio receiver and navigation processor 5 must then properly processes the digital baseband feed signals 4 to estimate the platform PVAT while simultaneously providing protection against broadband and narrowband interference.

Although the present exemplary embodiment applies to radio-based navigation systems using an n-element, multi-mode DF antenna, the preferred embodiment in FIG. 2 illustrates important features using a two-arm (two-element) spiral antenna design. However, as it should be clear to those skilled in the art, the only requirement imposed on the direction-finding antenna by the DF receiver is that it must have at least two feeds and support at least two direction-finding modes. Hence, there are two digital baseband feed signals 4a and 4b to the digital radio receiver and navigation processor 5. The digital radio receiver and navigation processor 5 comprises a front-end receiver processor 24 and back-end navigation processor 25. The front-end receiver processor 24 constructs the Mode 1 and Mode 2 signals 29 (M1) and 30 (M2) with the digital mode-forming network 23 and provides protection against broadband and narrowband interference prior to coherently processing the measured signals in the correlation module 26. The back-end processor 25 fuses all available measurements with a navigation filter to estimate the platform position, velocity, attitude, and time 6. Methods of fusing sensor measurements to compute position, velocity, attitude and time are well known to those skilled in the art. One of the most common approaches is to employ a Kalman filter, or an extended Kalman filter (EKF), or other nonlinear estimation techniques. The back-end processor may also provide some feedback to the front-end receiver processor 24 in the form of a broadband performance metric signal 32 ($W_1$), a narrowband performance metric signal 33 ($W_2$), and a Doppler aiding signal 34 (6*f*).

Digital Mode-Forming Network

The mode-forming arithmetic for a two-arm spiral antenna is simple:

$$\begin{pmatrix} M_1 \\ M_2 \end{pmatrix} = \begin{bmatrix} 1 & -1 \\ 1 & 1 \end{bmatrix} \begin{pmatrix} A_1 \\ A_2 \end{pmatrix} = T_2 \begin{pmatrix} A_1 \\ A_2 \end{pmatrix}. \quad (6)$$

FIG. 6 shows the resulting Mode 1 and Mode 2 gain patterns 11*a* for the two-arm spiral antenna 1*d*. In comparison, the four-arm spiral antenna mode-forming arithmetic as specified by FIG. 4 is:

$$\begin{pmatrix} M_1 \\ M_2 \\ M_3 \\ M_4 \end{pmatrix} = \begin{bmatrix} 1 & e^{-j\pi/2} & e^{-j\pi} & e^{-3j\pi/2} \\ 1 & e^{-j\pi} & 1 & e^{-j\pi} \\ 1 & e^{j\pi/2} & e^{j\pi} & e^{3j\pi/2} \\ 1 & 1 & 1 & 1 \end{bmatrix} \begin{pmatrix} A_1 \\ A_2 \\ A_3 \\ A_4 \end{pmatrix} = T_4 \begin{pmatrix} A_1 \\ A_2 \\ A_3 \\ A_4 \end{pmatrix}. \quad (7)$$

Regardless, it should be clear that the antenna mode signals and the feed signals are algebraically equivalent. For example, interference suppression can be done using either set of signals with equivalent performance. In addition to reducing the cost and weight of the system, the digital mode-forming network 23 makes it easier to calibrate the system for gain and phase imbalances between the two RF channels starting with the feed ports 2*a* (A1) and 2*b* (A2). For example, a complex frequency dependant function $\Delta(\omega) \in C^{2 \times 2}$ can be used to ensure that the antenna Mode 1 and Mode 2 signals 29 (M1) and 30 (M2) are symmetric about boresight and that the Mode 2 signal 30 (M2) has a null directly on boresight:

$$\begin{pmatrix} M_1 \\ M_2 \end{pmatrix} = \left( \begin{bmatrix} 1 & -1 \\ 1 & 1 \end{bmatrix} + \Delta(\omega) \right) \begin{pmatrix} A_1 \\ A_2 \end{pmatrix}. \quad (8)$$

Calibration can be a completely automatic and closed-loop process. This would be much more difficult and time consuming with an analog mode-forming network comprising combiners, 90° phase shifters and 180° quad couplers.

Interference Rejection

The architecture of FIG. 2 provides protection against broadband and narrowband interference with the interference suppression module 21 and the frequency excision module 22. The frequency excision module 22 provides protection against narrowband interference signals while the interference suppression module 21 provides broadband protection (nulling and beam forming). In a paradigm shift, the present exemplary embodiment treats single-aperture multimode direction-finding antennas similar to multi-element, multi-aperture antennas such as arrays [Penno-2001, Penno-2002]. In other words, as long as the antenna supports at least two DF modes (and two feeds), it makes no difference to the receiver if the DF antenna is a single- or multiple-aperture system. For example, an n-arm spiral antenna is treated as an array of cylindrically symmetrical n-elements. Hence, existing and well known algorithms [Compton-1988], [Ghose-1996] for broadband and narrowband interference rejection can be applied with minor modifications [Penno-2002]. These algorithms include space-time adaptive processing (STAP) and space-frequency adaptive processing (SFAP) methods. The primary difference in the implementation of those algorithms will be due to the fact that each arm of an n-arm spiral antenna will be 360/n degrees out of phase with its neighbor. In sharp contrast, conventional array systems assume that the pattern of each antenna element is identical. Nonetheless, similar to conventional antenna array systems, it is also possible to determine the angle-of-arrival of an interference source with an array of cylindrically-symmetric elements while simultaneously placing a null in its direction.

Although the embodiment shown in FIG. 2 indicates that the frequency excision module 22 follows the digital mode-forming network 23 and the interference suppression module 21, it can be placed before or after either block. Mathematically speaking the specific order of said modules is irrelevant. If desired, the frequency excision module 21 can operate directly on the digital baseband feed signals 4*a* and 4*b* prior to the interference suppression module 21 and digital mode-forming network 23. An advantage of such an architecture is that it minimizes the computational burden by operating on only the two signals 4*a* and 4*b* instead of the three signals 29, 30, and 31.

The digital mode-forming network 23 can also precede the interference suppression module 21. In that case the inputs to the interference suppression module 21 would actually be the Mode 1 and Mode 2 signals 29 (M1) and 30 (M2). As indicated by Equation (6) and Equation (7) the mode-forming operation is reversible ($T_2$ and $T_4$ are invertible) and, hence, the digital feed signals 4*a* and 4*b* can be recovered by the interference suppression module 21 with the application of a linear (and unnecessary) transformation.

The only restriction that is preferably observed in the design of the front-end receiver processor 24 is that the Mode 1 and Mode 2 signals 29*a* (M1) and 30*a* (M2) at the input to the correlation module 26 must retain the same relative phase and gain as the Mode 1 and Mode 2 signals 29 (M1) and 30 (M2) at the output of the digital mode-forming network 23. Therefore, the same instantaneous gain and phase must be applied to both the Mode 1 and Mode 2 signal channels. This restriction guarantees that the angle-of-arrival information for each signal-of-interest is retained and can be recovered for direction-finding and attitude estimation. However, it also implies that it is not possible to offer the Mode 1 and Mode 2 signals direct protection against broadband interference, although it is possible to provide them with direct protection against narrowband jammers. This is because the frequency excision module 22 will impart the same instantaneous gain and phase on both the Mode 1 and Mode 2 signals 29 (M1) and 30 (M2). Later we introduce a preferred embodiment for the correlation module 26 that provides the Mode 1 and Mode 2 signals indirect protection against broadband jammers.

Figure 24:
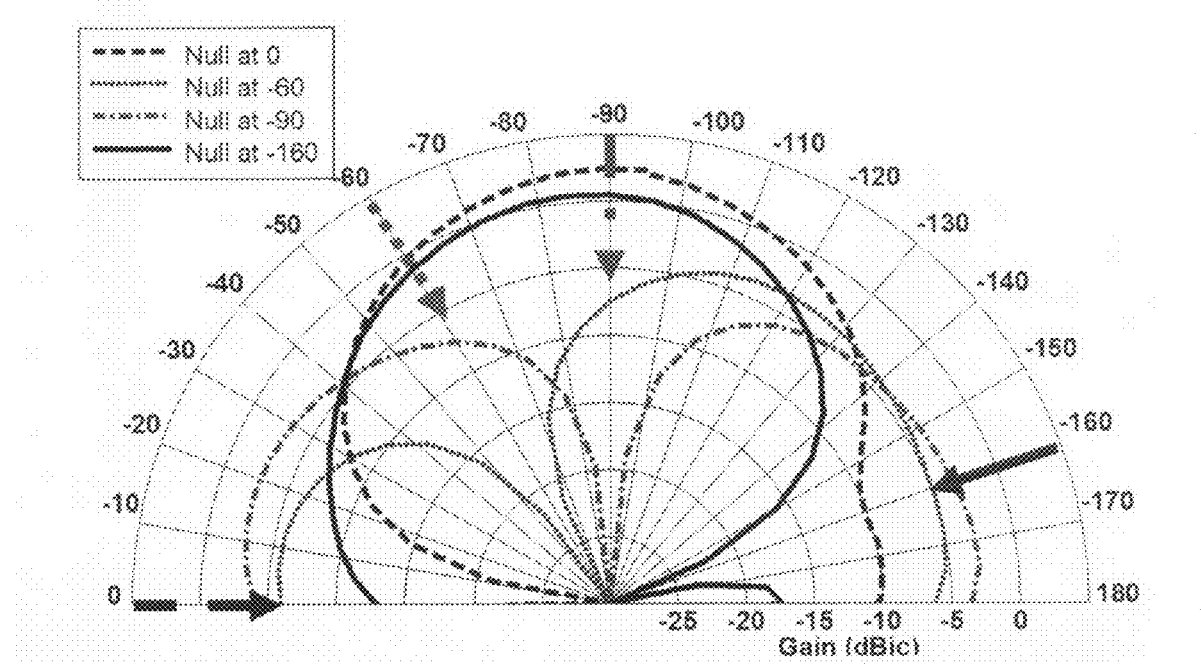
FIG. 24 provides examples of the null forming capabilities of a two-arm spiral antenna for jammers at different elevation angles.

FIG. 24 demonstrates the nulling performance of a two-arm spiral antenna in response to a single broadband jammer for four different jammer orientations. The arrows indicate the direction of the jamming signal and the gain plot with the corresponding line style shows the typical null steering response of the system. As shown in FIG. 24 the null depth is in excess of 25 dB for all jammer orientations for the entire the hemisphere. A two-arm spiral antenna with two RHCP feeds can only null a single broadband jammer that is linearly polarized or RHCP. However, a two-arm spiral with two inner RHCP feeds and two outer LHCP feeds can simultaneously null one purely RHCP and one purely LHCP jammer, or a single linearly polarized jammer. In general, the number spatial nulls that can be controlled by an n-arm spiral is n−1, the same as a traditional n-element array. The (best case) number of polarization sensitive nulls that can be formed is 2n−1, provided the spiral has both inner and outer polarization dependant feeds.

The frequency excision capability of the system against narrowband or continuous-wave jammers will depend primarily on the sampling resolution and dynamic range of the analog-to-digital converters, as well as the processing power available. The software-radio approach to radio-based navigation receivers now permits the use of fast Fourier transforms (FFTs) for acquisition, multipath mitigation, and narrowband frequency excision. While the depth of the narrowband (continuous-wave) CW null depends on the ADC resolution, the width of the null depends on the number of FFT bins and the signal bandwidth. For example, a 45 dB CW null depth and a 0.4% null width are achievable with 10-bit accuracy and a 256-bin FFT. Narrower null widths are desirable in order to reduce the negative effects of the notch filter on the radio signal. However, narrower null widths require more FFT bins which require more processing power. Swept CW jammers require additional processing in order to track the swept signal. Hence, the CW nulling accuracy and the number of simultaneous CW nulls will be limited by the available processing power. Nonetheless, the embodiment shown in FIG. 2 is compatible with existing time-based and frequency-based methods of frequency excision and is independent of the specific implementation.

Given the basic measurements 35 of front-end receiver processor 24, the primary function of the back-end processor 25 is to estimate the platform PVAT 6. Another one of its functions is to provide feedback to the front-end receiver processor 25 in the form of the broadband performance metric signal 32 ($W_1$) and the wideband performance metric signal 33 ($W_2$). Broadband and wideband performance metrics may include a bit error rate (BER), or some other quality-of-service (QoS) signal including, but not limited to, signal-to-noise ratio, signal-to-interference-plus-noise ratio, carrier-to-noise ratio ($C/N_0$) or jammer-to-noise ratio (J/N). The metrics may be a discrete state or mission time that is used to select between a set of fixed weights in the interference suppression module 21 and/or the frequency excision module 22. It is clear that the specific set of performance metric signals chosen will depend on the application. We also note that the separation of the front-end processor and the back-end processor blocks is artificial and is meant only as a tool for simplifying the general discussion. Clearly all the processing can be done on a single chip or on multiple chips.

Coherent Correlation Module

Figure 25:
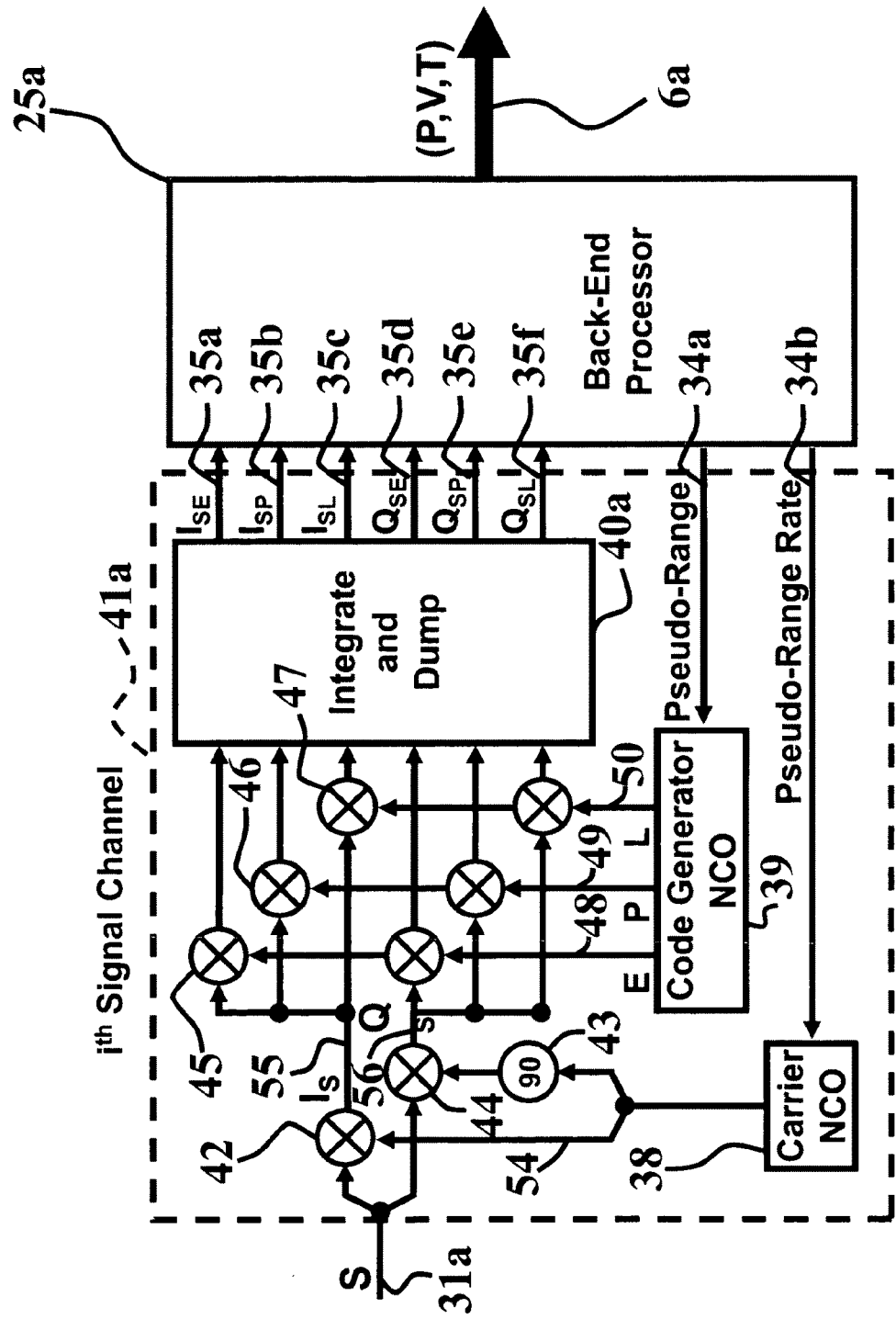
FIG. 25 shows the basic single input correlation architecture used in most GPS receivers.

The final component of the front-end receiver processor 24 is the correlation module 26. The primary purpose of the correlation module 26 is to perform coherent processing on the signals-of-interest and to obtain the set of basic measurements 35. The specific algorithms and methods used for coherent processing will depend on the signal structure of the signals-of-interest and on the application. FIG. 25 illustrates a generic correlation architecture used in single-input GPS receivers. Most all GPS receivers on the market today are single-input receivers. Existing multi-input GPS receivers require multi-element, multi-aperture array antennas where 3-D attitude is determined via phase interferometry techniques. Any number of designs can be implemented with the architecture illustrated in FIG. 25 including loosely-coupled, tightly-coupled and ultra-tightly (deeply) coupled GPS systems. In general, the correlation module coherently extracts unique channels of information embedded within an input signal 31a (S). For example, each GPS satellite signal is assigned a unique pseudo-random noise (PRN) code sequence and can be separated from all other satellite signals by coherently applying the PRN sequence to the input signal 31a (S). Hence, as indicated by the ith signal channel 41a in FIG. 25 the input signal 31a (S) is split into multiple information channels i=0, 1, . . . , s, corresponding to the number of visible satellites in the sky (skies).

The signal processing of each information channel is identical and comprises a carrier-tracking loop and a code-tracking loop. Carrier wipeoff (removal) is achieved by mixing/multiplying 42 the input signal 31a (S) with an in-phase (cosine) replica of the IF sinusoidal carrier signal 54 and applying a low-pass filter on the result, yielding a carrier-free in-phase signal 55 ($I_S$). A carrier-free quadrature-phase (sine) signal 56 ($Q_S$) is generated by applying a 90° phase-shift 43 to the replica of the IF sinusoidal carrier signal 54 and mixing/multiplying 44 the result with the input signal 31a (S).

In loosely coupled systems a numerically controlled oscillator (NCO) 38 for the carrier-tracking loop is typically driven by the carrier-free in-phase signal 55 ($I_S$) and its complement, the carrier-free quadrature-phase signal 56 (Qs). A code-generator 39 generates 'early' 48 (E), 'prompt' 49 (P), and 'late' 50 (L) copies of the GPS PRN sequence/code $\hat{C}_{k,m}$, where k corresponds to the time epoch, and correlates them with the carrier-free in-phase signal 55 ($I_S$) and carrier-free quadrature-phase signal 56 ($Q_S$), both of which contain the actual satellite PRN sequence $C_k$. The index m=(−1, 0, 1) in $\hat{C}_{k,m}$ corresponds to early, prompt, or late correlation. The early correlator sequence 48 usually leads the prompt sequence 49 by half a chip while the late sequence 50 lags by half a chip. The actual number of correlators and the magnitude of the lead/lag separation depend on the available processing power. The ideal correlation function $\eta_{k,m}$ is defined as:

$$\eta_{k,m}(\varepsilon_k, \delta) = E[\hat{C}_{k,m} C_k] = \begin{cases} 1 - |\varepsilon_k + m\delta|, & |\varepsilon_k + m\delta| < 1 \\ 0, & \text{otherwise} \end{cases}, \quad (9)$$

where $\delta$ is the correlator spacing in chips, and $\in_k$ is the code delay (phase) error in units of chips (time delay ($\tau_k$)).

The early, prompt, and late in-phase correlation process comprises multiplication/mixing 45, 46 and 47, and integration 40a. The process of code correlation is sometimes called code wipeoff. In legacy GPS signals the code is modulated by data bits. Once the date bits are known, code wipeoff can be used to achieve data wipeoff. The quadrature-phase correlation process is identical to its in-phase complement. The correlation process results in an in-phase early 35a ($I_{SE}$), an in-phase prompt 35b ($I_{SL}$), an in-phase late 35c ($I_{SL}$), a quadrature-phase early 35d ($Q_{SE}$), a quadrature-phase prompt 35e ($Q_{SP}$), and a quadrature-phase late 35f ($Q_{SL}$) signal. The carrier-loop is in lock when the quadrature-phase prompt signal 35e ($Q_{SP}$) is driven to zero and the in-phase prompt signal 35b ($I_{SP}$) is maximized or, equivalently, when $\tan^{-1}$ ($Q_{SP}/I_{SP}$) is driven to zero. Code tracking is achieved by balancing the early and late correlator outputs 35a ($I_{SE}$) and 35c ($I_{SL}$), i.e., by driving $\eta_k = \eta_{k,1} - \eta_{k,-1}$ to zero.

The carrier NCO 38 is driven by a carrier-loop feedback signal 34b while the code-generator NCO 39 is driven by a code-loop feedback signal 34a. The code-loop feedback signal 34a results in a stable loop as long as the code lead/lag is within half a chip of the actual PRN sequence. In loosely-coupled or tightly-coupled systems the carrier-loop feedback signal 34b is a variation of the arctangent of the quadrature-phase prompt 35e ($Q_{SP}$) and in-phase prompt 35b ($I_{SL}$) signals, or $\tan^{-1}(Q_{SP}/I_{SP})$. Similarly, the code-loop feedback signal 34a is simply the difference between the in-phase early signal 35a ($I_{SE}$) and the in-phase late signal 35c ($I_{SL}$), or $\tilde{\eta}_k = \eta_{k,1} - \eta_{k,-1}$. While some tightly-coupled GPS/INS systems make use of Doppler aiding, most typical receiver carrier- and code-tracking loops operate without any knowledge or benefit from the position, velocity, and time estimate 6a (PVT) obtained from the navigation filter embedded within the back-end processor 25a. In contrast, the back-end processor 25a of an ultra-tightly coupled system fuses all available information to estimate the pseudo-range and the pseudo-range rate to the ith satellite. The pseudo-range is used as the code-loop feedback signal 34a, and the pseudo-range rate is used as the carrier-loop feedback signal 34b. The ultra-tightly coupled approach has significant advantages in terms of robustness and resistance to jamming.

The coherent correlation architecture shown in FIG. 25 is relatively simple and more complex designs with more correlators are possible but are subject to available processing power. As illustrated in FIG. 25 a single-input GPS receiver with input signal 31a (S) requires one carrier NCO 38, one code generator NCO 39, two carrier mixers 42 and 44, and six correlators comprising six code mixers 45, 46, 47, 61, 62, 63, and six integrators 40a, as well as all low-pass filtering associated with mixing and signal multiplication.

Although we have provided some background for coherent processing of GPS signals, the specific implementation of the GPS correlation, acquisition and tracking loops will depend on the specific application and is not relevant here. In fact, methods for coherent correlation, acquisition and tracking of GPS and GNSS signals are well known and documented. Furthermore, although the architecture for coherent processing shown in FIG. 25 is depicted in the time-domain, frequency-domain implementations exist and are becoming more common with the availability of low-cost chips specialized for parallel processing and discrete Fourier transforms (DFT). However, the single-input GPS coherent correlation architecture is not sufficient for obtaining direct (monopulse) attitude measurements while simultaneously providing protection against broadband and narrowband sources of interference.

Existing anti-jam systems use the weighted sum of signals from multiple antenna elements to generate a single interference-free input signal 31a (S) for the GPS receiver and are unable to obtain direct attitude measurements. Multiple-input GPS receivers that do exist require multi-aperture antennas to determine the antenna attitude. Moreover, although U.S. Pat. No. 5,461,387 describes an instrument capable of determining the antenna attitude from GPS signals using a single-input GPS receiver, it does so by using a non-monopulse (sequential) commutative circuit and multiplexing the Mode 1 and Mode 2 signals (see FIG. 6 in U.S. Pat. No. 5,461,387). It is widely acknowledged by those skilled in the art of direction-finding that non-monopulse DF receivers have serious drawbacks and are susceptible to electronic counter measures (ECM). Moreover, since the phase of the GPS signal is always varying (due to the relative motion between the antenna and the satellite), this sequential approach will introduce significant relative phase errors making it difficult, if not impossible, to provide accurate angle-of-arrival measurements and therefore attitude. This is probably the primary reason for the absence of any commercial products based on the technology of U.S. Pat. No. 5,461,387. Furthermore, as previously mentioned, U.S. Pat. No. 5,461,387 does not provide the ability to protect against intentional and unintentional jamming while simultaneously obtaining attitude measurements.

As illustrated in FIG. 2, a radio-based navigation receiver using a multimode DF antenna must be capable accepting at least two (monopulse) digital feed signals 4a and 4b, and coherently processing at least three signals 29a (M1), 30a (M2), and 31a (S). The Mode 1 signals 29a (M1) and Mode 2 signals 30a (M2) are required for monopulse direction finding and attitude determination, while the "interference free" primary navigation input signal 31a (S) is required for position, velocity, and time estimation. Hence, it appears that for each satellite signal the coherent correlation module 26 needs to contain at least three sets of the carrier- and code-tracking loops shown in FIG. 25, including three carrier NCOs 38, three code generator NCOs 39, and all associated mixers and low-pass filters totaling 18 code mixers and integrators, and six carrier mixers. Needless to say, the computational burden required for radio-based attitude determination with a single-aperture multimode DF antenna appears to be significant. However, further investigation shows that it is possible to make some significant simplifications without any significant loss in performance.

Figure 26:
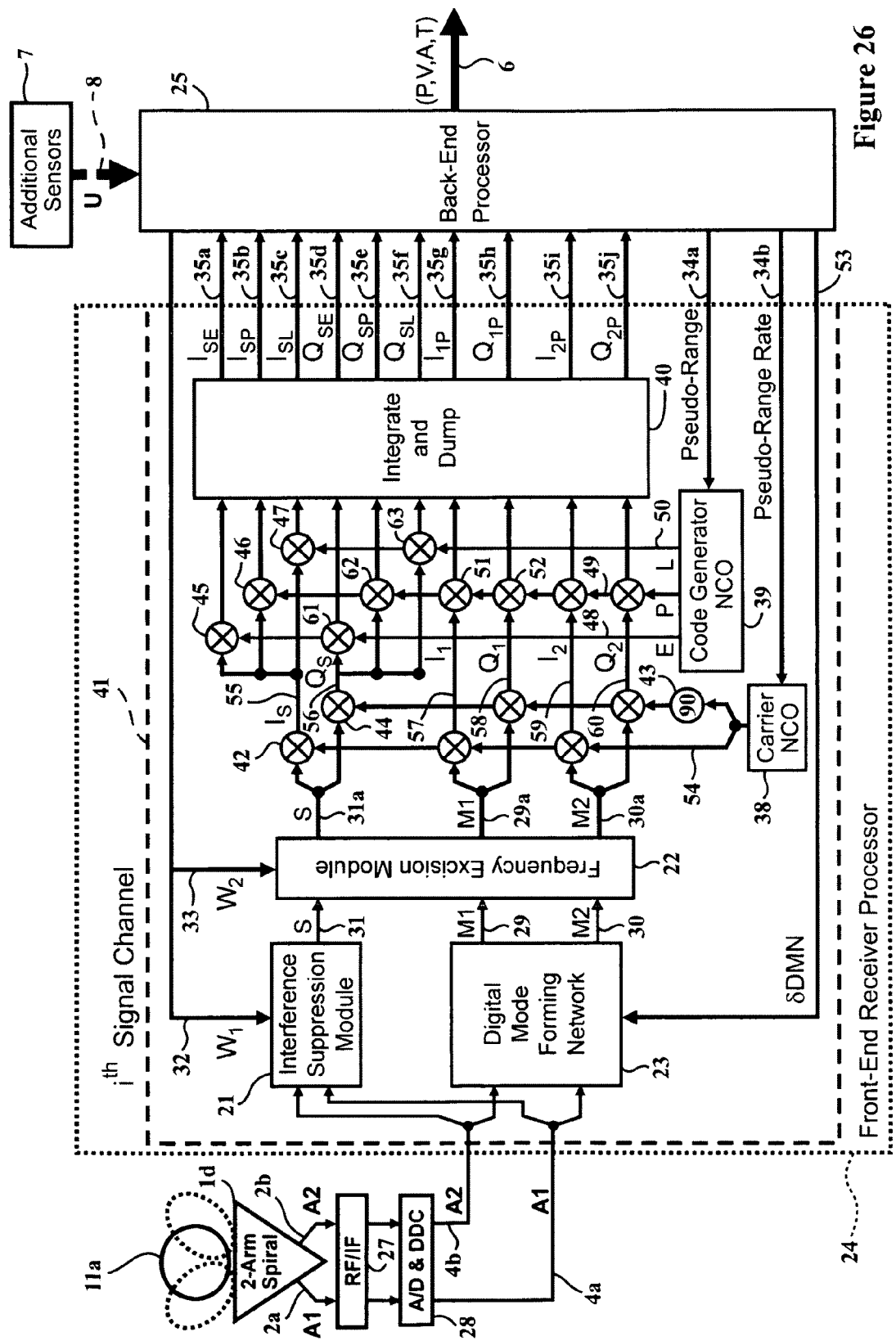
FIG. 26 provides a preferred embodiment of a correlation architecture for GPS-based attitude estimation and interference rejection using a minimal number of mixers, correlators, and carrier- and code-loop numerically controlled oscillators (NCOs).

A correlation architecture is shown in FIG. 26 where the signals 29a (M1), 30a (M2), and 31a (S) are all driven by the same carrier-loop numerically-controlled oscillator 38 and code-loop NCO 39. Since the process of "mixing" two RF/IF signals conserves the signal phase, the same carrier NCO 38 can be used for carrier wipeoff on the signals 29a (M1) and 30a (M2), thereby preserving the relative phase between the two signals 29a (M1) and 30a (M2). In the architecture shown in FIG. 26, the Mode 1 in-phase signal 57 ($I_1$), Mode 1 quadrature-phase signal 58 ($Q_1$), the Mode 2 in-phase signal 59 ($I_2$) and the Mode 2 quadrature-phase signal 60 ($Q_2$) are formed by mixing them with a sinusoidal signal of the same carrier IF frequency and phase used for the primary navigation input signal 31a (S), thereby requiring only a single carrier NCO 38 for each satellite signal. The minimum number of digital carrier mixers required per satellite is therefore 2(n+1) where the number of antenna modes is n. Another advantage of this single carrier NCO architecture is that the attitude solution will be robust to carrier cycle slips. It is possible for cycle slips to occur in one mode but not the other in a system where each of the three input signals has its own carrier NCO, thus causing unnecessary relative phase errors. A single-NCO solution will not exhibit this problem.

The early, prompt and late in-phase and quadrature-phase components of all signals are constructed after carrier wipeoff by mixing them with a copy of the GPS PRN code sequence $\hat{C}_{k,m}$. At first glance it appears that three sets of code-tracking loops and code generator NCOs 39 are necessary for each satellite signal: one for the input signal 31a (S), and two for the Mode 1 and Mode 2 signals 29a (M1) and 30a (M2). However, as shown in FIG. 26, the prompt code sequence 49 of the input signal 31a (S) can be used to achieve code-wipeoff for the Mode 1 and Mode 2 signals 29a (M1) and 30a (M2), thereby requiring only 10 correlators and a single code-generator NCO 39 per satellite. Hence, the minimum number of digital correlators required per satellite is 2(3+n). Moreover, there is no significant loss of information during the correlation process and both the relative gain and the relative phase information between the Mode 1 and Mode 2 signals 29a (M1) and 30a (M2) is preserved. Furthermore, since the carrier NCO 38 and the code-generator NCO 39 are driven by feedback from the input signal 31a (S), which is protected against broadband interference, the Mode 1 and Mode 2 signals 29a (M1) and 30a (M2) indirectly benefit from the robustness of the input signal 31a (S).

Figure 27:
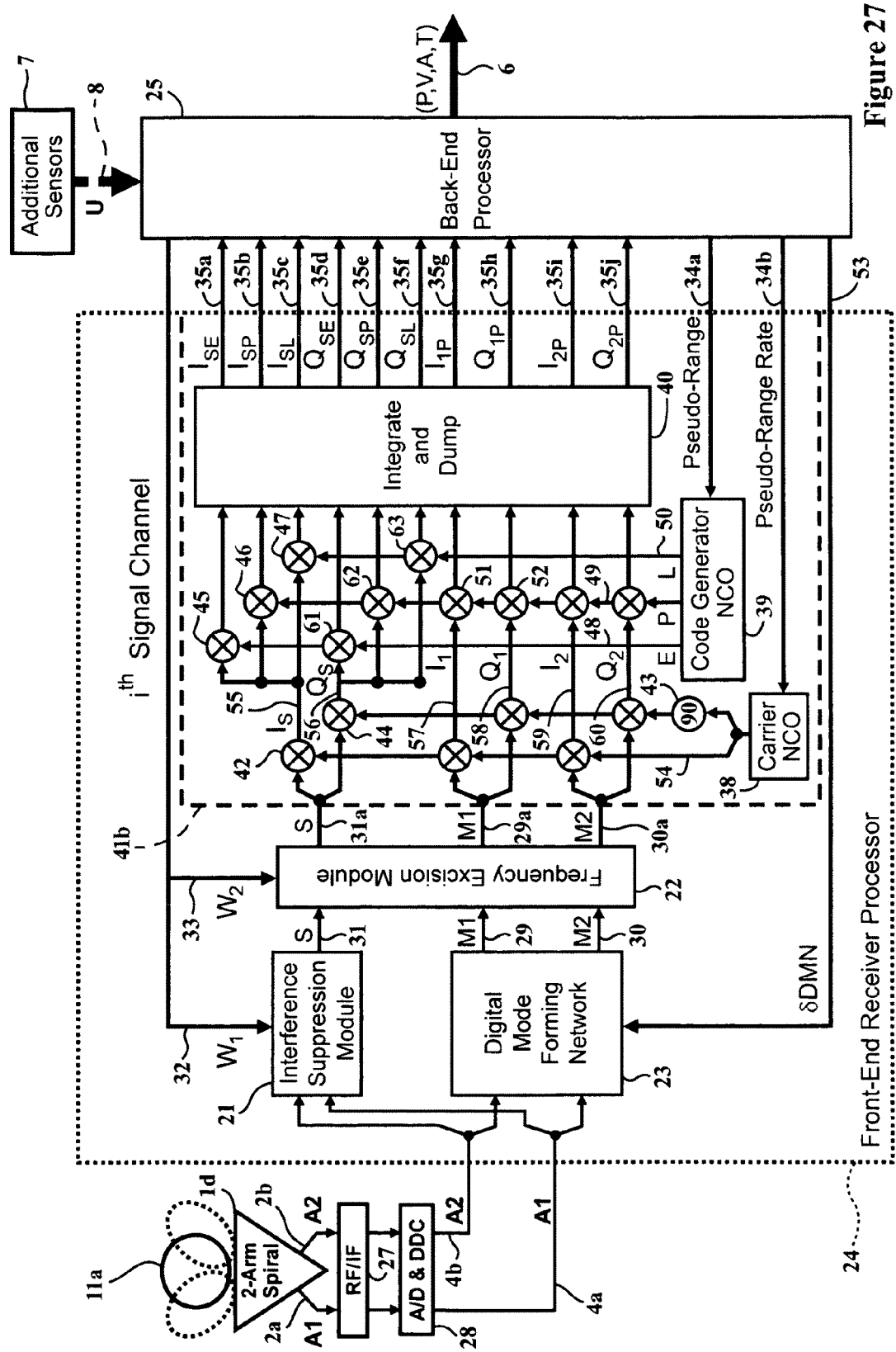
FIG. 27 provides an alternative correlation architecture for GPS-based attitude estimation and interference rejection with a reduced computational burden using a minimal number of mixers, correlators, and carrier- and code-loop NCOs.

As indicated by the architecture for the ith signal channel block 41 in FIG. 26, each satellite signal is permitted to have its own "optimal" set of weights for interference suppression and frequency excision. This is because the interference suppression module is included within the ith signal channel block 41. This is a highly versatile architecture since the interference rejection algorithms can also be used for satellite-dependent multipath mitigation. In fact, the satellite signal angle-of-arrival measurements can be used to detect and avoid multipath signals. However, although the embodiment shown in FIG. 26 requires the fewest number of mixers and carrier- and code-loop NCOs (one pair per satellite), the required processing power may still be of some concern. As shown in FIG. 27, the digital mode-forming network 23, the interference suppression module 21, and the frequency excision module 22 can be moved outside the ith signal channel block 41b to be satellite independent, thereby reducing the computational burden.

Although the receiver embodiments shown in FIG. 2, FIG. 25, FIG. 26 and FIG. 27 are targeted for GPS and code-division multiple access (CDMA) systems, they can easily be modified for alternative communications technologies including, but not limited to time-division multiple access (TDMA), frequency-division multiple access (FDMA), orthogonal frequency-division multiplexing (OFDM), and ultra-wideband (UWB) systems.

Position, Velocity, Attitude, and Time (PVAT) Determination

As indicated by FIG. 2, FIG. 26 and FIG. 27, the outputs of the coherent correlation process are integrated and handed off (integrate and dump) to the back-end processor 25. The input signal 31a (S) results in at least six "true" measurements per satellite: the in-phase early 35a ($I_{SE}$), prompt 35b ($I_{SL}$), and late 35c ($I_{SL}$) signals, and the quadrature-phase early 35d ($Q_{SE}$), prompt 35e ($Q_{SP}$), and late 35f ($Q_{SL}$) signals. One additional pseudo-measurement that is useful is the signal power, or:

$$A^2 = I_{SP}^2 + Q_{SP}^2 \quad (10)$$

These seven signals are used to determine the platform position, velocity and time. Methods of determining position, velocity and time from GPS signals are well known to those skilled in the art and will not be reviewed here.

The two direction-finding modes will result in a total of four additional "true" measurements per satellite: a Mode 1 in-phase prompt signal 35g ($I_{1P}$), a Mode 2 in-phase prompt signal 35i ($I_{2P}$), a Mode 1 quadrature-phase prompt signal 35h ($Q_{1P}$), and a Mode 2 quadrature-phase prompt 35j signal ($Q_{2P}$). These four signals are used to construct the relative gain $$|r_{21}(\theta, \phi)| = \frac{\sqrt{I_{2P}^2 + Q_{2P}^2}}{\sqrt{I_{1P}^2 + Q_{1P}^2}}, \quad (11)$$

and relative phase $$\angle r_{21}(\theta,\phi) = \tan^{-1}(Q_{2P}, I_{2P}) - \tan^{-1}(Q_{1P}, I_{1P}) \quad (12)$$

between Mode 1 and Mode 2 and can be considered as measurements instead of 35g, 35h, 35i and 35j. Hence, depending on the specific implementation chosen, the front-end receiver processor 24 generates up to 11 measurements per satellite for use in navigation.

The relative phase and relative gain measurements are then used to determine the angle-of-arrival (θ, φ) of the satellite signal and, therefore, the platform attitude. A lookup table and an optimization algorithm can be used to generate the AOA measurements (θ, φ) that provide the best match with the measured values $|r_{21}(\theta, \phi)|$ and $\angle r_{21}(\theta, \phi)$. As shown in FIG. 26 and FIG. 27, and briefly alluded to with Equation (8), the calibration signal 53 (δDMN) can be fed back from the back-end processor 25 to the digital mode-forming network to ensure that the Mode 1 and Mode 2 patterns are properly aligned about boresight for improved angle-of-arrival accuracy.

FIG. 14 and FIG. 15 illustrate the direction-finding performance of a two-arm spiral antenna using the composite angle error (see FIG. 7) as a metric. Modern signal processing and estimation algorithms may also be used [Penno-2001]. In general, methods for estimating the angle-of-arrival from relative gain and relative phase measurements are well known: [Bullock-1971], [Deschamps-1971], [Corzine-1990], [Kennedy-1984], [Mosko-1984], [Lipsky-1987], and U.S. Pat. No. 7,577,464.

Figure 28:
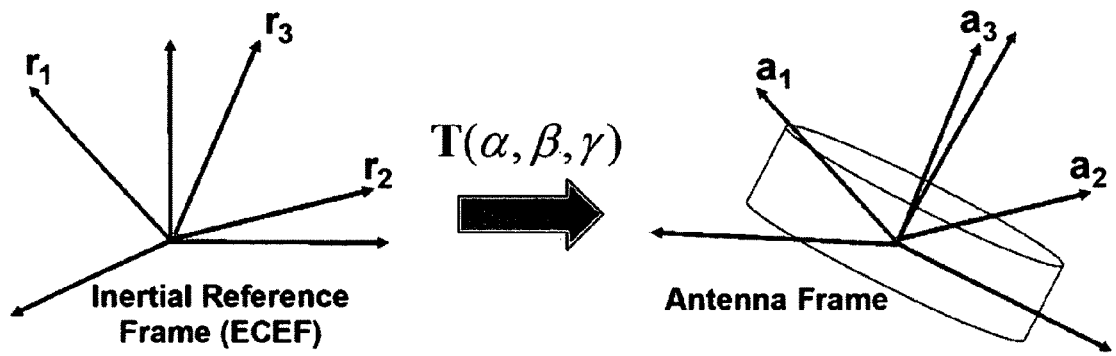
FIG. 28 provides an illustration of Wahba's problem for determining the attitude of a platform based on measured angle-of-arrival vectors ($a_j$) and known line-of-sight vectors ($r_j$).

The full 3-D attitude, or roll (α), pitch (β) and yaw (γ) of a platform can be determined by measuring the angle-of-arrival of two or more GPS satellites. A single GPS satellite signal can provide 2-D attitude information. Since the positions of the satellites are obtained through standard GPS signal processing techniques, and the platform position can be estimated from four or more satellite signals, the attitude of the platform can be determined by minimizing the distance between the measured AOA vectors ($a_j$) and projections of the known line-of-sight vectors from the platform to the GPS satellites ($r_j$). This process is illustrated by FIG. 28 and is known as Wahba's Problem [Wahba-1965].

The objective of Wahba's Problem is to find the set of arguments (α, β, γ) that minimize the cost functional $$J(T) = \frac{1}{2} \sum_{j=1}^{N} \frac{1}{\sigma_j^2} \|a_j - T(\alpha, \beta, \gamma) r_j\|^2, \quad (13)$$

or $$\arg\min_{\alpha,\beta,\gamma} J(T(\alpha, \beta, \gamma)),$$

where and T(α, β, γ) is the inertial reference frame to antenna frame rotation matrix that is a function of the three Euler angles (α, β, γ), $$a_j = \begin{bmatrix} \sin(\hat{\theta}_j)\cos(\hat{\phi}_j) \\ \sin(\hat{\theta}_j)\sin(\hat{\phi}_j) \\ \cos(\hat{\theta}_j) \end{bmatrix} \quad (14)$$

and $$\xi_j = \begin{bmatrix} \hat{\theta}_j \\ \hat{\phi}_j \end{bmatrix} = \begin{bmatrix} \theta_j \\ \phi_j \end{bmatrix} + \begin{bmatrix} n_{\theta_j} \\ n_{\phi_j} \end{bmatrix} \quad (15)$$

is the noisy AOA measurement with errors that are assumed to be zero-mean Gaussian with some covariance $R_j$ that is a function of the angle-of-arrival $$p(\xi_j) = p(\hat{\theta}_j, \hat{\phi}_j) = \frac{1}{2\pi |R_j|^{1/2}} \exp\left\{ -\frac{1}{2} \begin{bmatrix} \hat{\theta}_j - \theta_j \\ \hat{\phi}_j - \phi_j \end{bmatrix}^T R_j^{-1} \begin{bmatrix} \hat{\theta}_j - \theta_j \\ \hat{\phi}_j - \phi_j \end{bmatrix} \right\}. \quad (16)$$

If there were no errors, then the true relationships between the AOA vector ($a_j$), the line-of-sight vector ($r_j$), and the elevation and azimuth angles are $$\theta_j(\alpha, \beta, \gamma) = \cos^{-1}\left(\frac{z_j^A}{\|a_j\|}\right) \text{ and } \phi_j(\alpha, \beta, \gamma) = \tan^{-1}\left(\frac{y_j^A}{x_j^A}\right) \quad (17)$$

where $$a_j = [x_j^A \quad y_j^A \quad z_j^A]^T = T(\alpha, \beta, \gamma) r_j. \quad (18)$$

Wahba's problem may also be formulated as a maximum likelihood estimation problem. In that case, $$\hat{\alpha}_{ML}, \hat{\beta}_{ML}, \hat{\gamma}_{ML} = \operatorname*{argmin}_{\alpha,\beta,\gamma} \sum_{j=1}^{N} \left\{ \log|R_j| + \left\| \begin{bmatrix} \hat{\theta}_j - \theta_j(\alpha, \beta, \gamma) \\ \hat{\phi}_j - \phi_j(\alpha, \beta, \gamma) \end{bmatrix} \right\|_{R_j^{-1}}^2 \right\} \quad (19)$$

may be solved as an optimization problem or by taking the derivatives with respect to the Euler angles, setting the resulting equations to zero, and solving for the maximum likelihood estimates of the Euler angles. There are well known and elegant iterative algorithms for solving Wahba's Problem [Farrell-1966], [Cohen-1996] and will not be reviewed here.

It should be noted that since the distance between the platform and any GPS satellite is at least 20,000 km, the error in the platform position would have to be approximately 350 km before the attitude estimate would have an error of one degree. In general, angle-of-arrival measurement errors are more significant than errors in platform position.

Figure 29:
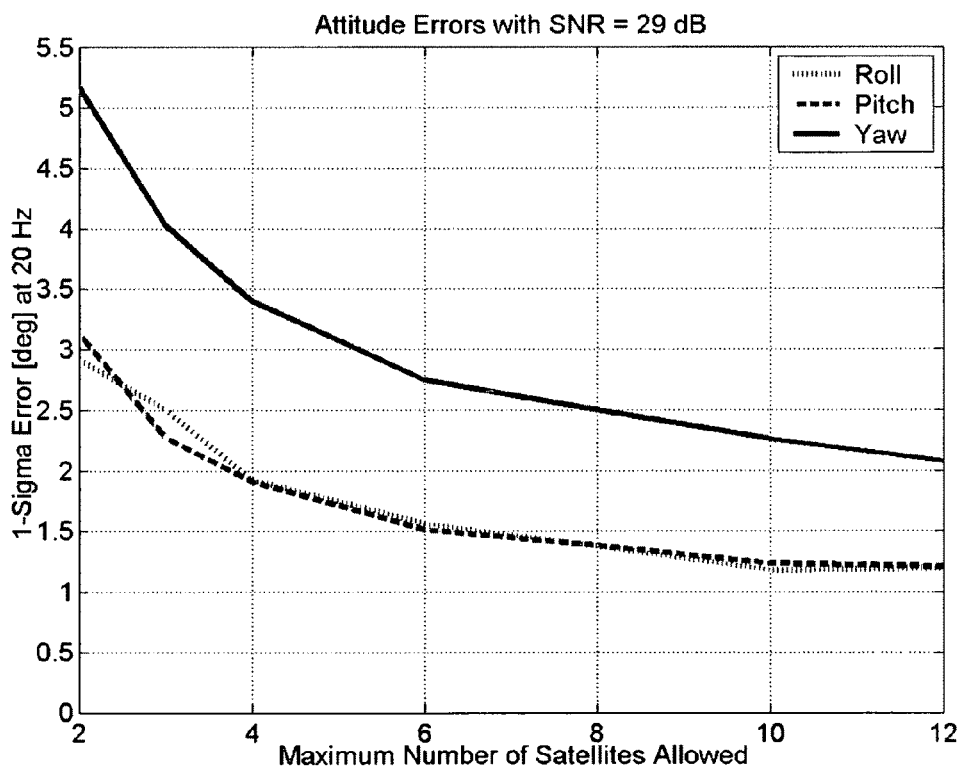
FIG. 29 illustrates the 3-D attitude (roll, pitch, and yaw) accuracy of a two-arm spiral antenna with a conductive cavity wall and conductive posts as a function of the number of satellites in track.

FIG. 29 shows the attitude accuracy of a two-arm spiral antenna as a function of the number of satellites. The signal-to-noise ratio assumed is 29 dB and corresponds to the minimum GPS SNR obtained with a clear line-of-sight over an integration interval of 50 ms, or 20 Hz. Nominal GPS signal power levels are 3-5 dB higher. FIG. 29 illustrates that a small two-arm spiral antenna can obtain roll and pitch measurements at 20 Hz with an accuracy of approximately 1.2° (1–σ), and yaw (azimuth) accuracies of approximately 2.1° (1–σ). The mean number of satellites used in obtaining the 3-D attitude solution is less than the maximum number allowed due to the fact that satellites near the horizon were ignored. Errors increase less than 0.5° as the maximum number of satellites decreases from twelve to six. Furthermore, although FIG. 29 only goes down to two satellites, even a single satellite provides 2-D attitude information, and 3-D attitude can be recovered by making use of alternative sensors such as magnetometers.

Finally, the attitude measurements of the system are not necessarily dependent on GPS signals. The system permits the use of any available signal within the capabilities of its RF front-end for navigation, including GLONASS and GALILEO signals, as well as alternative signals from pseudolites and beacons. Furthermore, it is possible to modify the embodiments shown herein to obtain the angle-of-arrival of emitters of unknown position, like jammers, while simultaneously measuring the angle-of-arrival of GPS signals for attitude determination.

RF-to-Digital Front-End

In the embodiments shown in FIG. 2, FIG. 26, and FIG. 27, the signals from the antenna feed ports 2a and 2b are down converted by an RF-to-IF subsystem 27 and then sampled by an analog-to-digital converter 28 to create the stream of digital signals which can be converted to digital baseband input signals 4a and 4b using a digital down-converter. Hence, the RF-to-digital front-end 3 comprises the RF-to-IF subsystem 27 and the ADC subsystem 28, an optional DDC, and provides a digitized form of the signals from the feed ports 2a and 2b. Ideally, each antenna feed signal will be synchronously down-converted using a common clock and common phased-locked loops in order to avoid introducing asymmetric gain or phase errors that will result in AOA measurement errors.

Figure 30:
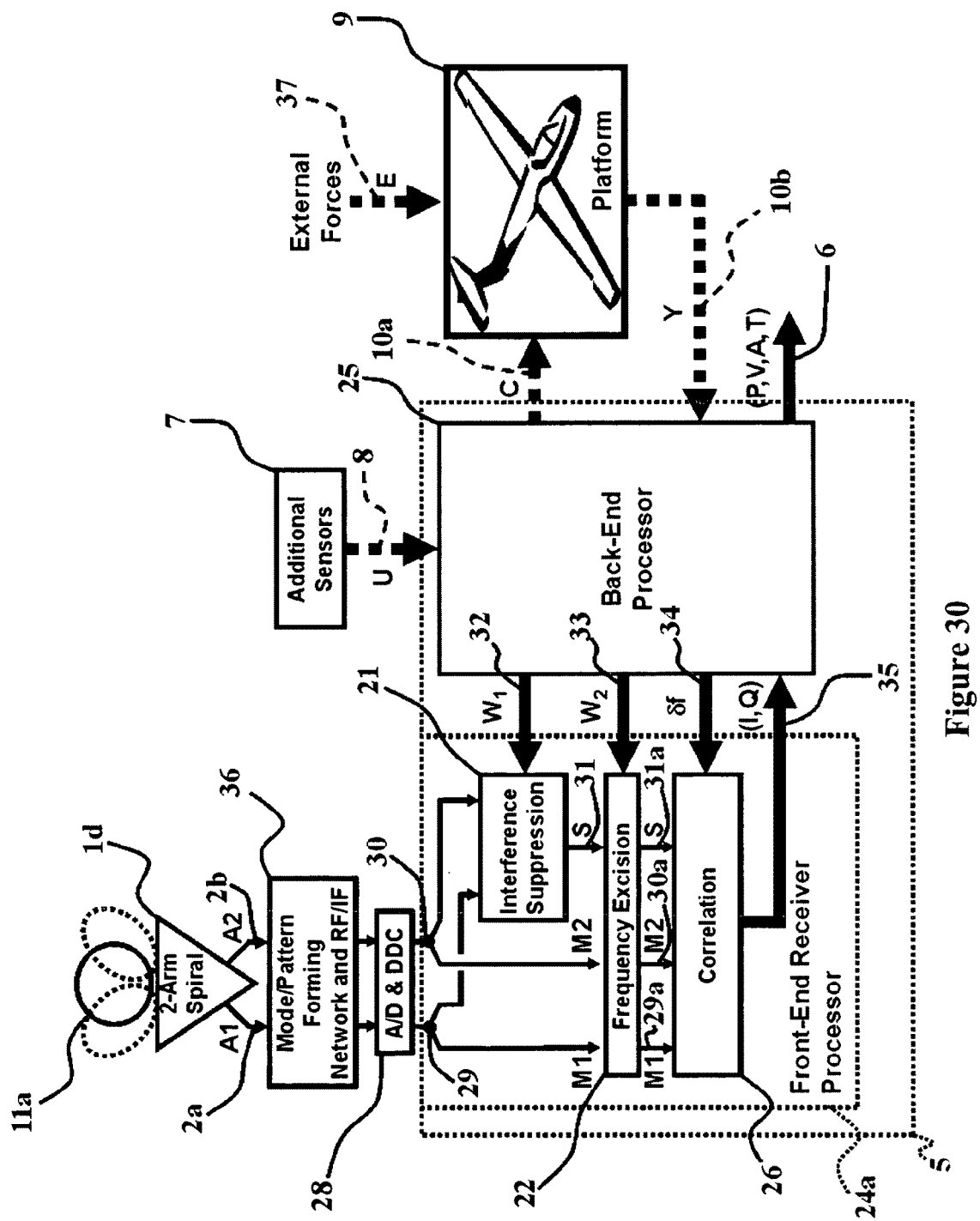
FIG. 30 provides an alternative design capable of providing simultaneous interference rejection and PVAT estimates with a two-arm spiral antenna using an analog mode-forming and/or pattern/beam-forming network.

In an alternative embodiment shown in FIG. 30, the RF-to-digital front-end 3 includes an analog mode- and/or pattern-forming network 36. The type of mode- and/or pattern-forming network depends upon method of direction-finding used, e.g. amplitude-comparison, phase-comparison, or amplitude-phase comparison, and whether or not the DF system will be monopulse or sequential. The mode-forming network and/or pattern-forming network can be implemented in either RF, IF or baseband [Corzine-1990] and is followed by the analog-to-digital converter 28. For the case of an analog mode-forming network, sampled signals 29 and 30 correspond to digital mode signals M1 and M2. If a pattern-forming network is implemented (with three or more elements), then the correlation processing 26 must be modified to match to the type of direction-finding architecture implemented, such as amplitude-amplitude comparison.

Furthermore, most of the radio receiver and navigation processor 5 components have been traditionally implemented with analog hardware. Hence, it is clear that the locations of the mode-forming network, the interference suppression module, the frequency excision module relative to the ADC subsystem 28 is not important to the overall design of the system in terms of functionality. Regardless of the exact implementation of the RF-to-digital front-end, special care must be taken to ensure that gain and phase of each RF channel are carefully matched as close as possible. Although variations between RF channels will not significantly degrade the interference rejection capabilities of the system, the attitude or direction-finding capabilities will be directly impacted by any such variation.

Integration with Additional Navigation Sensors

Figure 31:
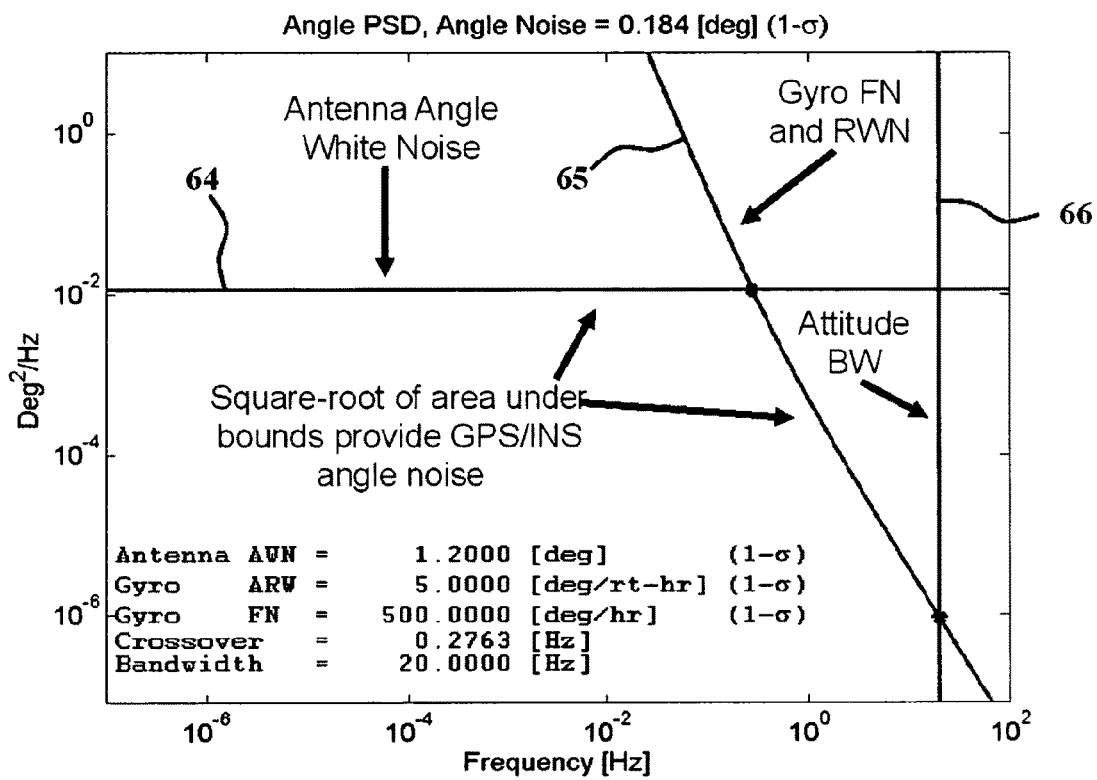
FIG. 31 shows the composite angle power spectral density (PSD) of a GPS-based attitude sensor when integrated with low-cost MEMS gyroscopes.

As illustrated by FIG. 1, FIG. 2, FIG. 26, FIG. 27 and FIG. 30, optional additional sensors 7 such as gyroscopes, accelerometers, inclinometers, and magnetometers can provide measurements 8 to the digital radio receiver and navigation processor 5 that can further assist in improving the accuracy and robustness of the PVAT estimate 6. As an illustrative example, FIG. 31 shows how the low-frequency GPS-based attitude (GPS/A) measurements complement the high-frequency measurements of a low-cost MEMS gyro. The angle power spectral density (PSD) characteristic of a low-cost MEMS gyro is shown in FIG. 31 as a diagonal line 65 cutting across the upper right region of the graph. The primary source of error for a MEMS gyro is its rate flicker noise (FN), sometimes referred to as its bias, and its rate white noise (RWN). The diagonal line 65 shown in FIG. 31 represents the PSD characteristics of a gyro with a 500 deg/sec flicker noise floor and a 5 deg/root-hour rate angle walk. Gyros with these noise characteristics sell for approximately $30/axis (in 2007 U.S. dollars).

The GPS/A PSD is shown as a horizontal line 64 in FIG. 31 for a system with a measurement error of 1.2° (1–σ) at 20 Hz and represents the antenna angle white noise (AWN) density over a bandwidth of 40π rad/sec (20 Hz). The attitude measurement bandwidth of 20 Hz is represented as a vertical line 66. An angle noise of 0.18° (1–σ) for an integrated Gyro+GPS/A system is determined by the square root of the area under the curve defined by the lines 64, 65, and 66. Current three-axis GPS/INS systems that are capable of 0.18° (1–σ)

attitude accuracy cost over $5000. In contrast, the estimated cost of a three-axis GPS/A system integrated with low-cost MEMS gyros is $500.

Another benefit to integrating the GPS/A sensor with an INS is the added robustness that can be achieved against interference. In GPS/INS systems the carrier- and code-tracking loop bandwidths will depend on the method of GPS/INS coupling. In general, tightly-coupled GPS/INS systems have loop bandwidths on the order of 12-18 Hz under low dynamic conditions. Ultra-tightly coupled systems on the other hand can have loop bandwidths as low as 3 Hz under high dynamics. Since the signal-to-noise ratio of the system is inversely proportional to the loop bandwidth, ultra-tightly coupled systems will have at least 6 dB of additional anti-jam GPS capability and 10-15 dB is common. This is in addition to any protection already provided by the interference suppression module 21 and the frequency excision module 22.

Integrated Navigation, Guidance and Control

Figure 32:
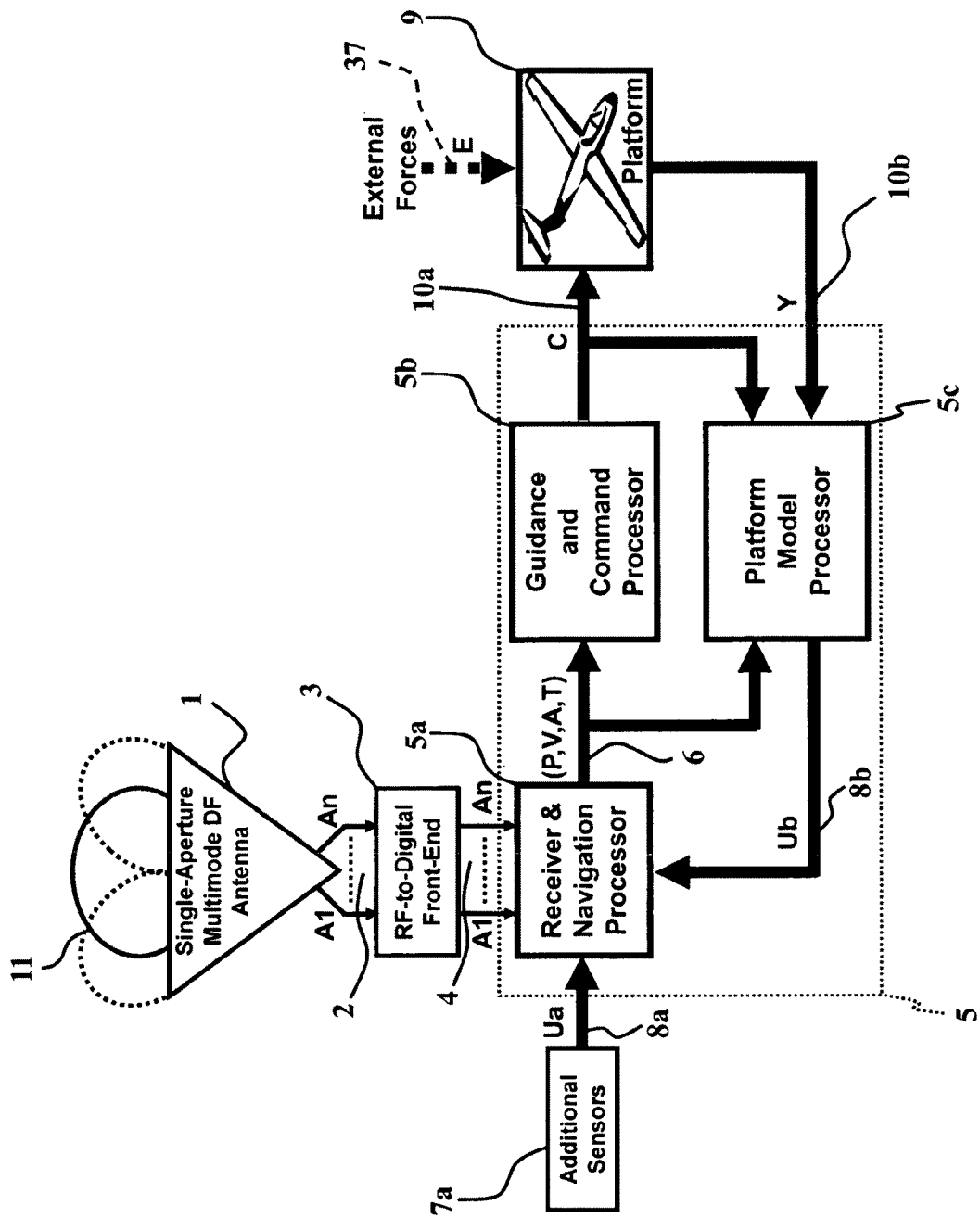
FIG. 32 illustrates a completely integrated guidance, navigation and control architecture with simultaneous interference rejection and PVAT estimation capabilities.

As illustrated by FIG. 1, FIG. 2, FIG. 30, and more specifically FIG. 32, the PVAT estimate 6 can be further improved by optionally embedding platform guidance and control processing 5b into the digital receiver and navigation processor 5 in a closed-loop feedback structure. When a navigation processor 5a is integrated with said guidance and control processing 5b, platform control commands 10a and platform actuator measurements 10b can be fed back into a model of the platform dynamics 5c to provide a pseudo-measurement 8b (Ub) of platform position and orientation. Since platform control signals are generated in response to guidance commands, the pseudo-measurement 8b (Ub) of platform position and orientation has the properties of a predictor. In other words, it anticipates the platform motion in response to commanded control signals. This capability can be useful not only coasting through periods where navigation signals are denied, but for detecting sensor and actuator faults as well as estimating external forces 37.

Spin-Stabilized Platforms

Figure 33:
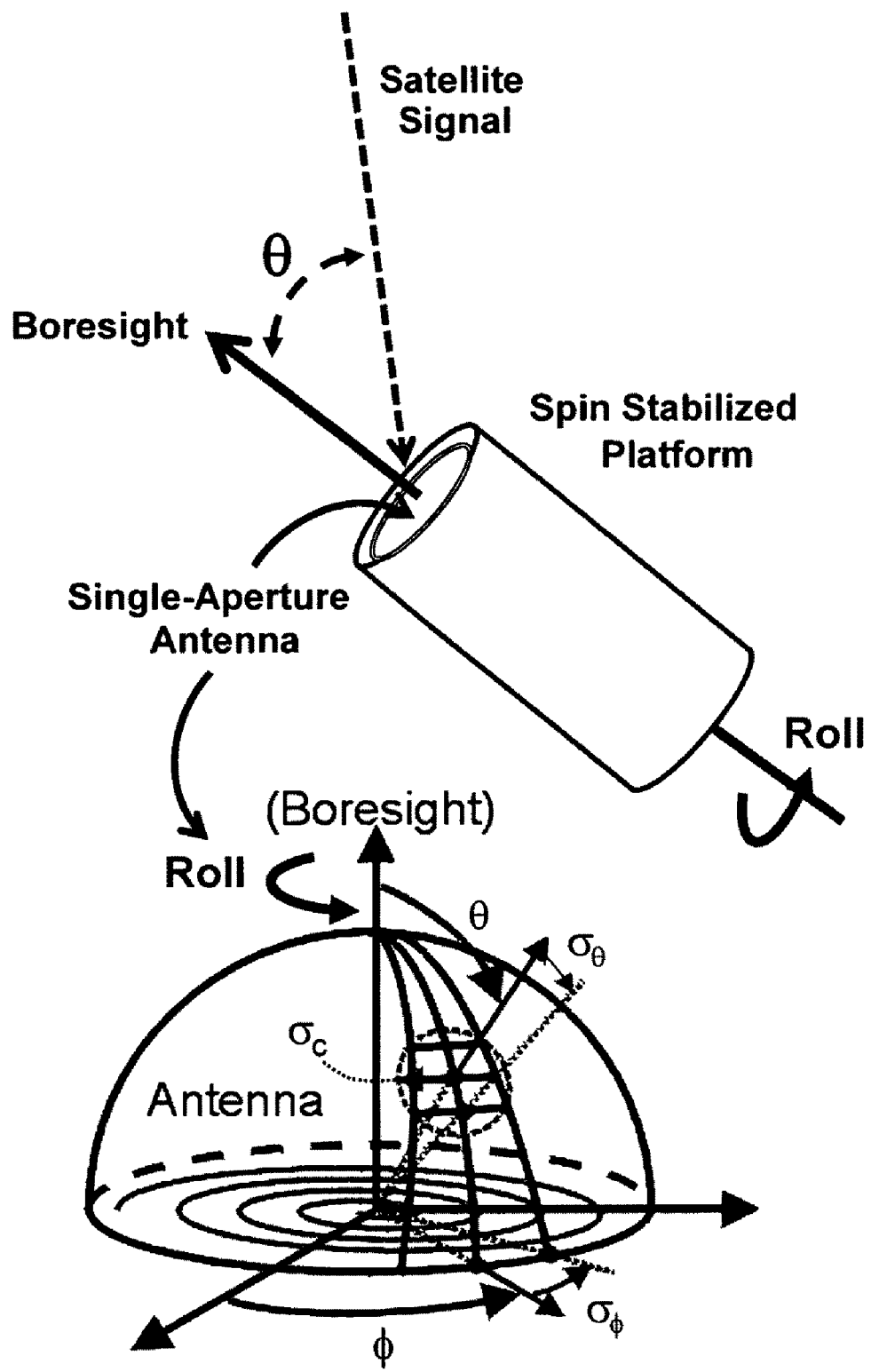
FIG. 33 illustrates the geometry of a spin-stabilized platform with the single-aperture DF antenna boresight aligned with the roll axis.

Spin stabilized platforms provide some unique challenges due to their roll rates about their stability axis. As illustrated by FIG. 33 an antenna mounted on a spin-stabilized platform with its antenna boresight aligned with the platform spin axis will measure an approximately constant elevation angle. However, the measured relative phase of the two antenna modes, and therefore the measured azimuth angle, will be phase-modulated by the platform spin rate. This is because the Mode 1 phase varies approximately linearly with azimuth (roll) angle while the Mode 0 phase remains approximately constant. Hence, we can observe the roll angle and roll rate of the vehicle without requiring an expensive IMU.

Figure 34:
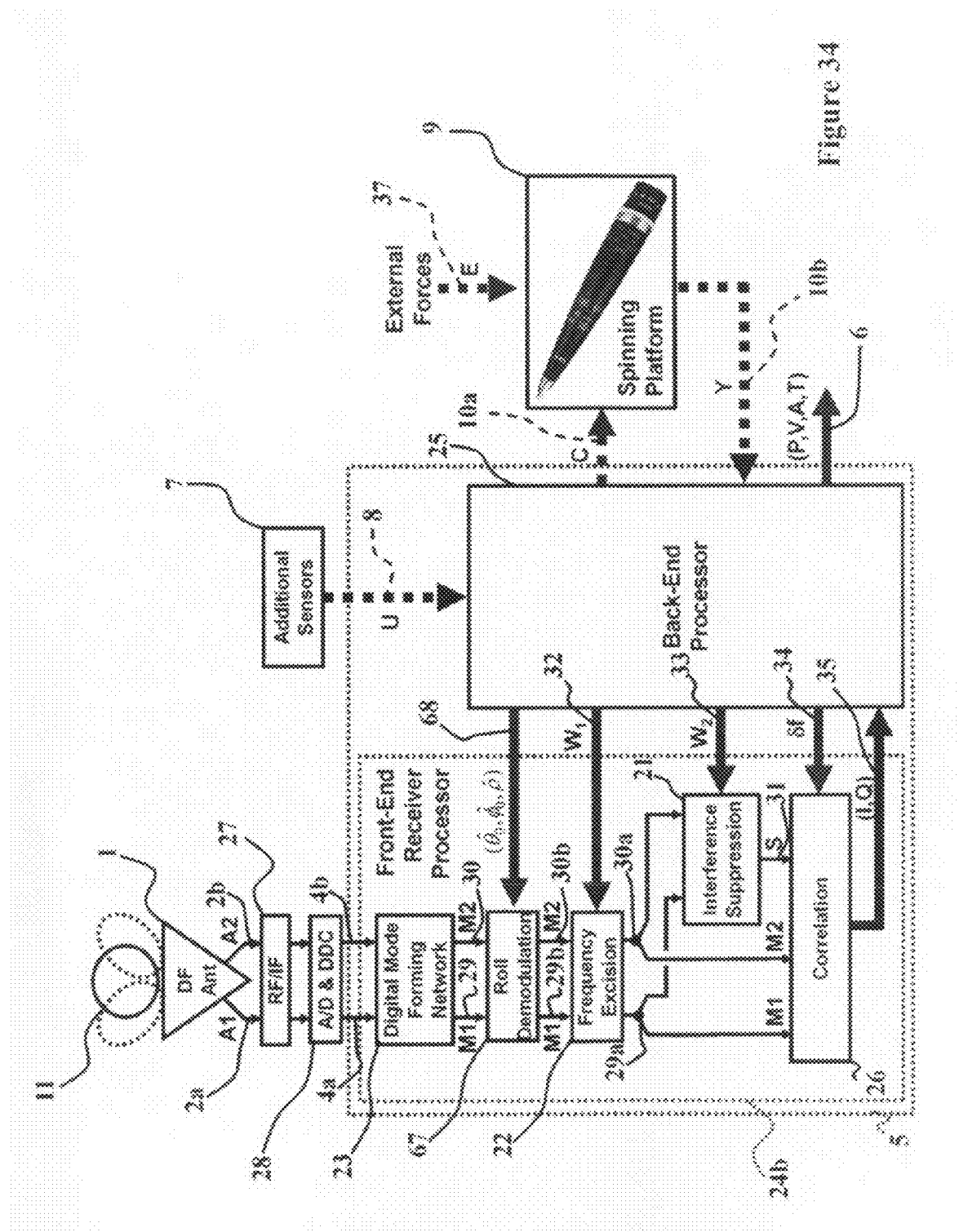
FIG. 34 illustrates an alternative architecture for spin-stabilized platforms where the digital mode-forming network and a roll demodulation module precede the interference suppression module.

FIG. 34 illustrates an architecture for demodulating the phase (and amplitude) imparted by the platform roll. In this approach, the roll demodulation module 67 follows the digital mode-forming network 23 and attempts to remove (track) the phase and amplitude modulation due to roll. The roll demodulation module input signal for Mode i is given by $$M_i(\theta_0,\phi(t)) = G_i(\theta_0,\phi(t)) S_0(\theta_0,\phi_0) \qquad (20)$$

where $S_0(\theta_0, \phi_0) = Ac(t)d(t)\sin(\omega_0 t+\psi_0)$ is the selected radio-frequency navigation signal received at an azimuth $\phi_0$ and elevation angle $\theta_0$ defined at some arbitrary time t=0, A is the received magnitude, c(t) is the GPS PRN code, d(t) is the GPS data, $\omega_0$ is the received carrier frequency, and $\psi_0$ is the received carrier phase. We assume that the elevation angle remains approximately constant $\theta(t)=\theta_0$ (or is slowly varying), while the azimuth angle varies with time at an approximately constant (or slowly varying) roll rate $\rho$: $\phi(t)=-\rho t+\phi_0$. The 'initial' angles $(\theta_0, \phi_0)$ are 'fixed' relative to the global coordinate frame while the platform continues to rotate. The complex antenna Mode i gain is $G_i(\theta, \phi)$. Ideally, the Mode i output of the roll demodulation module is $$\overline{M}_i(\theta_0,\phi(t)) = \overline{G}_i(\theta_0,\phi(t))M_i(\theta_0,\phi(t)) = G_i(\theta_0,\phi_0)S_0(\theta_0,\phi_0), \qquad (21)$$

where the roll demodulation gain $\overline{G}_i(\theta_0, \phi(t))$ is defined such that $$\overline{G}_i(\theta_0,\phi(t))G_i(\theta_0,\phi(t)) := G_i(\theta_0,\phi_0). \qquad (22)$$

Hence, the outputs of the roll demodulation module are simply the slowly varying (relative to the roll rate) antenna mode signals as if the platform were not rotating and remains 'fixed'.

Since we have a priori knowledge of the antenna patterns, the inverse gain function $\overline{G}_i(\theta, \phi)$ is known as a function of elevation and azimuth angle. However, we do not know the initial elevation $\theta_0$ or azimuth $\phi_0$ angles, or the roll rate $\rho$. The current orientation can be determined once the initial elevation and azimuth angles and the roll rate are estimated. Since it varies slowly over time relative to the roll rate, the initial elevation angle is directly observable with relative magnitude measurements of the two antenna modes.

The roll rate, and therefore the initial azimuth angle, is observable through the receiver phase lock loop (PLL) and frequency lock loop (FLL). This fact is clear from the following equation $$S(\theta_0,\phi(t)) = \alpha_1 M_1(\theta_0,\phi(t)) + \alpha_2$$
$$\overline{M}_2(\theta_0,\phi(t)) \approx \Delta(\theta_0,\phi(t))S_0(\theta_0,\phi_0) \qquad (23)$$

where $\alpha_1$ and $\alpha_2$ are the complex weights use to generate the primary navigation signal $S(\theta_0, \phi(t))$, and $\Delta(\theta_0, \phi(t))$ is the effective complex gain applied to the selected radio-frequency navigation signal $S_0(\theta_0, \phi_0)$. Ideally $\Delta(\theta_0, \phi(t)):=1$. However, in practice, there will be some residual error due to the non-zero roll rate such that $\arg(\Delta(\theta_0, \phi t))) \approx \Psi_1(\rho)t + \Psi_0(\theta_0, \phi_0)$ and $$S(\theta_0, \phi(t)) \approx Ac(t)d(t)\sin(\omega_0 t + \psi_0 + \arg(\Delta(\theta_0, \phi(t)))) \qquad (24)$$
$$\approx Ac(t)d(t)\sin(\omega_0 t + \psi_0 + \Psi_1(\rho)t + \Psi_0(\theta_0, \phi_0)).$$

Figure 35:
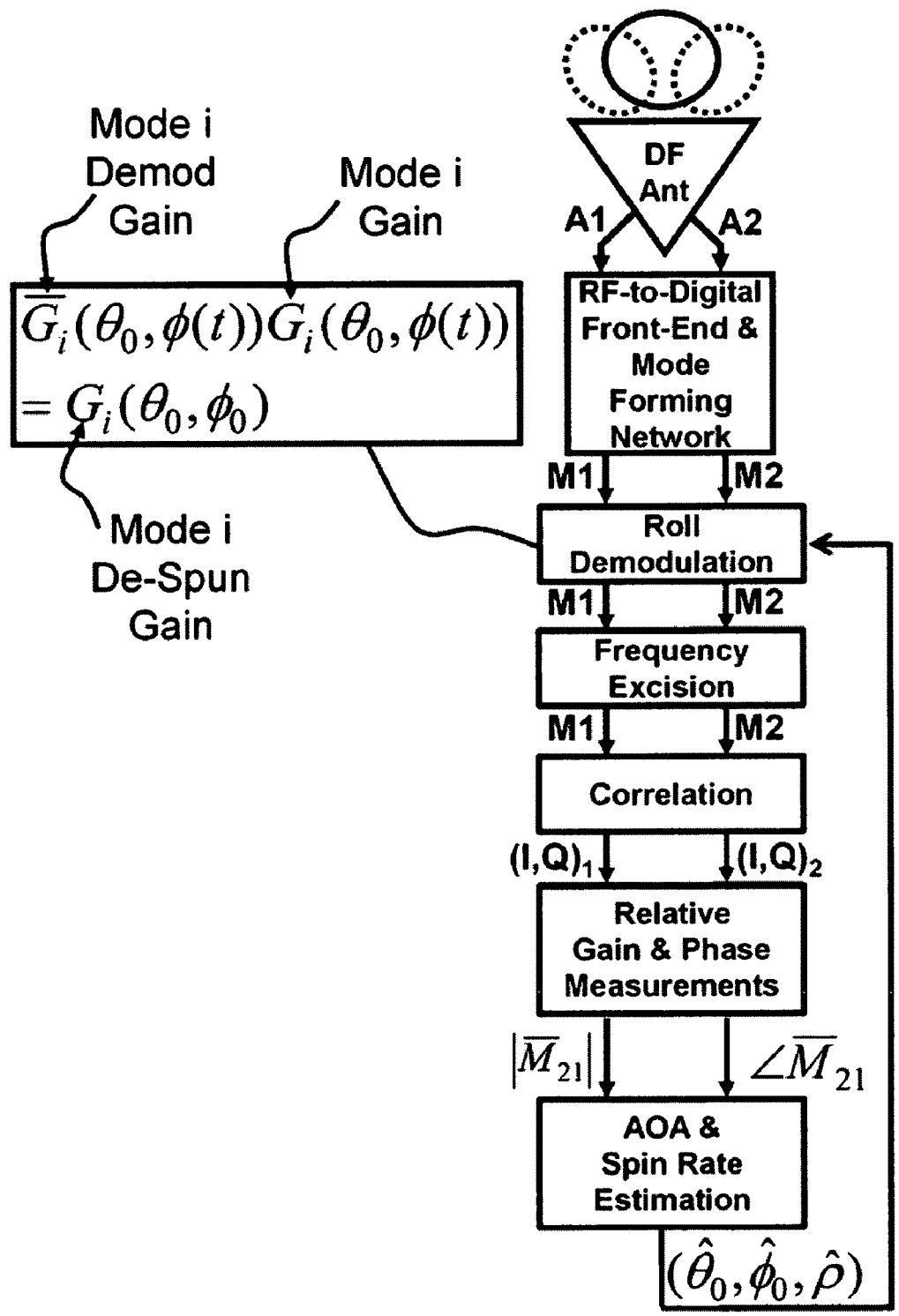
FIG. 35 explicitly illustrates the roll demodulation feedback loop implied by FIG. 34.
Figure 36:
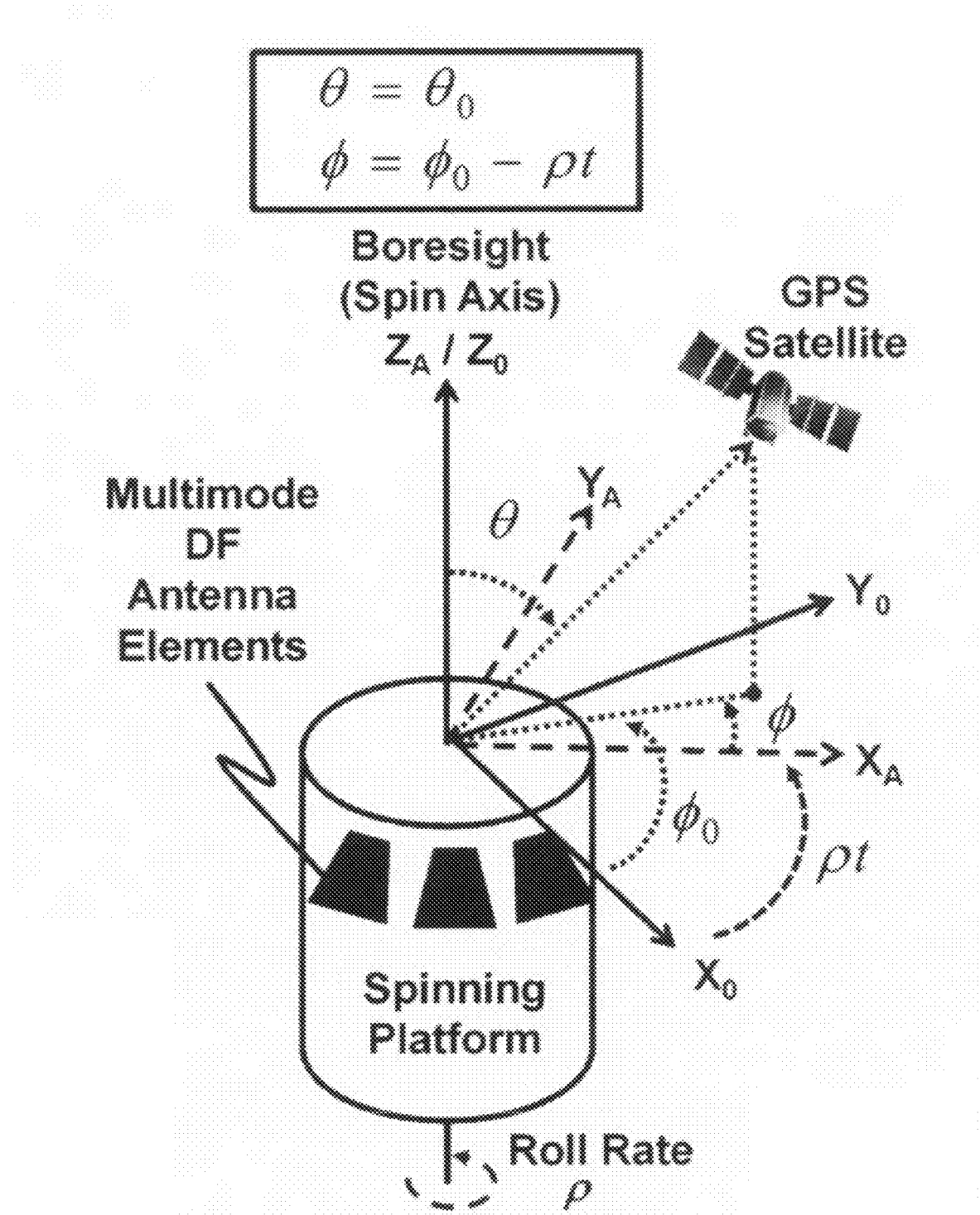
FIG. 36 illustrates the roll demodulation geometry of a spin-stabilized platform with the boresight of a multi-aperture DF antenna aligned with the platform roll axis.

Hence, the non-zero rotation rate of the antenna will effectively shift the received frequency by $\Psi_1(\rho)$ and the received phase by $\Psi_0(\theta_0, \phi_0)$. The receiver frequency and phase lock loops will drive these error terms to zero and standard estimation techniques such as a Kalman filter can be used to estimate the roll rate and, therefore, the initial azimuth angle. The estimated signal arrival angles $(\hat{\theta}_0, \hat{\phi}_0)$ and the estimated roll rate $(\hat{\rho})$ can then be used to compute the demodulation gain $\overline{G}_i(\hat{\theta}_0, \hat{\phi}_0 - \hat{\rho}t)$. The demodulation feedback loop 68 implied by FIG. 34 is explicitly illustrated by FIG. 35 for a system with two DF modes. The relative gain and phase measurements between the two modes are respectively represented by $|\overline{M}_{21}|$ and $\angle \overline{M}_{21}$. This 3-D attitude determination architecture is valid for any DF antenna that supports at least two DF modes and that can be placed upon a spinning platform. FIG. 36 illustrates the coordinate system described above for a multi-aperture DF antenna placed about the outer surface of a spinning platform. The antenna coordinate frame is represented by the subscript 'A' while the 'fixed' or 'initial' coordinate frame is represented by the subscript '0'.

Multi-Antenna Attitude Systems with Multimode Single-Aperture Antennas

Yet another application of this technology is the use of an array of multimode single-aperture DF antennas for attitude determination. It is well known that there is an integer ambiguity that needs to be resolved with multi-antenna GPS-based attitude systems. Unfortunately, the search space for this ambiguity gets significantly larger with longer baselines which are required for improved attitude accuracy. The advantage of using an array of multimode single-aperture DF antennas and receivers is that the integer ambiguity remains bounded and no worse than a single antenna solution regardless of the length of the baseline separation between array elements. Hence, the attitude accuracy of the system can be improved by increasing the baseline separation without any increase in the computational burden required for determining the integer ambiguity.

Although the present invention has been described with respect to a preferred embodiment thereof, it will be obvious to those skilled in the art that many modifications, additions, and deletions may be made therein without departing from the scope and spirit of the invention as set forth in the following claims.

What is claimed is:

1. A radio-based navigation system for receiving selected radio-frequency signals of a known origin and a known waveform, and for determining the system position, velocity, three-dimensional attitude and time, said system comprising:
   a. a radio-frequency-to-digital front-end configured to accept a minimum of two feed signals from a direction-finding antenna having a maximum aperture dimension that is less than 0.7 wavelength at the lowest operating frequency and capable of supporting a minimum of two unchanging direction-finding modes that are substantially cylindrically symmetric about a single unchanging antenna boresight and to convert the feed signals to digital signals; and
   b. a receiver module configured to process said digital signals wherein said receiver module is configured to:
      (1) combine the digital signals to form a minimum of two direction-finding signals corresponding to said direction-finding modes;
      (2) thereafter combine the digital signals or the direction-finding signals to create at least one navigation signal such that said selected radio-frequency signals are enhanced and the effects of interference signals, if any, are reduced;
      (3) determine the system position, velocity, and time from said selected radio-frequency signals obtained from said at least one navigation signal; and
      (4) determine two-dimensional angles of arrival of said selected radio-frequency signals and thereby the system three-dimensional attitude from the direction-finding signals via simultaneous mode comparison techniques.

2. The radio-based navigation system of claim 1 wherein the direction-finding antenna comprises a single-aperture.

3. The radio-based navigation system of claim 2 wherein the direction-finding antenna comprises a two-arm spiral antenna, wherein the largest dimension is less than six-tenths of a wavelength at the lowest frequency of its operational band.

4. The radio-based navigation system of claim 1 wherein the largest dimension of the direction-finding antenna is less than six-tenths of a wavelength at the lowest frequency of its operational band.

5. The radio-based navigation system of claim 1 wherein said selected radio-frequency signals are generated by at least one global navigation satellite system.

6. The radio-based navigation system of claim 4 wherein at least a subset of said selected radio-frequency signals comprises global positioning system signals.

7. The radio-based navigation system of claim 4 wherein:
   a. said radio-frequency-to-digital front-end further includes a common clock and common phased-lock loops for synchronously down-converting each of said minimum of two feed signals to an intermediate frequency or baseband; and
   b. said receiver module further generates a replica waveform for each one of said selected radio-frequency signals and produces a predetermined number of corresponding in-phase and quadrature-phase signals for the navigation signal and the direction-finding signals and wherein said receiver module:
      (1) determines the system position, velocity, and time from the in-phase and quadrature-phase signals corresponding to each one of said selected radio-frequency signals obtained from the navigation signal and/or the direction-finding signals; and
      (2) determines the two-dimensional angles of arrival of said selected radio-frequency signals and thereby the system three-dimensional attitude from the in-phase and/or quadrature-phase signals corresponding to the direction-finding signals via simultaneous mode comparison techniques.

8. The radio-based navigation system of claim 7 wherein the in-phase and quadrature-phase signals corresponding to the navigation signal and the direction-finding signals are produced via a shared carrier- and code-tracking loop for each one of said selected radio-frequency signals, thereby minimizing the processing power requirements and system complexity.

9. The radio-based navigation system of claim 5 wherein said receiver module further reduces the effects of said interference signals and/or enhances the direction-finding signals and thereby said selected radio-frequency signals.

10. The radio-based navigation system of claim 9 wherein said receiver module further reduces the effects of said interference signals and/or enhances said selected radio-frequency signals via space-time adaptive and/or space-frequency adaptive processing.

11. The radio-based navigation system of claim 6 wherein said radio-frequency-to-digital front-end further includes an analog mode- or beam-forming network.

12. The radio-based navigation system of claim 6 wherein the receiver module further includes a beam-forming network.

13. The radio-based navigation system of claim 1 wherein a feedback control loop in said receiver module further tracks amplitude and phase modulation due to rotation of the direction-finding antenna, whereby also determining the system spin rate, if any, and substantially removes said amplitude and phase modulation from the direction-finding signals and said at least one navigation signal, thereby effectively translating said selected radio-frequency signals into a non-rotating coordinate frame to determine the system position, velocity, attitude and time.

14. The radio-based navigation system of claim 5 wherein additional measurements from alternative sources are processed to further improve the system position, velocity, attitude and time.

15. The radio-based navigation system of claim 14 wherein the additional measurements are obtained from an inertial measurement unit.

16. The radio-based navigation system of claim 1 further comprising:
 a. platform actuator and sensor measurement inputs;
 b. a platform guidance and command system that generates platform commands using the system position, velocity, attitude and time estimates; and
 c. a dynamic platform model that generates a platform state prediction based on the system position, velocity, attitude and time estimates, the platform commands, and the platform measurement inputs,
 wherein the platform state prediction is fused with said at least one navigation signal and/or the direction-finding signals to further improve the system position, velocity, attitude and time estimates.

17. A method for determining a radio signal receiver's position, velocity, three-dimensional attitude and time, said method comprising:
 a. converting a minimum of two feed signals to digital signals wherein said feed signals are provided by a direction-finding antenna having a maximum aperture dimension that is less than 0.7 wavelength at the lowest operating frequency and capable of (1) supporting a minimum of two unchanging direction-finding modes that are substantially cylindrically symmetric about a single unchanging antenna boresight and (2) receiving selected radio-frequency signals of a known origin and waveform;
 b. combining the digital signals to form a minimum of two direction-finding signals corresponding to said direction-finding modes;
 c. combining the digital signals or the direction-finding signals to create at least one navigation signal such that said selected radio-frequency signals are enhanced and the effects of interference signals, if any, are reduced;
 d. determining the receiver's position, velocity, and time from said selected radio-frequency signals obtained from said at least one navigation signal; and
 e. determining two-dimensional angles of arrival of said selected radio-frequency signals and thereby the receiver's three-dimensional attitude from the direction-finding signals via simultaneous mode comparison techniques.

18. The method of claim 17 wherein the direction-finding antenna comprises a single-aperture.

19. The method of claim 18 wherein the direction-finding antenna comprises a two-arm spiral antenna, wherein the largest dimension is less than six-tenths of a wavelength at the lowest frequency of its operational band.

20. The method of claim 17 wherein the largest dimension of the direction-finding antenna is less than six-tenths of a wavelength at the lowest frequency of its operational band.

21. The method of claim 17 wherein said selected radio-frequency signals are generated by at least one global navigation satellite system.

22. The method of claim 20 wherein at least a subset of said selected radio-frequency signals comprises global positioning system signals.

23. The method of claim 20 further comprising:
 a. down-converting each of said minimum of two feed signals synchronously to an intermediate frequency or baseband through the use of a common clock and common phased-lock loops;
 b. generating a replica waveform for each one of said selected radio-frequency signals;
 c. producing a predetermined number of in-phase and quadrature-phase signals corresponding to the replica waveforms for the navigation signal and the direction-finding signals;
 d. determining the receiver's position, velocity, and time from the in-phase and quadrature-phase signals corresponding to the navigation signal and/or the direction-finding signals; and
 e. determining the two-dimensional angles of arrival of said selected radio-frequency signals and thereby the receiver's three-dimensional attitude from the in-phase and/or quadrature-phase signals corresponding to each one of said selected radio-frequency signals obtained from the direction-finding signals via simultaneous mode comparison techniques.

24. The method of claim 23 further comprising producing the in-phase and quadrature-phase signals corresponding to the navigation signal and the direction-finding signals via a shared carrier- and code-tracking loop for each one of said selected radio-frequency signals, thereby minimizing the processing power requirements and system complexity.

25. The method of claim 21 further comprising further reducing the effects of said interference signals and/or enhancing the direction-finding signals and thereby said selected radio-frequency signals.

26. The method of claim 25 further comprising further reducing the effects of said interference signals and/or enhancing said selected radio-frequency signals via space-time adaptive and/or space-frequency adaptive processing.

27. The method of claim 22 further comprising filtering said minimum of two feed signals through an analog mode-forming network.

28. The method of claim 22 further comprising creating a beam-forming network prior to forming the direction-finding signals.

29. The method of claim 17 further comprising:
 a. tracking amplitude and phase modulation due to rotation of the direction-finding antenna, whereby also determining the receiver spin rate, if any, and
 b. substantially removing said amplitude and phase modulation from the direction-finding signals and said at least one navigation signal and thereby effectively translating said selected radio-frequency signals into a non-rotating coordinate frame to determine the system position, velocity, attitude and time.

30. The method of claim 17 wherein additional measurements from alternative sources are fused with said at least one navigation signal and/or the direction-finding signals to further improve the system position, velocity, attitude and time estimate.

31. The method of claim 30 wherein the additional measurements are obtained from an inertial measurement unit.

32. The method of claim 17 further comprising:
 a. obtaining platform actuator and sensor measurement inputs;
 b. generating platform commands using the receiver's position, velocity, attitude and time estimates;
 c. determining a platform state prediction based on a dynamic platform model, the system position, velocity, attitude and time estimates, the platform commands, and the platform measurement inputs; and
 d. fusing the platform state prediction with said at least one navigation signal and/or the direction-finding signals to further improve the system position, velocity, attitude and time estimates.

* * * * *